(12) United States Patent  
Endo et al.

(10) Patent No.: US 7,515,195 B2
(45) Date of Patent: Apr. 7, 2009

(54) DIGITAL CAMERA WITH RETRACTABLE LENSES

(75) Inventors: Hiroshi Endo, Asaka (JP); Yoshihiro Ito, Asaka (JP); Takehiko Senba, Asaka (JP); Akio Omiya, Saitama (JP)

(73) Assignees: FUJINON Corporation, Saitama (JP); FUJIFILM Corporation, Tokyo (JP)

( * ) Notice: Subject to any disclaimer, the term of this patent is extended or adjusted under 35 U.S.C. 154(b) by 711 days.

(21) Appl. No.: 10/825,673

(22) Filed: Apr. 16, 2004

(65) Prior Publication Data

US 2004/0207746 A1 Oct. 21, 2004

(30) Foreign Application Priority Data

Apr. 18, 2003 (JP) .............................. 2003-114271

(51) Int. Cl.
*H04N 5/225* (2006.01)
*G03B 9/04* (2006.01)
*G02B 15/14* (2006.01)
(52) U.S. Cl. ..................... 348/340; 396/459; 359/701
(58) Field of Classification Search ................ 348/340; 359/701; 396/457, 459, 462, 493
See application file for complete search history.

(56) References Cited

U.S. PATENT DOCUMENTS

| 4,597,657 A | * | 7/1986 | Wakabayashi ............... 396/75 |
| 4,887,107 A | * | 12/1989 | Nakamura et al. ............ 396/75 |
| 4,969,719 A | * | 11/1990 | Bradshaw et al. ............ 349/116 |
| 4,971,441 A | * | 11/1990 | Damlin et al. ............... 356/338 |
| 6,978,089 B2 | * | 12/2005 | Nomura et al. ............... 396/75 |

FOREIGN PATENT DOCUMENTS

| JP | 5-34769 A | 2/1993 |
| JP | 8-304875 A | 11/1996 |
| JP | 9-163240 A | 6/1997 |
| JP | 2001-61165 A | 3/2001 |

* cited by examiner

*Primary Examiner*—Tuan V Ho
*Assistant Examiner*—Chia-Wei A Chen
(74) *Attorney, Agent, or Firm*—Sughrue Mion, PLLC

(57) ABSTRACT

To provide a digital camera that captures object light with a solid-state image pickup device to generate an image signal and is effectively made thinner by retracting a part of a taking lens into a suitable position when a lens barrel is collapsed. A rear lens group is rotated between a position on an optical axis and a retracted position in a recess section at the side of a CCD solid-state image pickup device, and a focusing lens is rotated between a position on the optical axis and a retracted position in a front lens group side space. When the lens barrel is collapsed, the rear lens group is placed in the recess section, and the focusing lens is placed in the front lens group side space.

11 Claims, 58 Drawing Sheets

DIGITAL CAMERA WITH RETRACTABLE LENSES

BACKGROUND OF THE INVENTION

1. Field of the Invention

The present invention relates to a digital camera that captures object light and generates an image signal.

2. Description of the Related Art

In recent years, besides conventional cameras which take pictures using silver films, there have rapidly become widespread digital cameras using a solid-state image pickup device, such as a CCD image pickup device or MOS image pickup device, which form an object image on the solid-state image pickup device and generate an image signal.

The digital camera, which is also required to have high portability as well as high picture-taking performance, is designed so that the taking lens can be retracted into the thin body to vary the focal length and take a picture with a desired angle of view and for the convenience of carriage.

As the taking lens having a variable focal length, a taking lens composed of three or more lens groups is used. Specifically, a taking lens is widely used in which the lens group disposed at the rear end of the taking lens along the optical axis constitutes a focusing lens, and focus adjustment is achieved by displacing the focusing lens along the optical axis. In addition, typically, a member that controls the quantity of light, such as a shutter or diaphragm, is provided between the front lens group and the rear lens group or between the rear lens group and the focusing lens.

Conventionally, the digital camera has been made thinner by reducing the spaces between the lens and the shutter or the like as much as possible when collapsing the lens barrel. However, this approach can make the digital camera thinner only to a limited extent.

For providing a thinner digital camera, it has already been contemplated that any of the lens groups of the taking lens is retracted from the optical axis when collapsing the lens barrel. However, there is no proposal concerning which lens group should be retracted or to what position should the lens group be retracted to make the digital camera thinner, or what kind of retracting mechanism should be provided to simply retract the taking lens into a desired position when collapsing the lens barrel and to adequately advance the same lens onto the optical axis when extending the lens barrel.

There has been conventionally known an approach to vary the focal length in which the rear lens group is disposed on the optical axis in the telephoto mode and the rear lens group is displaced from the optical axis in the wide-angle mode (see the patent reference 1). However, this approach is intended only for varying the focal length and does not contribute to making the camera thinner.

In addition, as techniques related to the present invention described later, there have been known shutters using an electrooptic element, such as a liquid crystal shutter using a liquid crystal (see patent references 2 and 3) and a PLZT shutter using a polarizing plate (see patent reference 4).

Patent reference 1: Japanese Patent Laid-Open No. 5-34769

Patent reference 2: Japanese Patent Laid-Open No. 9-163240

Patent reference 3: Japanese Patent Laid-Open No. 2001-61165

Patent reference 4: Japanese Patent Laid-Open No. 8-304875

SUMMARY OF THE INVENTION

In view of such circumstances, an object of the present invention is to provide a digital camera which is effectively made thinner by retracting a part of a taking lens into a suitable position when a lens barrel is collapsed.

In order to attain the object, the present invention provides a digital camera that captures object light and generates an image signal, having:

a taking lens having a variable focal length and having three or more lens groups including a front lens group, which is disposed forward along an optical axis;

a lens barrel that has an inner space for housing the taking lens and is capable of being extended or collapsed, the inner space having an opening for the front lens group to see the outside on the front thereof and being defined by a wall at the rear thereof, and the focal length being adjusted when the lens barrel is extended; and a solid-state image pickup device that receives object light focused by the taking lens and generates an image signal, the solid-state image pickup device being supported on the wall, in which the lens barrel has a lens group retraction/advancement mechanism which, when the lens barrel is collapsed, retracts a first lens group into a front lens group side space and retracts a second lens group into a recess section, which is defined by the solid-state image pickup device and the wall in a space at the side of the solid-state image pickup device, and, when the lens barrel is extended, advances both the first lens group and the second lens group onto the optical axis, the first lens group being one of the three or more lens groups constituting the taking lens which is other than the front lens group, and the second lens group being one other than the front lens group and the first lens group.

In digital cameras having a taking lens composed of three or more lens groups including a front lens group disposed forward along the optical axis, the front lens group side space and the recess section described above tend to be dead spaces. However, according to the present invention, the front lens group side space and the recess section can be effectively used, and, when the lens barrel is collapsed, the digital camera can be made still thinner by retracting the first lens group, which is one of the lens groups which is other than the front lens group, into the front lens group side space and retracting the second lens group, which is one other than the front lens group and the first lens group, into the recess section.

In the digital camera according to the present invention, it is preferable that the lens barrel has:

a first lens group guiding frame that moves along the optical axis and positions the first lens group along the optical axis;

a first lens group holding frame that holds the first lens group, is pivotally supported on the first lens group guiding frame, rotates the first lens group to bring the first lens group onto the optical axis when the lens barrel is extended and rotates the first lens group to bring the first lens group into the front lens group side space when the lens barrel is collapsed;

a second lens group guiding frame that moves along the optical axis and positions the second lens group along the optical axis; and a second lens group holding frame that holds the second lens group, is pivotally supported on the second lens group guiding frame, rotates the second lens group to bring the second lens group onto the optical axis when the lens barrel is extended and rotates the second lens group to bring the second lens group into the recess section when the lens barrel is collapsed.

In conventional cameras which move the lens groups of the taking lens only along the optical axis, a lens frame for positioning a lens group along the optical axis is provided for each of the lens groups. However, according to the present invention, each of the lens frames for the first and second lens groups is separated into the guiding frame and the holding frame, the holding frames are rotatably pivotally supported on the respective guiding frames, and thus, the first and second lens groups held by the holding frames can rotate. Thus, with a simple mechanism, the first and second lens groups can be retracted into the front lens group side space and the recess section, respectively, when the lens barrel is collapsed, and the first and second lens groups can be adequately advanced onto the optical axis when the lens barrels is extended.

In this case, it is preferable that centers of rotation of the first lens group holding frame and the second lens group holding frame with respect to the first lens group guiding frame and the second lens group guiding frame, respectively, are located on opposite sides of the optical axis.

Since the centers of rotation of the first lens group holding frame and the second lens group holding frame are set at positions on opposite sides of the optical axis of the taking lens, the digital camera can be made thinner, and the first lens group and the second lens group can be rotated without interference with each other.

Furthermore, it is preferable that the digital camera according to the present invention further has:

a light quantity controlling member that is housed in the lens barrel, moves integrally with the first lens group along the optical axis of the taking lens and controls the quantity of object light passing through the taking lens, in which the first lens group holding frame retracts the light quantity controlling member integrally with the first lens group into the front lens group side space when the lens barrel is collapsed, and advances the light quantity controlling member integrally with the first lens group onto the optical axis when the lens barrel is extended, or it is preferable that the digital camera according to the present invention further has:

a light quantity controlling member that is housed in the lens barrel, moves integrally with the second lens group along the optical axis of the taking lens and controls the quantity of object light passing through the taking lens, in which the second lens group holding frame retracts the light quantity controlling member integrally with the second lens group into the recess section when the lens barrel is collapsed, and advances the light quantity controlling member integrally with the second lens group onto the optical axis when the lens barrel is extended.

In this case, it is preferable that the light quantity controlling member has an electrooptic element.

The light quantity controlling member may be a diaphragm member that controls the aperture to control the quantity of object light passing through the taking lens or a shutter member that controls the shutter speed to control the quantity of object light passing through the taking lens.

Since the light quantity controlling member is retracted along with the first lens group or second lens group when the lens barrel is collapsed, the thickness of the digital camera at the time when the lens barrel is collapsed can be further reduced, depending on the specific arrangement of the lens barrel including the taking lens and light quantity controlling member.

In addition, it is preferable that the digital camera according to the present invention further has:

a first light quantity controlling member that is housed in the lens barrel, moves integrally with the first lens group along the optical axis of the taking lens and controls the quantity of object light passing through the taking lens; and a second light quantity controlling member that moves integrally with the second lens group along the optical axis and controls the quantity of object light passing through the taking lens, in which, when the lens barrel is collapsed, the first lens group holding frame retracts the first light quantity controlling member integrally with the first lens group into the front lens group side space, and the second lens group holding frame retracts the second light quantity controlling member integrally with the second lens group into the recess section, and, when the lens barrel is extended, the first lens group holding frame advances the first light quantity controlling member integrally with the first lens group onto the optical axis of the taking lens, and the second lens group holding frame advances the second light quantity controlling member integrally with the second lens group onto the optical axis.

In this case, it is preferable that at least one of the first and second light quantity controlling members has an electrooptic element.

At least one of the first and second light quantity controlling members may be a diaphragm member that controls the aperture to control the quantity of object light passing through the taking lens, and the other of the first and second light quantity controlling members may be a shutter member that controls the shutter speed to control the quantity of object light passing through the taking lens.

In the case of the digital camera having the two light quantity controlling members as described above, if one of the two light quantity controlling members is retracted along with the first lens group and the other is retracted along with the second lens group when the lens barrel is collapsed, the thickness of the digital camera at the time when the lens barrel is collapsed can be further reduced, depending on the specific arrangement of the lens barrel including the taking lens and light quantity controlling members.

In addition, in the digital camera according to the present invention, the taking lens may be a three-group taking lens having the front lens group, a rear lens group and a focusing lens arranged in this order from the front along the optical axis, has a variable focal length and adjusts the focus by displacing the focusing lens, the rear lens group constitutes the first lens group, and the focusing lens constitutes the second lens group, or the taking lens may be a three-group taking lens having the front lens group, a rear lens group and a focusing lens arranged in this order from the front along the optical axis, has a variable focal length and adjusts the focus by displacing the focusing lens, the focusing lens constitutes the first lens group, and the rear lens group constitutes said second lens group.

As described above, according to the present invention, when the lens barrel is collapsed, one of the rear lens group and focusing lens of the taking lens is retracted in the recess section at the side of the solid-state image pickup device, and the other is retracted in the space at the side of the front lens group of the taking lens. Thus, the digital camera can be thinner than conventional.

DETAILED DESCRIPTION OF THE PREFERRED EMBODIMENTS

Now, embodiments of the present invention will be described.

Figure 1:
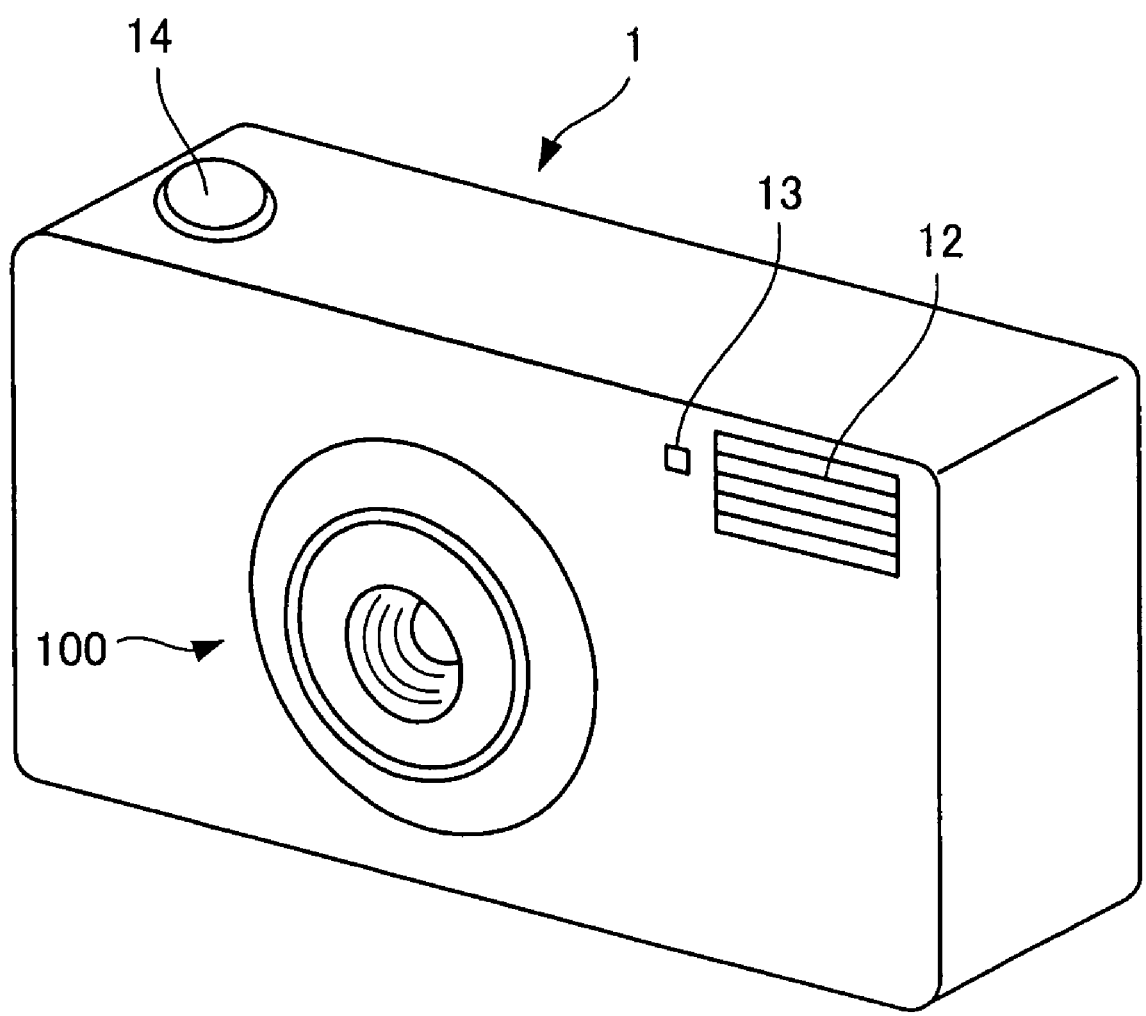
FIG. 1 is a perspective view of a digital camera according to a first embodiment of the present invention.
Figure 2:
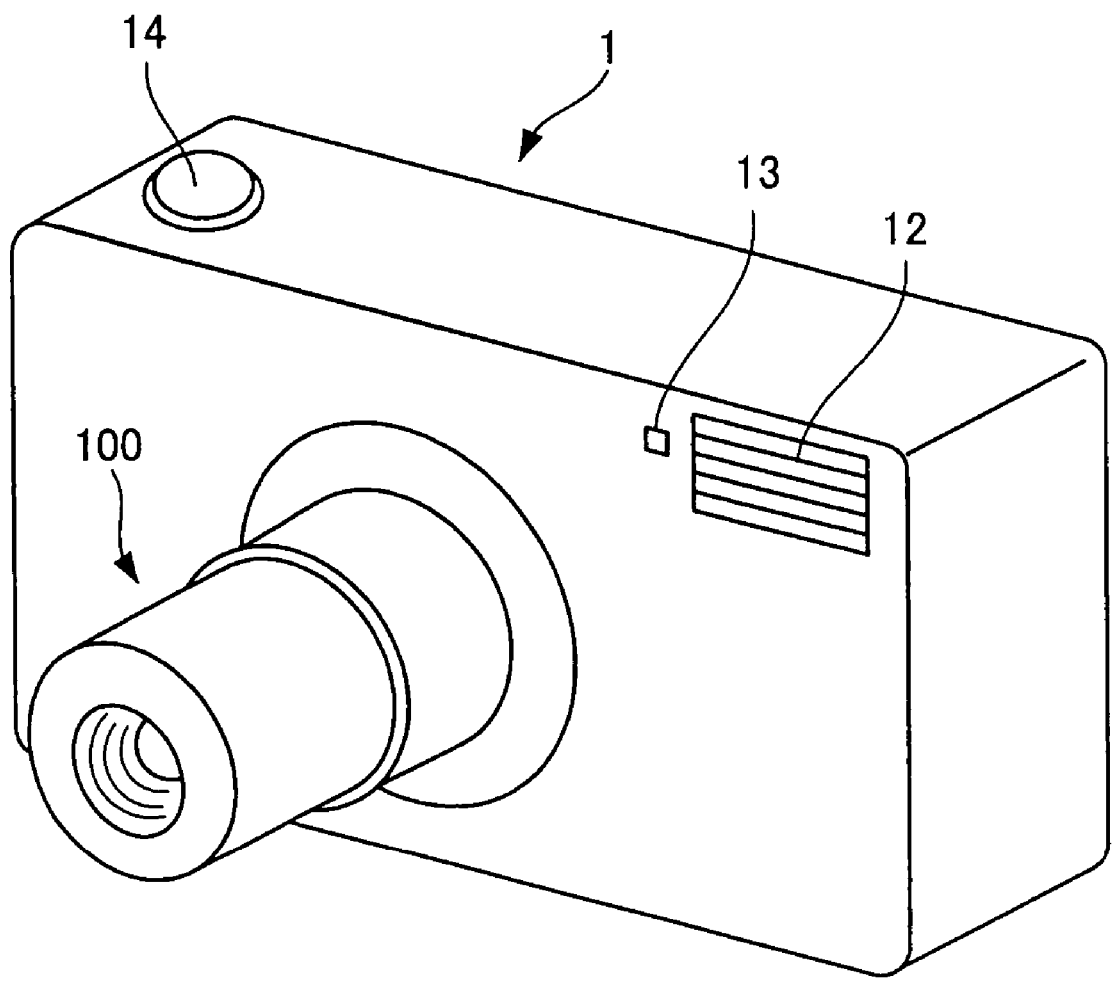
FIG. 2 is a perspective view of the digital camera according to the first embodiment of the present invention.

FIGS. 1 and 2 are perspective view of a digital camera according to a first embodiment of the present invention.

FIG. 1 shows a digital camera 1 according to this embodiment with a lens barrel 100, which incorporates a zoom lens, collapsed, and FIG. 2 shows the digital camera 1 with the lens barrel 100 extended.

The lens barrel 100 of the digital camera 1 shown in FIGS. 1 and 2 incorporates a taking lens constituted by three lens groups described later. Focal length adjustment can be achieved by displacing the lens groups along an optical axis, and focus adjustment can be achieved by displacing a third group, that is, a focusing lens, along the optical axis.

The digital camera 1 shown in FIGS. 1 and 2 has an auxiliary light emission window 12 and a finder objective window 13 arranged in an upper part of a front face thereof. In addition, the digital camera 1 has a shutter button 14 arranged on a top face thereof.

The digital camera 1 has zoom manipulation switches on a rear face thereof (not shown). If one of the zoom manipulation switches is pressed, the lens barrel 100 continues to extend toward the telephoto position as far as the switch is pressed, and if the other zoom manipulation switch is pressed, the lens barrel 100 continues to move toward the wide angle position as far as the switch is pressed.

Figure 3:
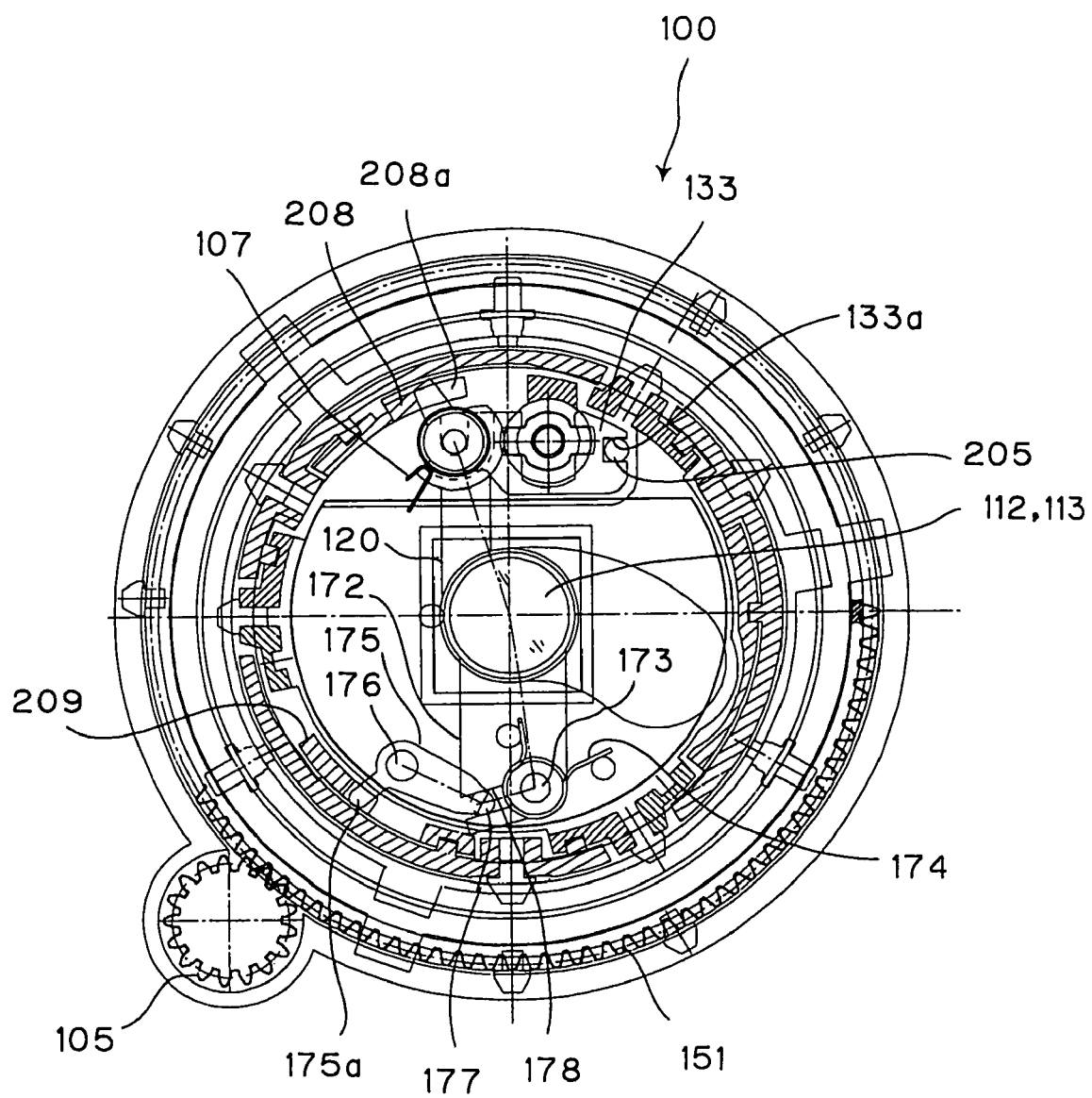
FIG. 3 is a schematic view of essential components of a lens barrel, in an extended state, of the digital camera according to the first embodiment of the present invention, which are seen along the optical axis.
Figure 4:
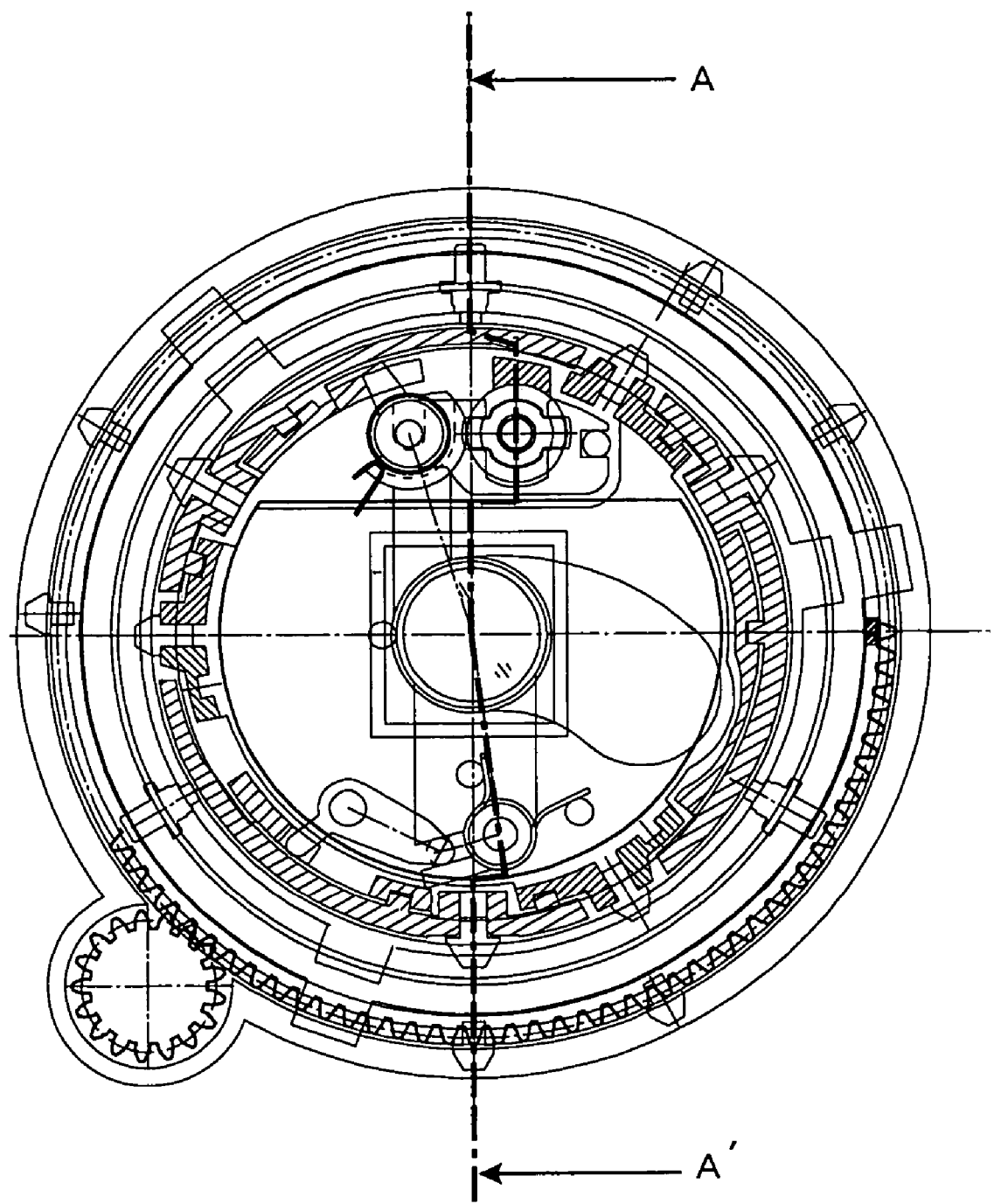
FIG. 4 is a cross-sectional view similar to FIG. 3 with the cutting-plane line A-A' additionally shown.
Figure 5:
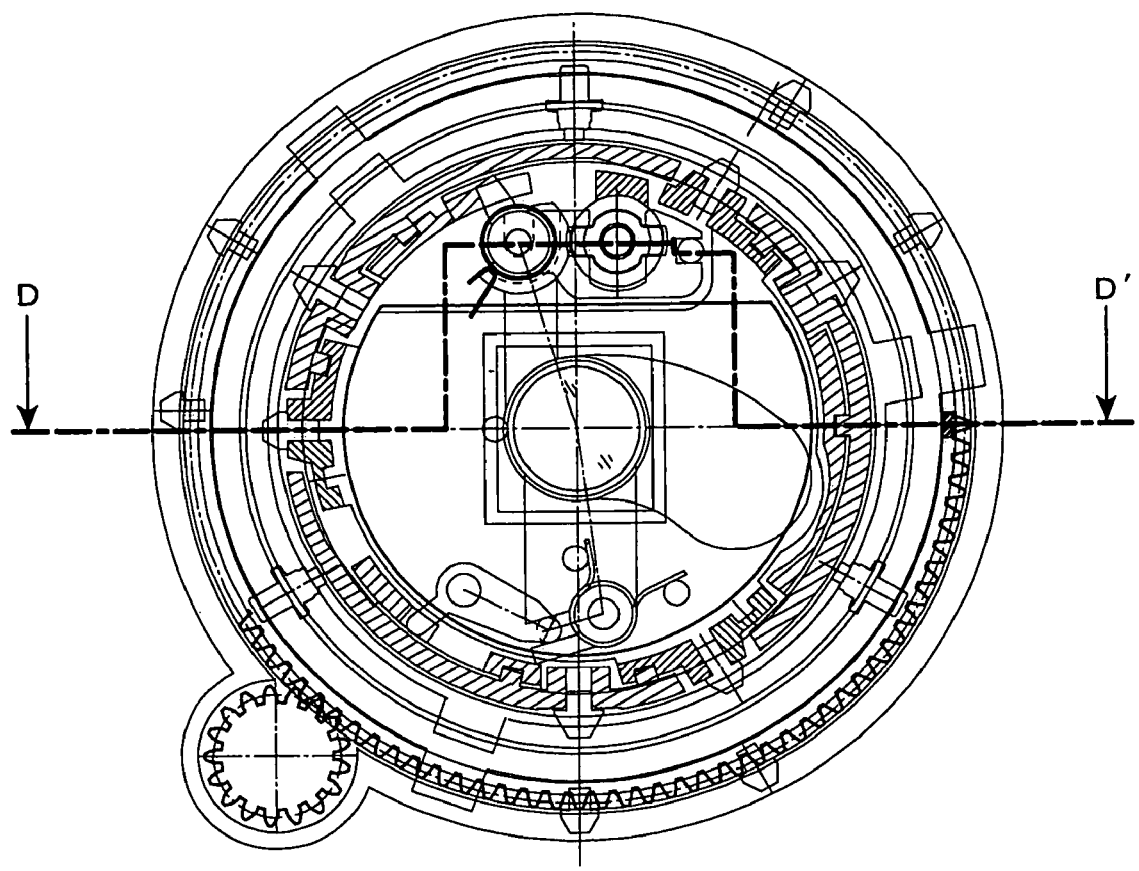
FIG. 5 is a cross-sectional view similar to FIG. 3 with the cutting-plane line D-D' additionally shown.
Figure 6:
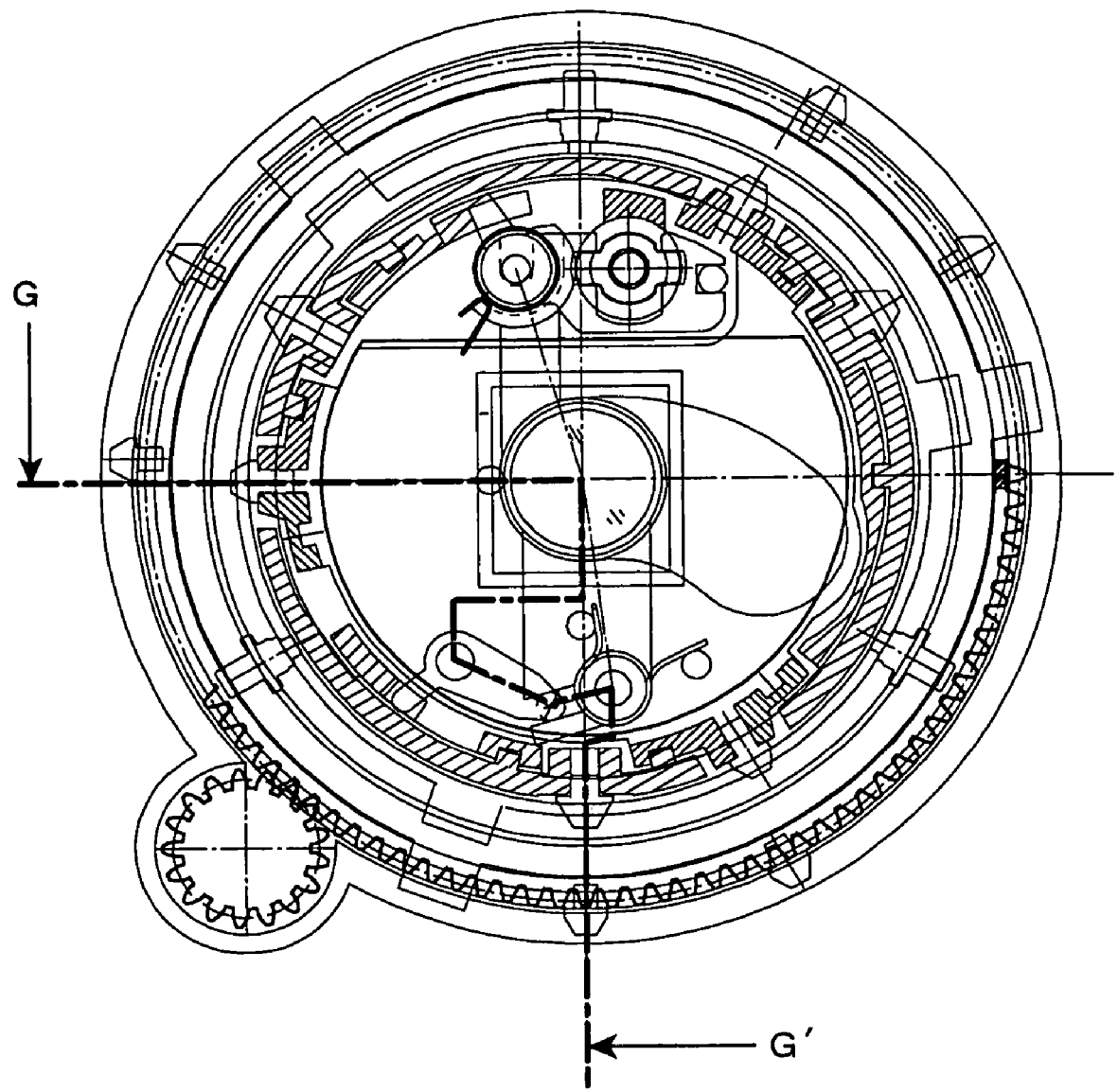
FIG. 6 is a cross-sectional view similar to FIG. 3 with the cutting-plane line G-G' additionally shown.
Figure 7:
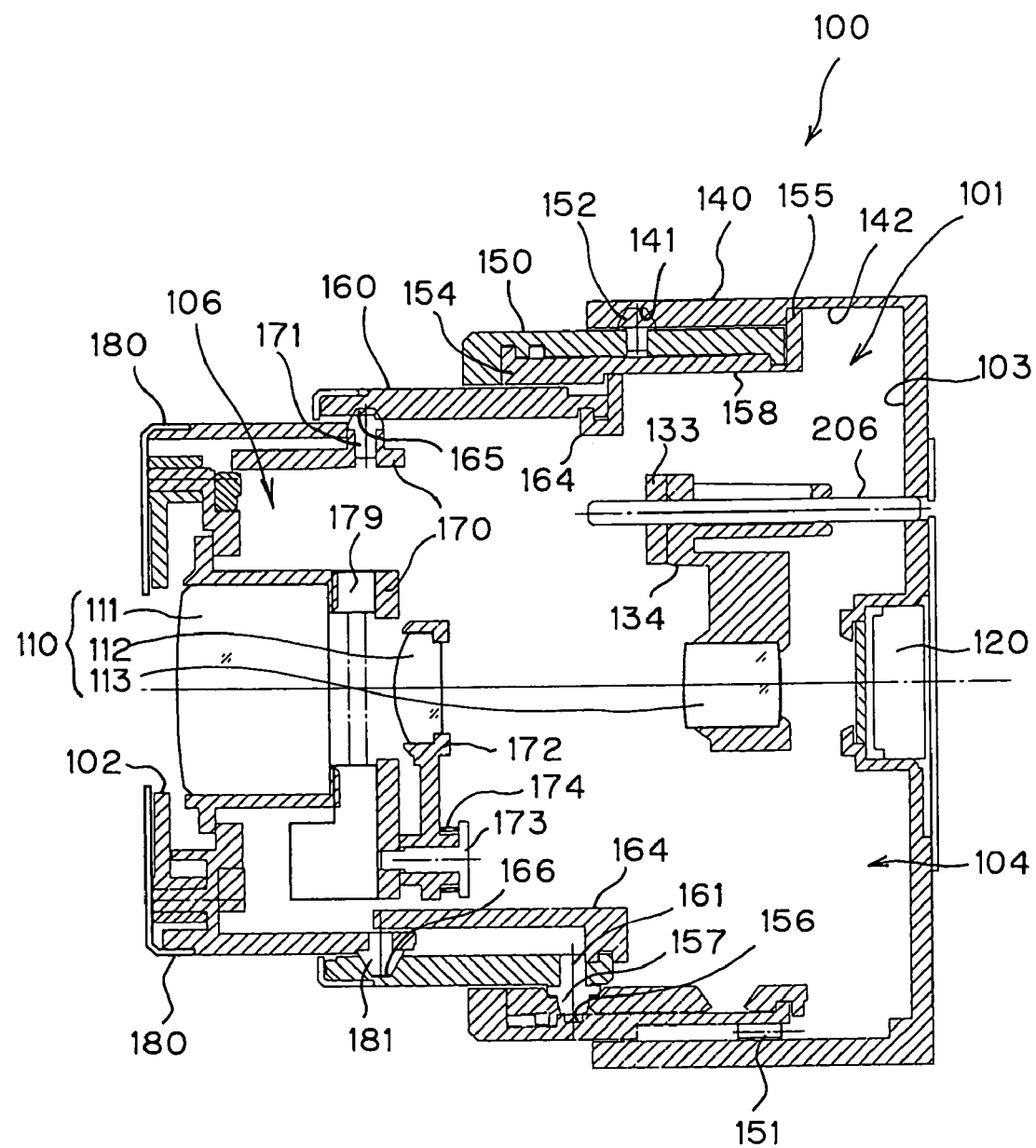
FIG. 7 is a cross-sectional view showing a tele-edge state with the maximum focal length taken along the cutting-plane line A-A' in FIG. 4.
Figure 8:
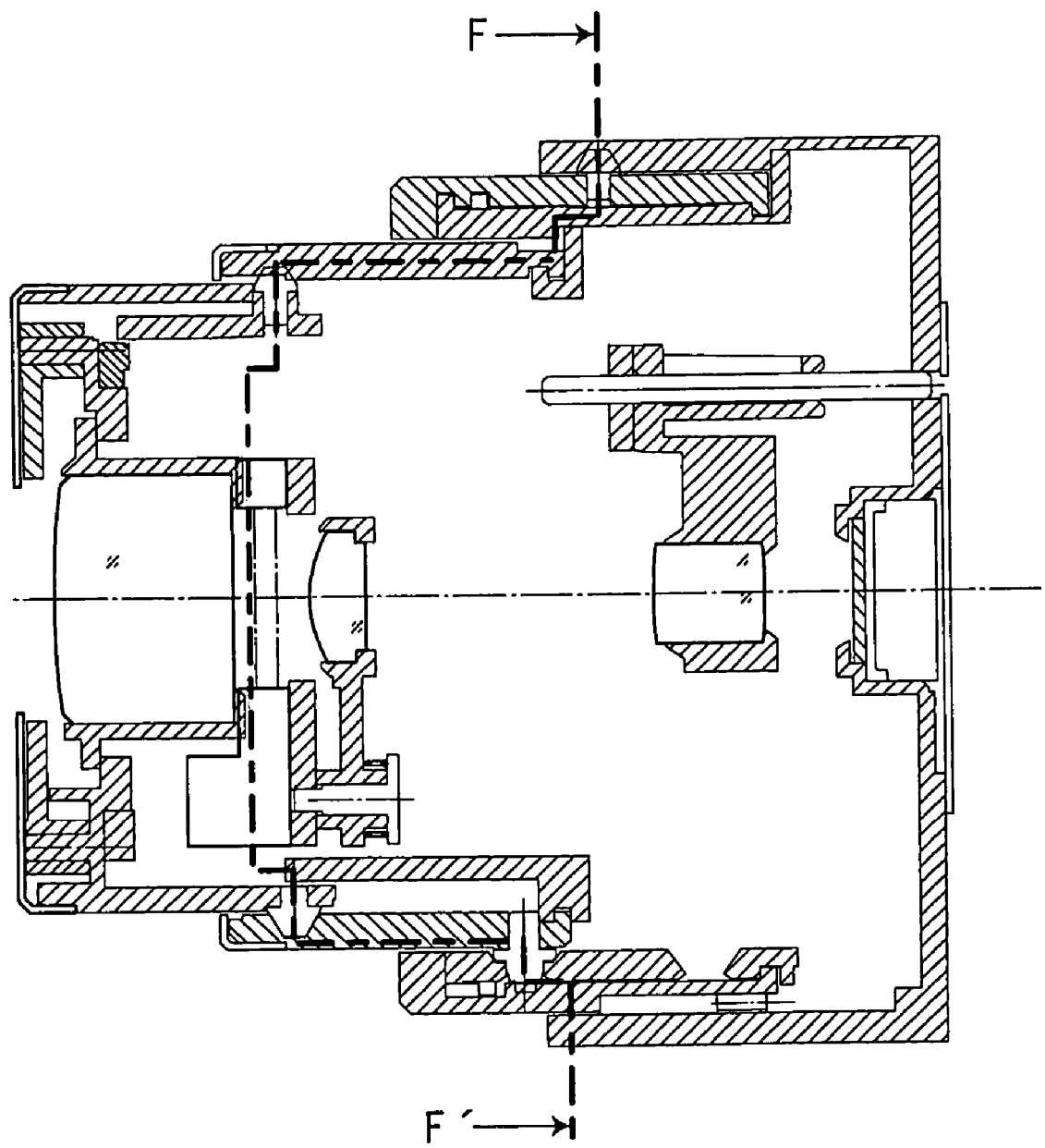
FIG. 8 is a cross-sectional view similar to FIG. 7 with the cutting-plane line F-F' additionally shown.
Figure 9:
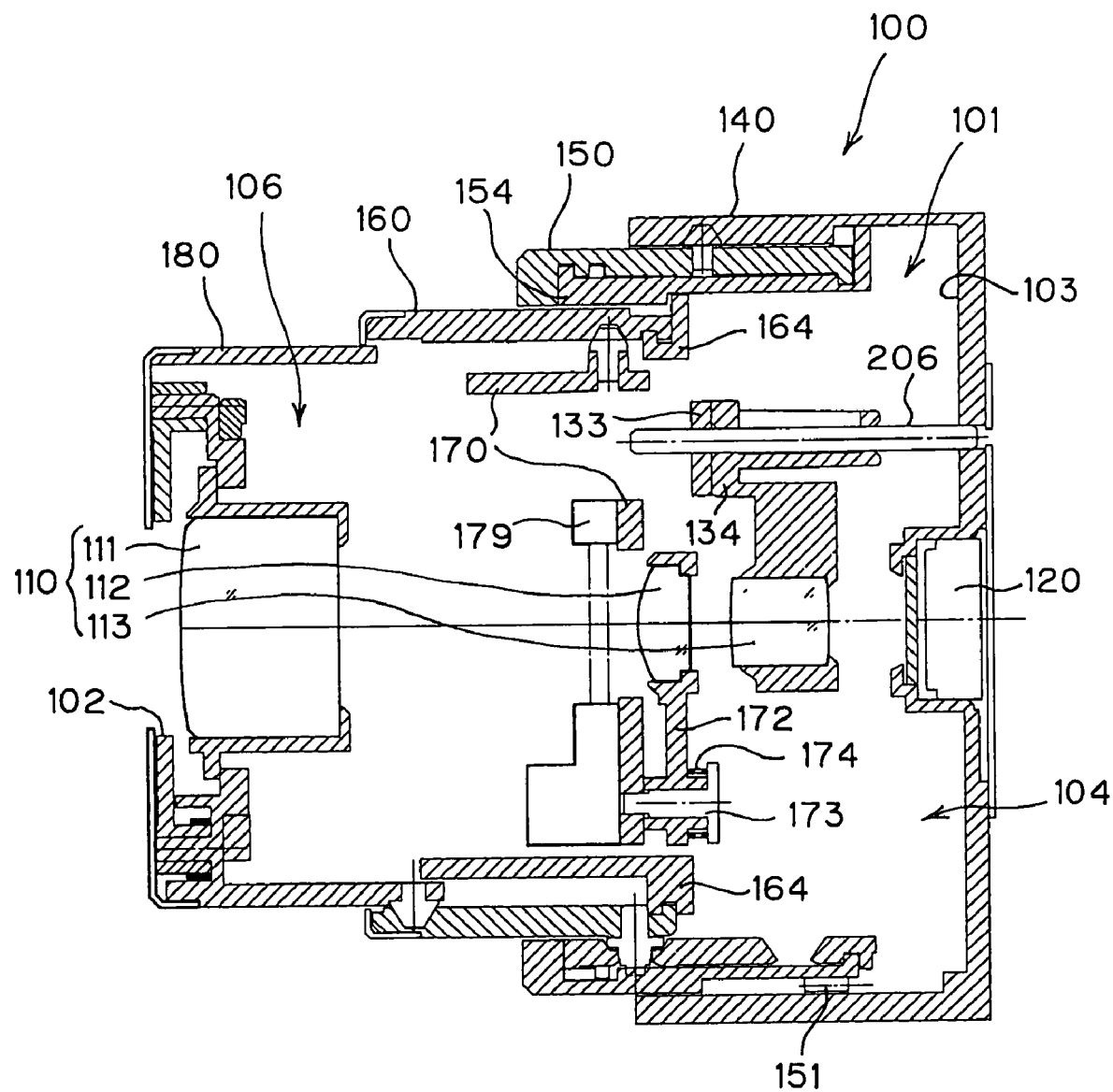
FIG. 9 is a cross-sectional view showing a wide-edge state with the minimum focal length taken along the cutting-plane line A-A' in FIG. 4.
Figure 10:
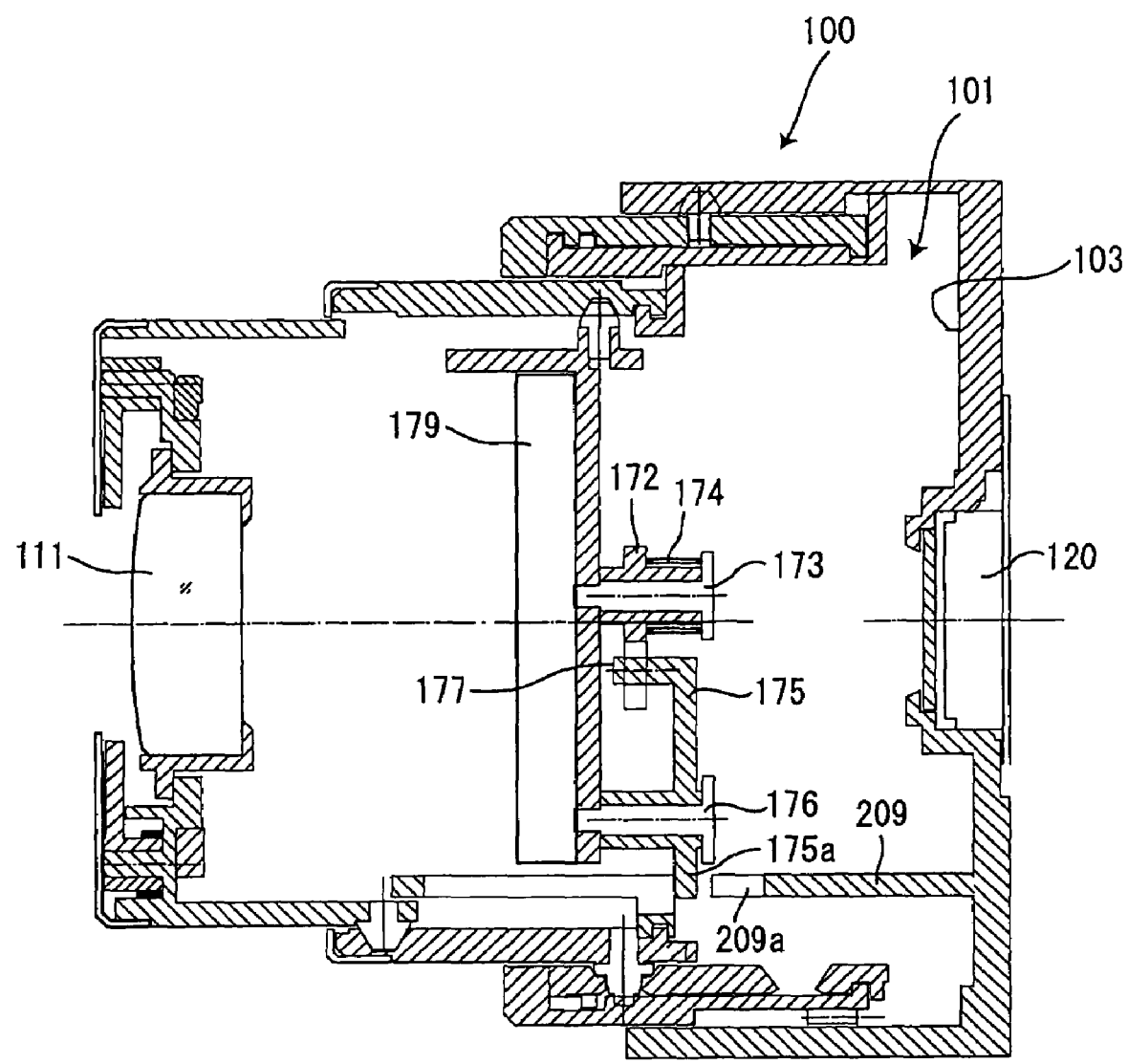
FIG. 10 is a cross-sectional view taken along the cutting-plane line G-G' in FIG. 6.
Figure 11:
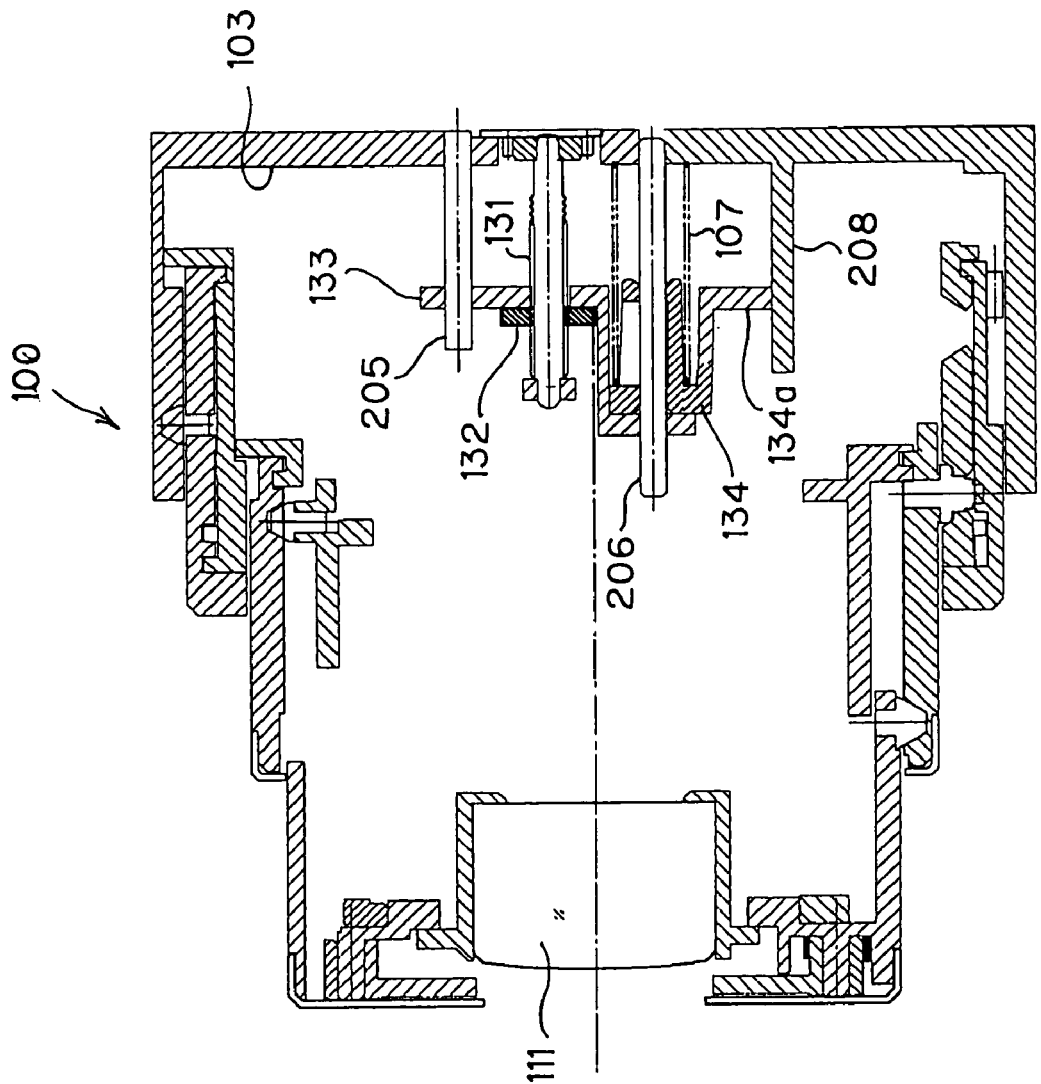
FIG. 11 is a cross-sectional view of essential components in the wide-edge state taken along the cutting-plane line D-D' in FIG. 5.
Figure 12:
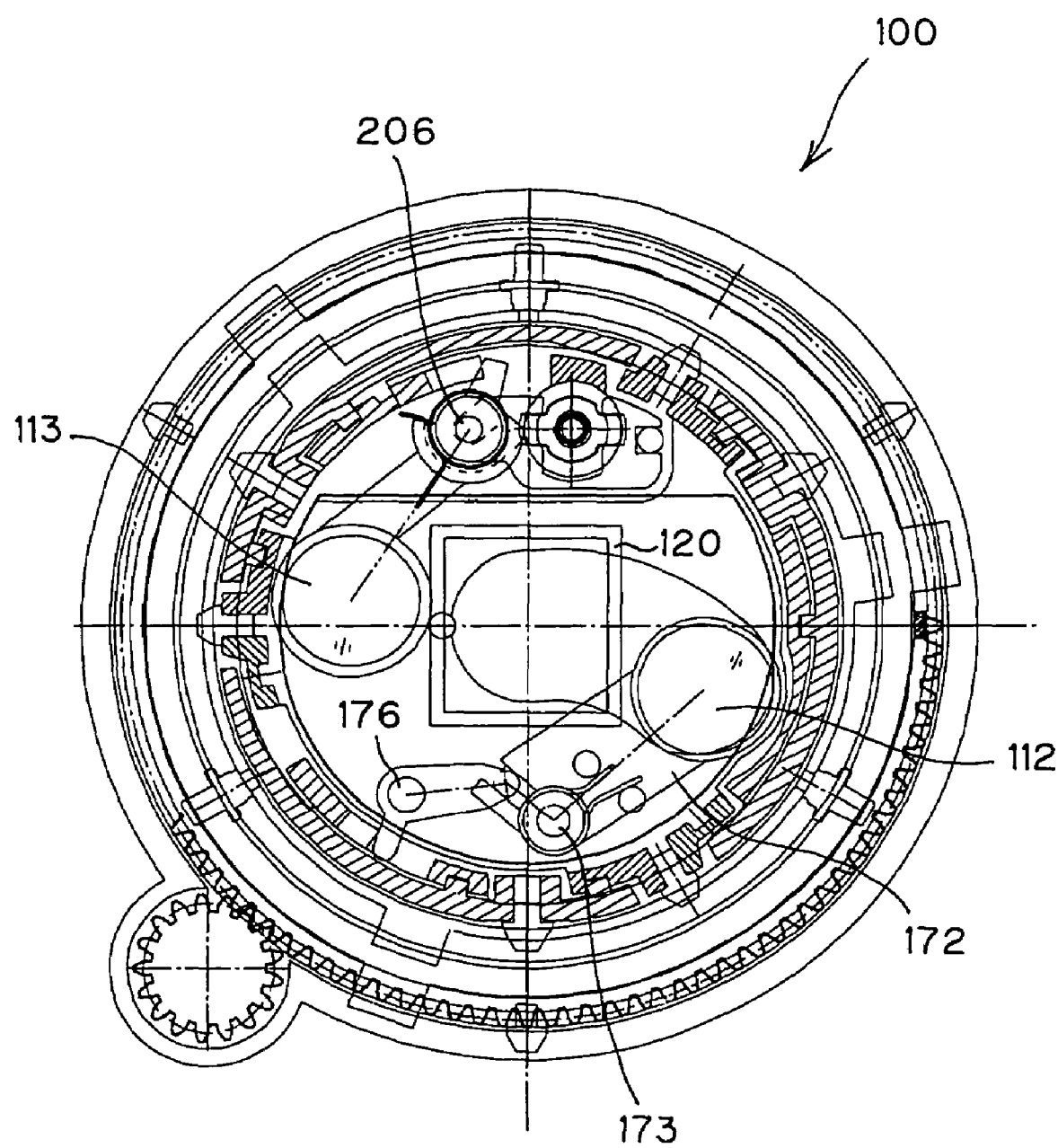
FIG. 12 is a schematic view of essential components of the lens barrel, in a collapsed state, of the digital camera according to the first embodiment, which are seen along the optical axis.
Figure 13:
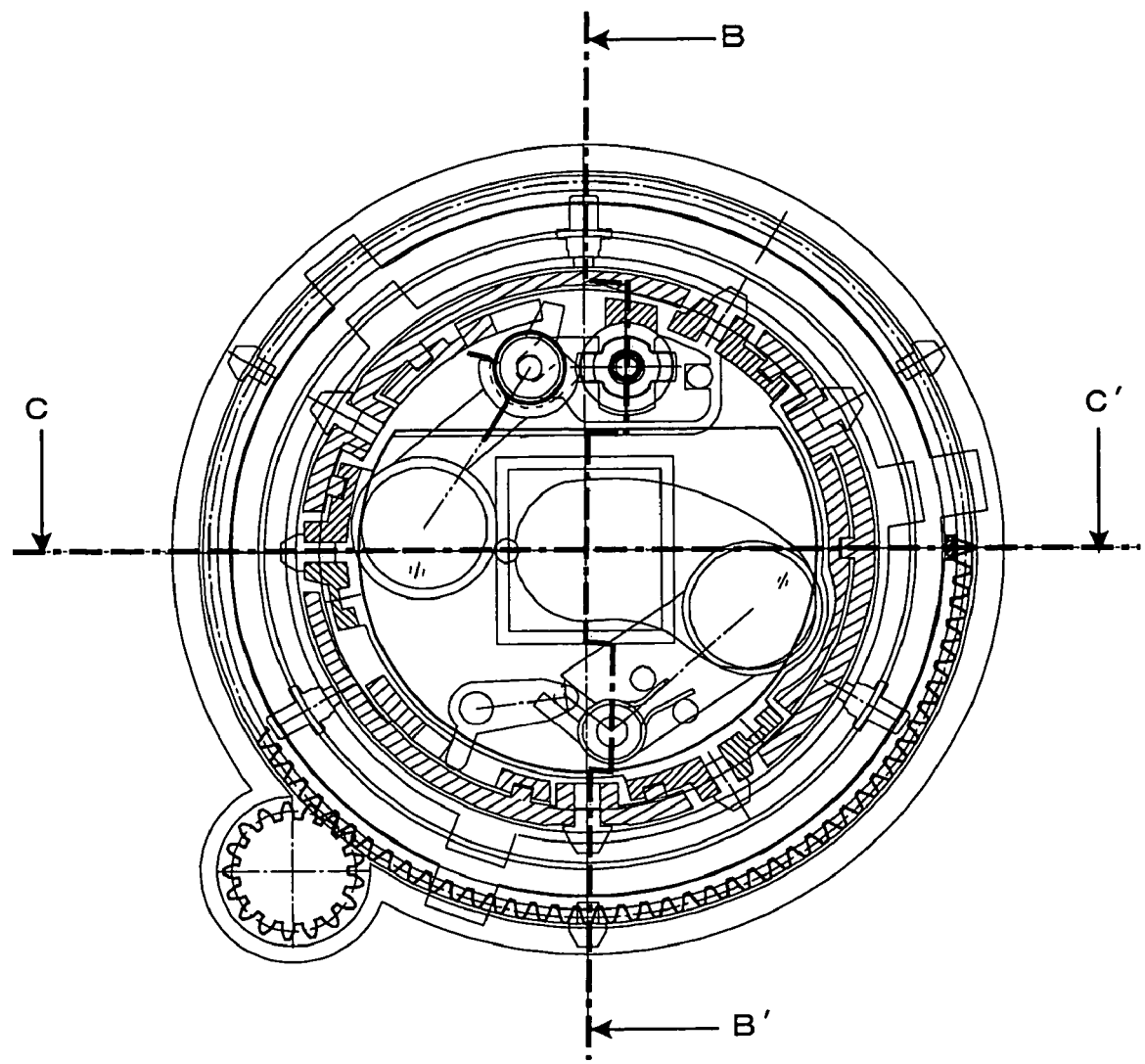
FIG. 13 is a cross-sectional view similar to FIG. 12 with the cutting-plane lines B-B' and C-C' additionally shown.
Figure 14:
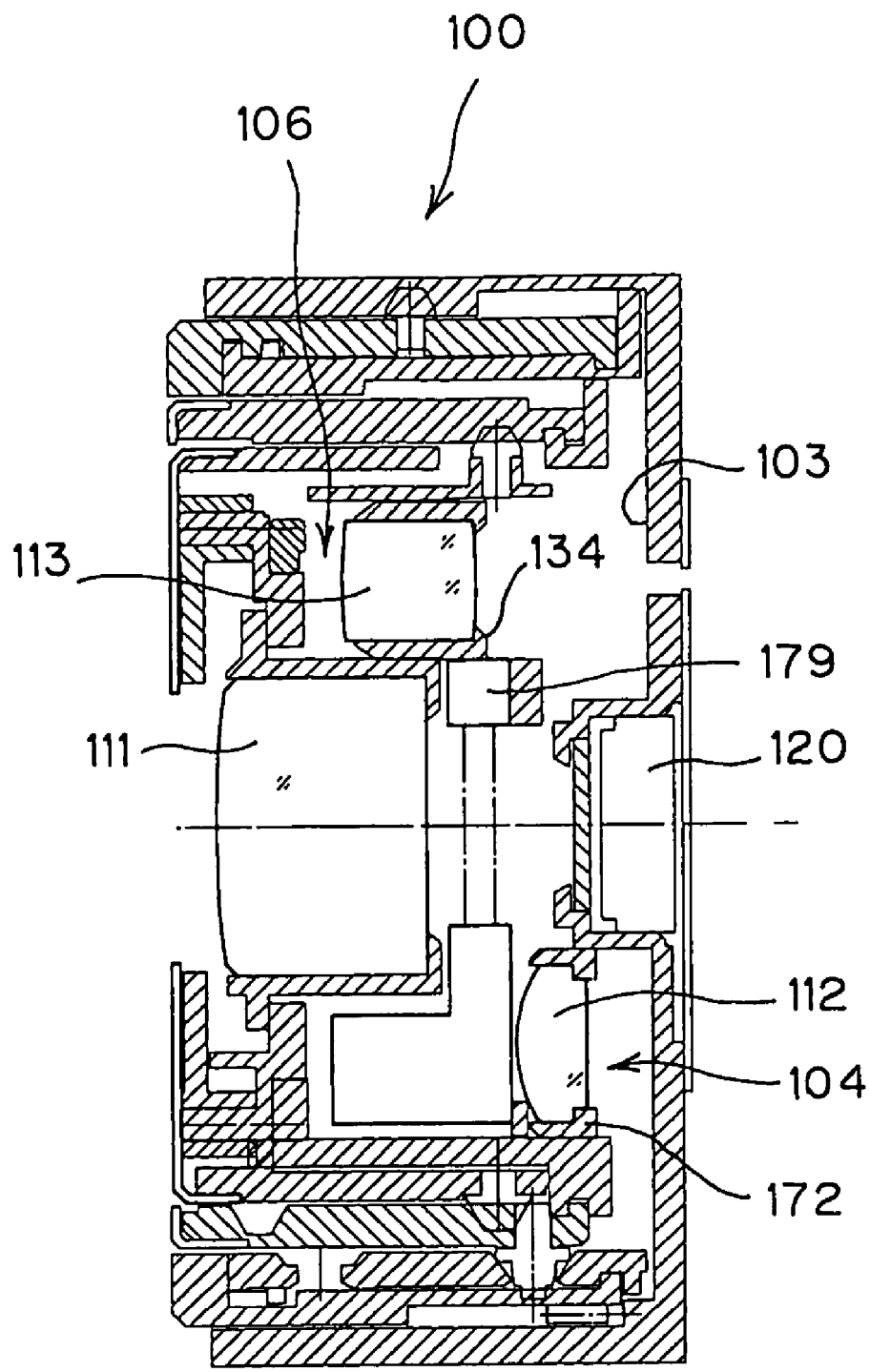
FIG. 14 is a cross-sectional view taken along the cutting-plane line C-C' in FIG. 13.
Figure 15:
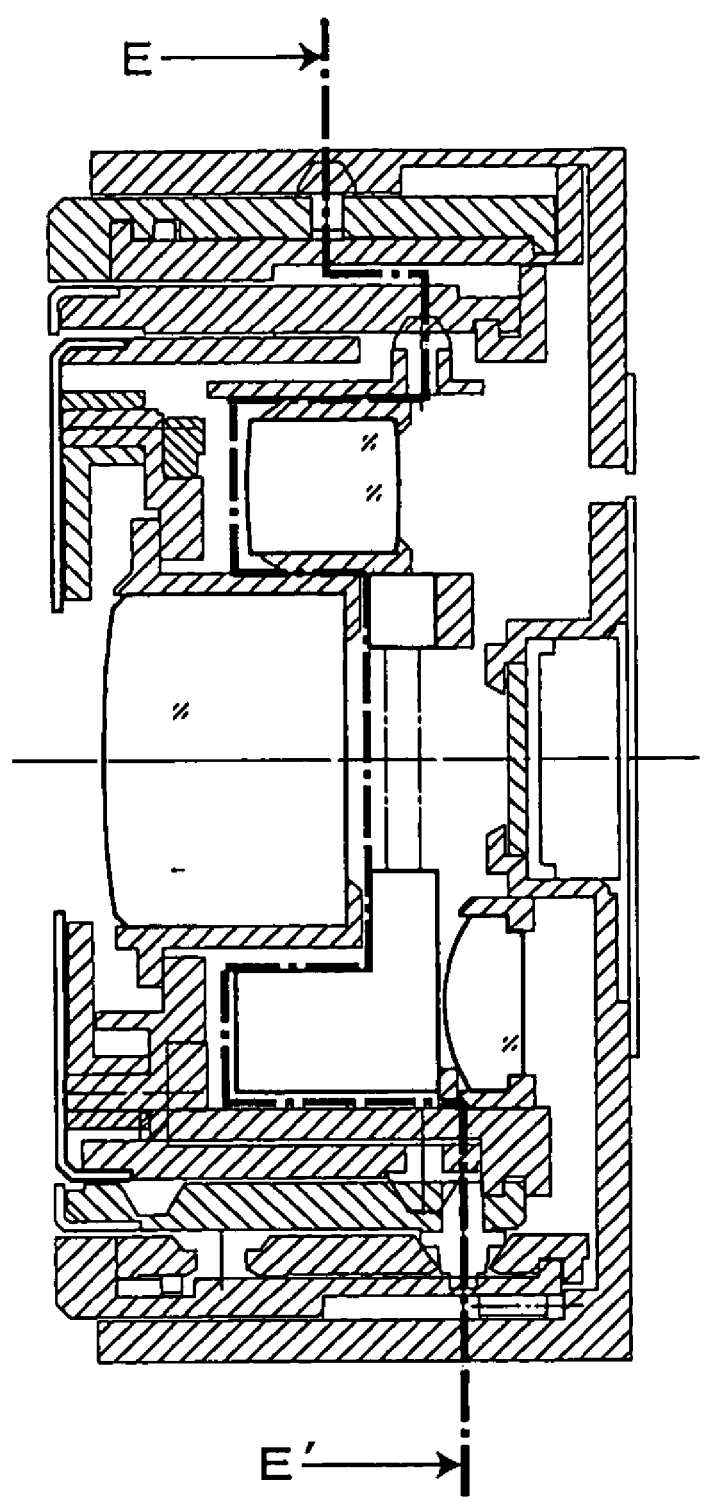
FIG. 15 is a cross-sectional view similar to FIG. 14 with the cutting-plane line E-E' additionally shown.
Figure 16:
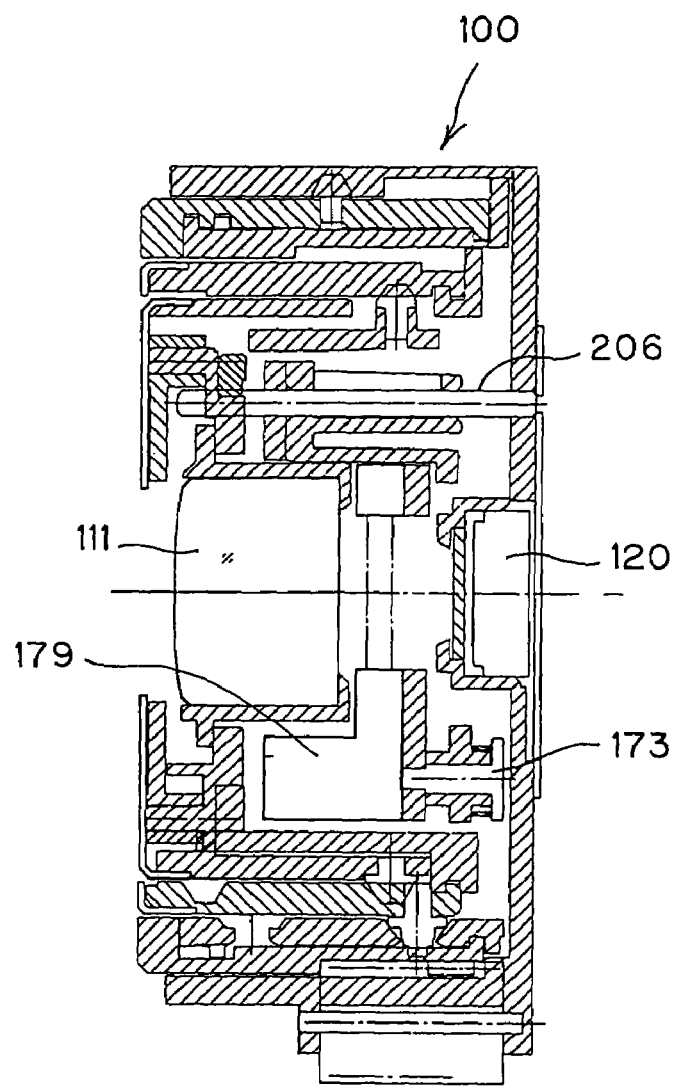
FIG. 16 is a cross-sectional view taken along the cutting-plane line B-B' in FIG. 13.

FIG. 3 is a schematic view of essential components of the lens barrel, in the extended state, of the digital camera according to the first embodiment of this invention shown in FIGS. 1 and 2, which are seen along the optical axis. FIG. 3 is a cross-sectional view taken along the cutting-plane line F-F' in FIG. 8 described later. FIG. 4 is a cross-sectional view similar to FIG. 3 with the cutting-plane line A-A' additionally shown. FIG. 5 is a cross-sectional view similar to FIG. 3 with the cutting-plane line D-D' additionally shown. FIG. 6 is a cross-sectional view similar to FIG. 3 with the cutting-plane line G-G' additionally shown. Similarly, to avoid the drawings from being complicated or obscured, drawings with reference numerals for illustration and drawings with cutting-plane lines are separately prepared. FIG. 7 is a cross-sectional view for illustrating a tele-edge state with the maximum focal length taken along the cutting-plane line A-A' in FIG. 4. FIG. 8 is a cross-sectional view similar to FIG. 7 with the cutting-plane line F-F' additionally shown. FIG. 9 is a cross-sectional view for illustrating a wide-edge state with the minimum focal length taken along the cutting-plane line A-A' in FIG. 4. FIG. 10 is a cross-sectional view taken along the cutting-plane line G-G' in FIG. 6. FIG. 11 is a cross-sectional view of essential components in the wide-edge state taken along the cutting-plane line D-D' in FIG. 5. FIG. 12 is a schematic view of essential components of the lens barrel, in the collapsed state, of the digital camera according to the first embodiment shown in FIGS. 1 to 11, which are seen along the optical axis. FIG. 12 is a cross-sectional view taken along the cutting-plane line E-E' in FIG. 15 described later. FIG. 13 is a cross-sectional view similar to FIG. 12 with the cutting-plane lines B-B' and C-C' additionally shown. FIG. 14 is a cross-sectional view taken along the cutting-plane line C-C' in FIG. 13. FIG. 15 is a cross-sectional view similar to FIG. 14 with the cutting-plane line E-E' additionally shown. FIG. 16 is a cross-sectional view taken along the cutting-plane line B-B' in FIG. 13.

The following description will be made primarily referring to FIG. 7 and additionally referring to the other drawings as required.

An inner space 101 of a lens barrel 100 shown in FIGS. 3 to 16 houses a three-group taking lens 110 consisting of a front lens group 111, a rear lens group 112 and focusing lens 113 arranged in this order from the front to the rear along the optical axis. The taking lens 110 has the focal length varied by the rear lens group 112 being displaced between the tele-edge shown in FIG. 7 and the wide-edge shown in FIG. 9, and the focus adjustment is achieved by the focusing lens 113 being displaced along the optical axis.

At the front end of the inner space, an opening 102 for the taking lens 110 to see the outside is formed, and at the rear end thereof, a wall member 103 which is fixed to the camera body or form a part of the camera body is disposed. The inner space 101 is defined by the wall member 103 and plural housings described later.

The front lens group 111 is held by a front group frame 180, which is one of the plural housings which has a minimum outer diameter and is located at the forefront along the optical axis when the lens barrel is extended. The outer diameter of the front lens group 111 is smaller than the inner diameter of the front group frame 180, and thus, a space is formed between the front lens group 111 and the front group frame 180. In the following description, this space formed between the front lens group 111 and the front group frame 180 is referred to as a front lens group side space 106.

To the wall member 103, a CCD solid-state image pickup element (abbreviated as a CCD, hereinafter) 120, which protrudes into the inner space 101, is attached. Since the CCD 120 protrudes into the inner space 101, a recess section 104 defined by the CCD 120 and the wall member 103 is formed at the side of the CCD 120.

In addition, the wall member 103 has a feed screw 131 (see FIG. 11) rotatably supported thereon, a nut member 132 shown in FIG. 11 is engaged with the feed screw 131, and a focusing lens guiding frame 133, which guides the focusing lens 113 along the optical axis, is fixed to the nut member 132. The focusing lens guiding frame 133 is fixed to the nut member 132, and a guide rod 205 protruding from the wall member 103 is fitted into a forked groove 133a (see FIG. 3) formed in the focusing lens guiding frame 133. Thus, the focusing lens guiding frame 133 moves along the optical axis when the feed screw 131 rotates.

In addition, the focusing lens guiding frame 133 has a focusing lens holding frame 134 for holding the focusing lens which is pivotally supported on a rotational shaft 206, and the focusing lens 113 is biased toward the taking lens 110 along the optical axis by a coil spring 107. The focusing lens holding frame 134 rotates within a range from a position where the focusing lens 113 held by the focusing lens holding frame 134 is advanced onto the optical axis of the taking lens 110 (see FIGS. 7 and 9) to a retracted position where the focusing lens 113 is retracted into the front lens group side space 106 (see FIG. 14).

A mechanism of how rotation of the focusing lens holding frame 134 causes the focusing lens 113 to rotate and be retracted into the retracted position provided in the front lens group side space 106 will be described later.

The feed screw 131 engaged with the nut member 132 having the focusing lens guiding frame 133 fixed thereto is rotationally driven by a focus motor (not shown) provided in the camera body. The rotation of the feed screw 131 causes the focusing lens guiding frame 133 fixed to the nut member 132 and the focusing lens holding frame 134 pivotally supported on the focusing lens guiding frame 133 to move toward the optical axis, and thus, the focusing lens 113 held by the focusing lens holding frame 134 moves toward the optical axis and is adjusted in position so that a focused object image is formed on the front surface of the CCD 120.

The wall member 103 has a fixed sleeve 140 secured thereto, and a rotatable sleeve 150 is provided in the fixed sleeve 140. The rotatable sleeve 150 has a geared outer surface 151 engaged with a pillar-shaped gear 105 (see FIG. 3). The pillar-shaped gear 105 is rotationally driven by a lens barrel drive motor (not shown) to cause rotatable sleeve 150 to rotate. In addition, the fixed sleeve 140 has a cam groove 141 formed in the inner wall thereof. A cam pin 152 fixed to the rotatable sleeve 150 is fitted into the cam groove 141, and thus, when a rotational driving force is applied to the rotatable sleeve 150 via the pillar-shaped gear 105, the rotatable sleeve 150 moves forward or rearward along the optical axis while rotating.

In the rotatable sleeve 150, a rotatable-sleeve-side rectilinearly-moving key ring 154 is provided in such a manner that it can relatively rotate with respect to the rotatable sleeve 150 but cannot relatively move with respect to the rotatable sleeve 150 along the optical axis. In addition, a key plate 155 is fixed to the rotatable-sleeve-side rectilinearly-moving key ring 154. The key plate 155 is fitted into a key groove 142 formed in the inner wall of the fixed sleeve 140 and extending along the optical axis, and thus, the rotatable-sleeve-side rectilinearly-moving key ring 154 is prevented from rotating in such a manner that it can move with respect to the fixed sleeve 140 along the optical axis. Therefore, when the rotatable sleeve 150 moves along the optical axis while rotating, the rotatable-sleeve-side rectilinearly-moving key ring 154 moves with the rotatable sleeve 150 along the optical axis but is prevented from rotating with respect to the fixed sleeve 140.

In addition, a rotatable intermediate sleeve 160 is provided in the rotatable sleeve 150. The rotatable sleeve 150 has a cam groove 156 formed in the inner wall thereof, and the rotatable-sleeve-side rectilinearly-moving key ring 154 has a cam groove 157 penetrating from the outer surface to the inner surface thereof. A cam pin 161 provided on the intermediate sleeve 160 is fitted into the cam groove 156 in the rotatable sleeve 150 through the cam groove 157 in the rotatable-sleeve-side rectilinearly-moving key ring 154. Thus, if the rotatable sleeve 150 moves along the optical axis while rotating, the intermediate sleeve 160 also moves along the optical axis with respect to the rotatable sleeve 150 while rotating in accordance with the shapes of the cam grooves in the rotatable sleeve 160 and rotatable-sleeve-side rectilinearly-moving key ring 154.

An intermediate-sleeve-side rectilinearly-moving key ring 164 is provided in the intermediate sleeve 160. The rotatable-sleeve-side rectilinearly-moving key ring 154 described above has a rectilinear key groove 158, and the intermediate-sleeve-side rectilinearly-moving key ring 164 is fitted into the rectilinear key groove 158 in the rotatable-sleeve-side rectilinearly-moving key ring 154. The intermediate-sleeve-side rectilinearly-moving key ring 164 can rotate relatively with respect to the intermediate sleeve 160 but is prevented from moving along the optical axis with respect to the intermediate sleeve 160. Thus, if the intermediate sleeve 160 moves along the optical axis with respect to the rotatable sleeve 150 while rotating, the intermediate-sleeve-side rectilinearly-moving key ring 164 moves rectilinearly, without rotating, along the optical axis with the intermediate sleeve 160 moving along the optical axis.

A cam groove 165 for guiding a rear group guiding frame 170 is provided in the inner wall of the intermediate sleeve 160. A cam pin 171 fixed to the rear group guiding frame 170 is fitted into the cam groove 165 in a state where the cam pin is prevented from rotating with respect to the intermediate-sleeve-side rectilinearly-moving key ring 164. Thus, when the intermediate sleeve 160 rotates, the rear group guiding frame 170 moves rectilinearly along the optical axis in accordance with the shape of the cam groove 165 in the inner wall of the intermediate sleeve 160.

Viewed along the optical axis, a shutter unit 179 is fixed to the front of the rear group guiding frame 170. The shutter unit 179 has both a diaphragm member for controlling the quantity of object light passing through the taking lens 110 and a shutter member for controlling the quantity of object light passing through the taking lens 110 by controlling the shutter speed. In addition, a rear group holding frame 172 for holding the rear lens group 112 is pivotally supported on the rear of the rear group guiding frame 170 via a rotation shaft 173 in such a manner that it can rotate about the rotation shaft 173 with respect to the rear group guiding frame 170. The rear group holding frame 172 rotates within a range from an in-use position where the rear lens group 112 held by the rear group holding frame 172 is advanced onto the optical axis of the taking lens 110 (see FIGS. 7 and 9) to a retracted position where the rear lens group 112 is retracted into the recess section 104 at the side of the CCD 120 (see FIG. 14). In addition, a coil spring 174 is provided around the rotation shaft 173, and the rear group holding frame 172 is biased by the coil spring 174 in the direction of the optical axis of the taking lens 110 and the direction in which the rear lens group 112 turns onto the optical axis.

A mechanism of how rotation of the rear group holding frame 172 causes the rear lens group 112 to rotate into the retracted position in the recess section 104 will be described later.

The intermediate sleeve 160 has another cam groove 166 for guiding the front group frame 180 holding the front lens group 111, and a cam pin 181 on the front group frame 180 is fitted into the cam groove 166. The front group frame 180 is attached to the intermediate-sleeve-side rectilinearly-moving key ring 164 in such a manner that the front group frame can move along the optical axis but is prevented from rotating. Thus, when the intermediate sleeve 160 rotates, the front group frame 180 moves rectilinearly with respect to the intermediate sleeve 160 along the optical axis in accordance with the shape of the cam groove 166.

With such a mechanism, if a rotational driving force to collapse the lens barrel is transmitted to the rotational sleeve 150 via the pillar-shaped gear 105 in the tele-edge state shown in FIG. 7, the lens barrel is collapsed from the tele-edge state in FIG. 7 to a state shown in FIGS. 14 and 16 via the wide-edge state shown in FIG. 9. On the other hand, if a rotational driving force to extend the lens barrel is transmitted to the rotational sleeve 150 in the collapsed state shown in FIGS. 14 and 16, the lens barrel is extended from the collapsed state in FIGS. 14 and 16 to the wide-edge state shown in FIG. 9 and then to the tele-edge state shown in FIG. 7.

When taking a picture, the zoom manipulation switches mentioned earlier is manipulated to adjust the focal length between the tele-edge shown in FIG. 7 and the wide-edge shown in FIG. 9, thereby setting a desired angle of view. The focusing lens 113 is adjusted to focus on a point where the maximum contrast is achieved, based on contrast detection using image signals provided by the CCD 120. Then, upon pressing of the shutter button, the CCD 120 generates image signals representing the object at that time and records the signals after appropriate image processing.

Now, a mechanism of how the focusing lens 113 is turned into the retracted position in the front lens group side space 106 when the lens barrel is collapsed.

The focusing lens holding frame 134 holding the focusing lens 113 is rotatably pivotally supported on the focusing lens guiding frame 133 via the rotation shaft 206, and the focusing lens 113 is biased toward the optical axis of the taking lens 110 by the coil spring 107 (see FIG. 11), as described above.

As shown in FIG. 11, the wall member 103 constituting the rear surface of the inner space 101 of the lens barrel 100 has a protrusion 208 which protrudes into the inner space 101 and is located in a trajectory which an engaging part 134a of the focusing lens holding member 134 follows when collapsing the lens barrel.

Figure 17:
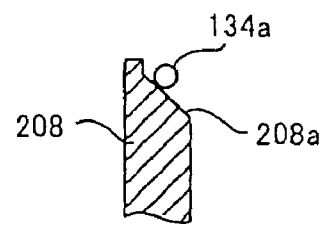
FIG. 17 is a schematic view of a protrusion on a wall member and an engaging part of a focusing lens holding member viewed from a direction orthogonal to the direction in FIG. 11.

FIG. 17 is a schematic view of the protrusion on the wall member and the engaging part of the focusing lens holding member viewed from a direction orthogonal to the direction in FIG. 11.

The protrusion 208 on the wall member has a tapered surface 208a which engages with the engaging part 134a of the focusing lens holding member as shown in FIG. 17. Thus, when the feed screw 131 rotates to bring the focusing lens 113 close to the CCD 120, the engaging part 134a of the focusing lens holding member 134 comes into contact with the tapered surface 208a of the protrusion 208 and moves along the tapered surface 208a. This allows the focusing lens holding member 134 to rotate about the rotation shaft 206, and thus, the focusing lens 113 held by the focusing lens holding member 134 rotates out of the optical axis of the taking lens 110 into the retracted position in the front lens group side space 106 (see FIG. 14).

When the lens barrel moves from the collapsed state shown in FIGS. 14 and 16, the protrusion 208 on the wall member 103 is disengaged from the focusing lens holding member 134, and the focusing lens holding member 134 is rotated from the state shown in FIG. 12 to the state shown in FIG. 3 by the biasing force of the coil spring 107. Thus, the focusing lens 113 rotates from the retracted position in the front lens group side space 106 shown in FIG. 14 onto the optical axis.

Now, a mechanism for rotating the rear lens group 112 into the retracted position in the recess section 104 when the lens barrel is collapsed will be described. The mechanism for rotating the rear lens group 112 into the retracted position is similar to the mechanism for rotating the focusing lens 113 into the retracted position described above.

As described above, the rear group holding frame 172 for holding the rear lens group 112 is rotatably pivotally supported on the rear group guiding frame 170 via the rotation shaft 173, and the rear lens group 112 is biased by the coil spring 174 (see FIG. 3) toward the optical axis of the taking lens 110. On the rear group guiding frame 170, a lever member 175 shown in FIGS. 3 and 10 or the like is also rotatably pivotally supported via the rotation shaft 176. The rear group holding frame 172 has a fork-shaped engaging groove 178 as shown in FIG. 3, and an engaging pin 177 formed on one end of the lever member 175 is fitted into the engaging groove 178.

As shown in FIG. 10, the wall member 103 constituting the rear surface of the inner space 101 of the lens barrel 100 has a protrusion 209 which protrudes into the inner space 101 and is located in a trajectory which an end 175a of the lever member 175, which is opposite to the end having the engaging pin 177, follows when collapsing the lens barrel. The protrusion 209 has a tapered surface 209a toward the tip thereof. Thus, when the rotatable sleeve 150 rotates in a lens-barrel-collapsing direction, the intermediate sleeve 160 and the rear group guiding frame 170 cam-engaged with the intermediate sleeve 160 also move in the lens-barrel-collapsing direction, the end 175a of the lever member 175 comes into contact with the tapered surface 209a of the protrusion 209 and moves along the tapered surface 209a, and thus, the lever member 175 rotates from a rotational position shown in FIG. 3 to a rotation position shown in FIG. 12. Then, since the engaging pin 177 of the lever member 175 is fitted into the fork-shaped engaging groove 178 in the rear group holding frame 172, the rear group holding frame 172 also rotates about the rotation shaft 173, causing the rear lens group 112 to rotate from a position on the optical axis shown in FIG. 3 to the retracted position shifted from the optical axis shown in FIG. 12. As shown in FIG. 14, the retracted position is constituted by the recess section 104 formed at the side of the CCD 120.

When the lens barrel is extended from the collapsed state shown in FIGS. 14 and 16, the protrusion 209 extending from the wall member 103 shown in FIG. 10 is disengaged from the lever member 175, the rear group holding frame 172 is rotated from the state shown in FIG. 12 to the state shown in FIG. 3 by the biasing force of the coil spring 174, and thus, the rear lens group 112 rotates from the retracted position shown in FIG. 14 to a position on the optical axis.

According to the first embodiment, as described above, when the lens barrel is collapsed, the focusing lens 113 is retracted in the front lens group side space 106, and the rear lens group 112 is retracted in the recess section 104 at the side of the CCD 120. The front lens group side space 106 and the recess section 104 tend to be dead spaces in a digital camera with a conventional collapsing and extending mechanism, which has no mechanism for retracting the taking lens from the optical axis so that the lens barrel is collapsed with the taking lens being placed on the optical axis. However, according to this embodiment, since both the focusing lens 113 and the rear lens group 112 are removed from the optical axis and retracted into the front lens group side space 106 and the recess section 104, respectively, the front lens group side space 106 and the recess section 104 can be effectively used, and thus, the digital camera can be thinner than conventional.

Figure 18:
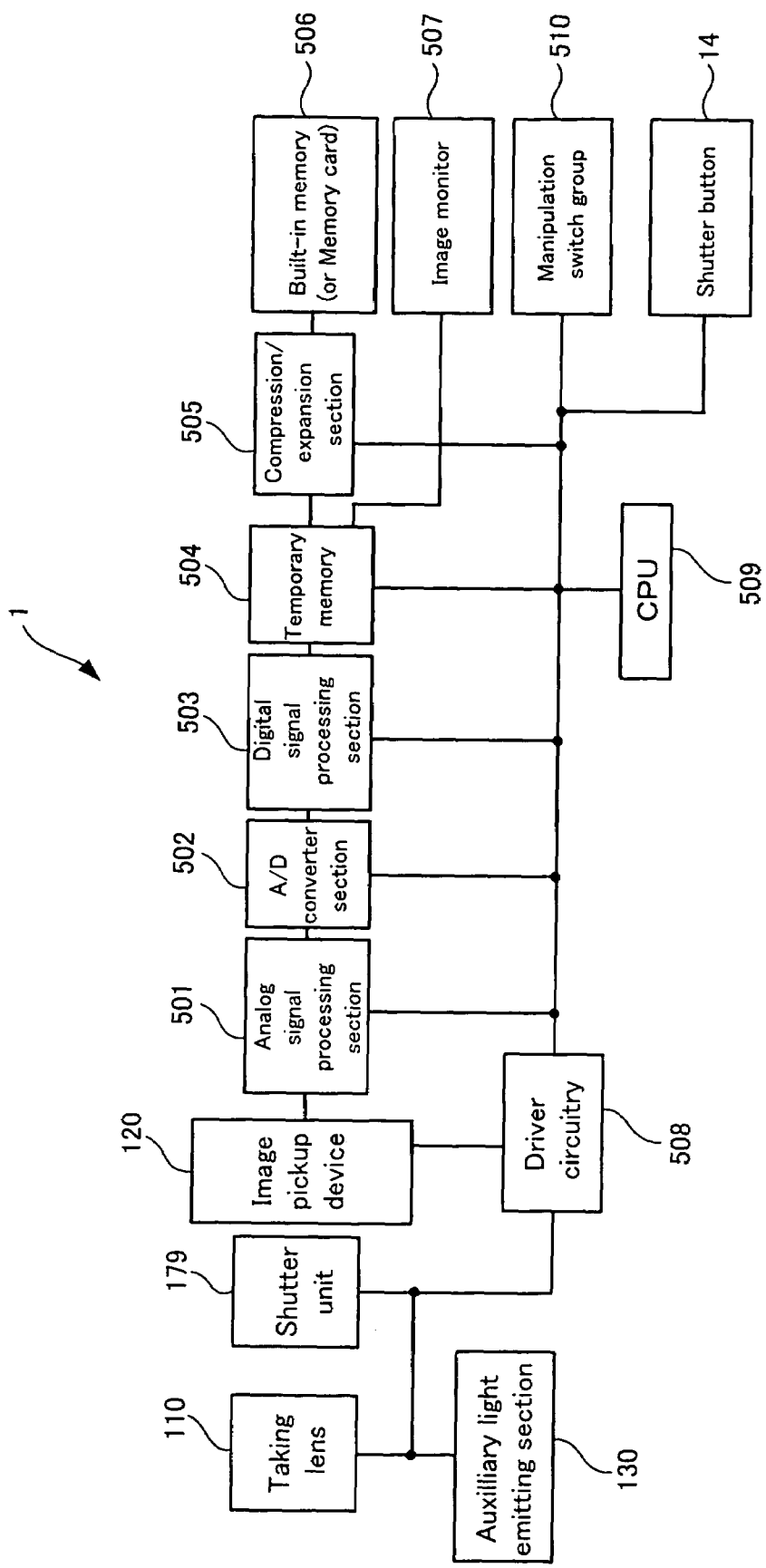
FIG. 18 is a block diagram showing a circuit arrangement of the digital camera shown in FIGS. 1 to 16.

FIG. 18 is a block diagram showing a circuit arrangement of the digital camera shown in FIGS. 1 to 16.

The digital camera 1 has the taking lens 110, the shutter unit 179 and the CCD image pickup device 120 described above. An object image formed on the CCD image pickup device 120 via the taking lens 110 and the shutter unit 179 is converted into an analog image signal by the CCD image pickup device 120. The shutter unit 179 serves to suppress occurrence of a smear due to light when reading the analog signal from the CCD image pickup device 120.

An auxiliary light emitting section 130 is additionally provided, which emits auxiliary light when the illuminance is low. The auxiliary light emitting section 130 may emit light as required, even if the illuminance is not low.

The digital camera 1 further has an analog signal processing section 501, an A/D converter section 502, a digital signal processing section 503, a temporary memory 504, a compression/expansion section 505, a built-in memory (or a memory card) 506, an image monitor 507 and a driver circuitry 508. The CCD image pickup device 120 is driven at the timing generated by a timing generator circuit (not shown) in the driver circuitry 508 and outputs an analog image signal. In addition, the driver circuitry 508 has driver circuits for driving the taking lens 110, the shutter unit 179, the auxiliary light emitting section 130 or the like. The analog image signal output from the CCD image pickup device 120 is subjected to an analog signal processing in the analog signal processing section 501, A/D-converted in the A/D converter section 502 and then subjected to a digital signal processing in the digital signal processing section 503. The data representing the digital-processed signal is temporarily stored in the temporary memory 504. The data stored in the temporary memory 504 is compressed in the compression/expansion section 505, and the compressed data is recorded in the built-in memory (or memory card) 506. Depending on the picture-taking mode, the compression step may be omitted and the data may be directly recorded in the built-in memory 506. The data stored in the temporary memory 504 is read out and transmitted to the image monitor 507. In this way, the object image is displayed on the image monitor 507.

Furthermore, the digital camera 1 has a CPU 509 for controlling the whole digital camera 1, a group of switches 510 including the zoom manipulation switches and the shutter button 14. Picture taking is achieved by manipulating the group of switches 510 to set desired picture-taking conditions including a desired angle of view and pressing the shutter button 14.

Now, a second embodiment of the present invention will be described. In the second embodiment described below, the appearance and schematic circuit arrangement of the digital camera is substantially the same as the appearance (see FIGS. 1 an 2) and schematic circuit arrangement (see FIG. 18) according to the first embodiment described above, and any slight difference does not affect explanation of the characteristic parts of the present invention. Thus, illustration and description thereof will be omitted, and only the arrangement of the lens barrel will be described. In addition, in the description of the lens barrel, components serving the same as those in the first embodiment are assigned the same reference numerals as those shown in the drawings concerning in the first embodiment (FIGS. 3 to 16), and only differences therebetween will be described.

Figure 19:
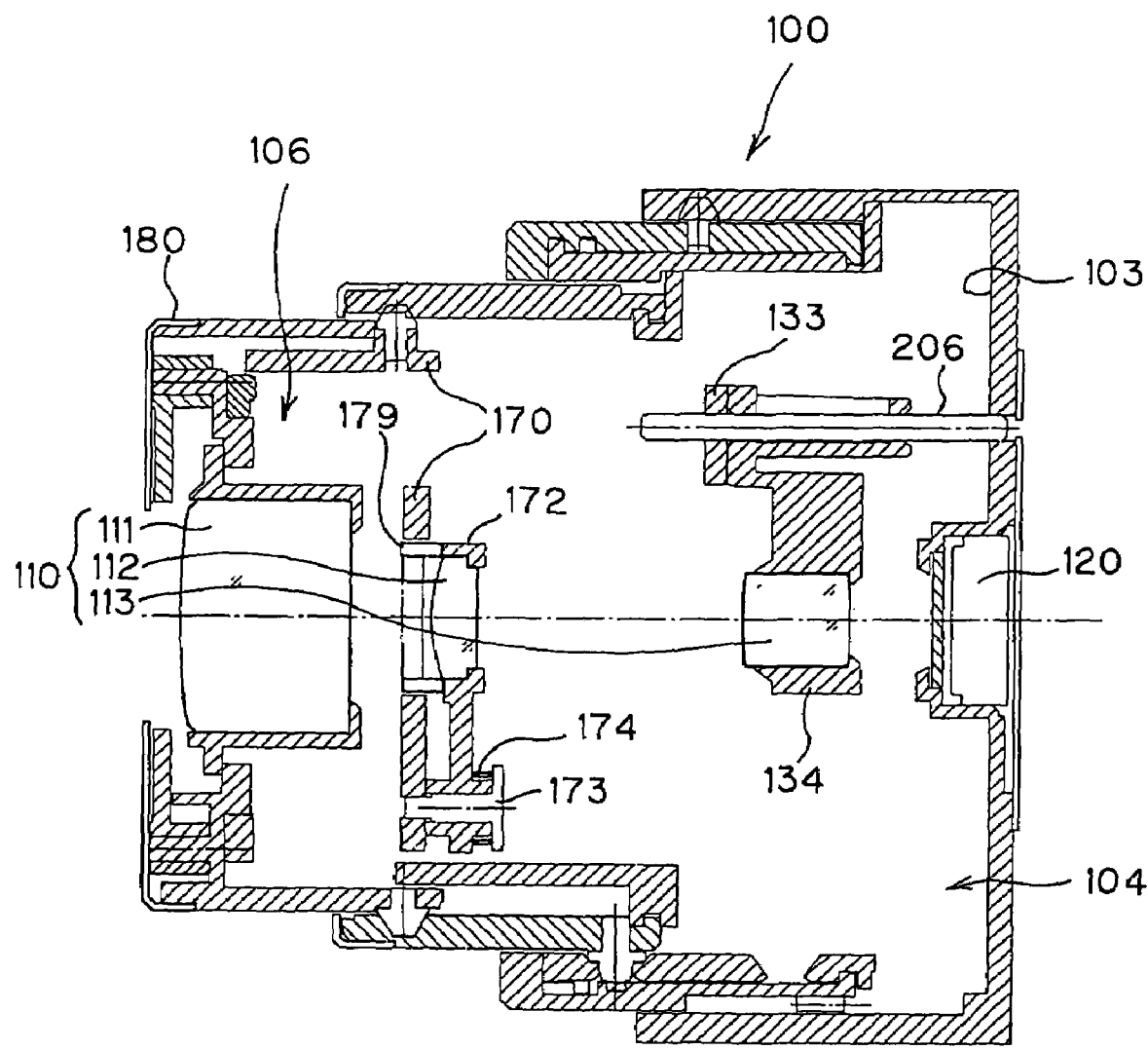
FIG. 19 is a cross-sectional view of a digital camera according to a second embodiment of the present invention in the tele-edge state with the maximum focal length, which is taken along the optical axis.
Figure 20:
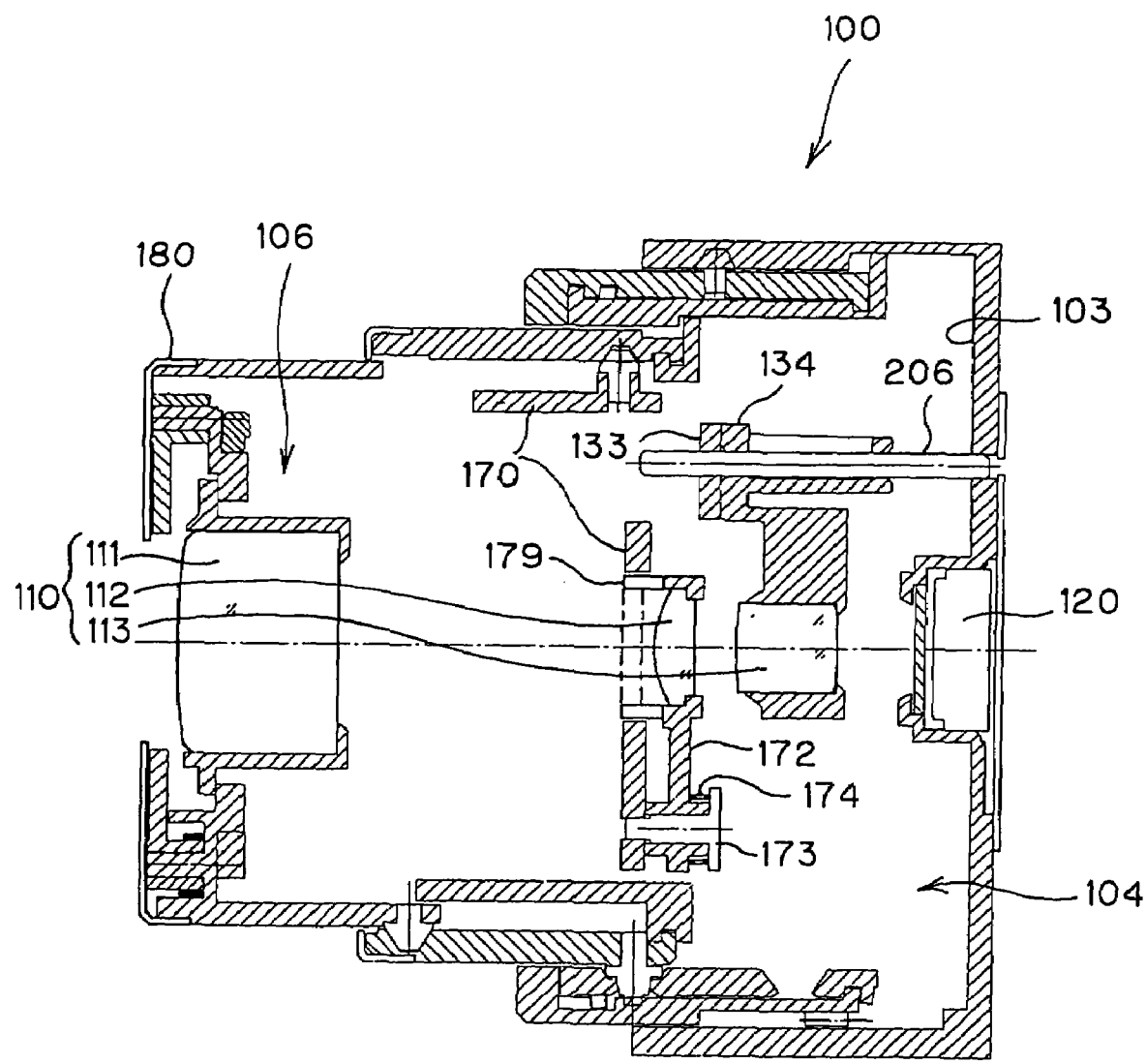
FIG. 20 is a cross-sectional view of the digital camera according to the second embodiment of the present invention in the wide-edge state with the minimum focal length, which is taken along the optical axis.
Figure 21:
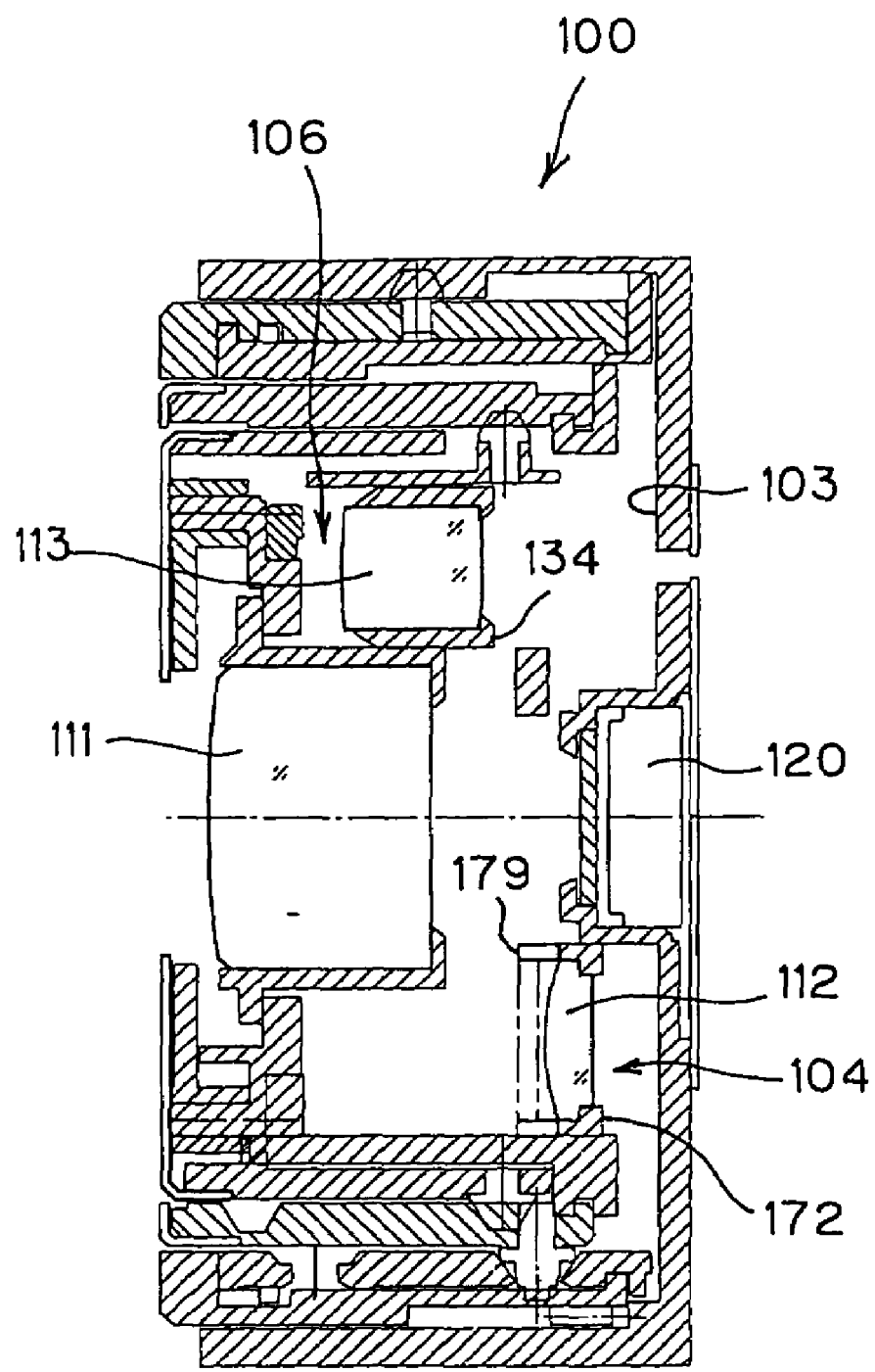
FIG. 21 is a cross-sectional view of the digital camera according to the second embodiment of the present invention in a collapsed state, which is taken along the optical axis.

FIG. 19 is a cross-sectional view of the digital camera according to the second embodiment of the present invention in the tele-edge state with the maximum focal length, which is taken along the optical axis. FIG. 20 is a cross-sectional view of the digital camera according to the second embodiment, which is the same as that shown in FIG. 19 but in the wide-edge state with the minimum focal length, which is taken along the optical axis. FIG. 21 is a cross-sectional view of the digital camera according to the second embodiment, which is the same as that shown in FIGS. 19 and 20 but in the collapsed state, which is taken along the optical axis.

FIGS. 19, 20 and 21 correspond to FIGS. 7, 9 and 14 concerning the first embodiment, respectively. The second embodiment differs from the first embodiment in that the shutter unit 179 is fixed to the rear group holding frame 172 in the second embodiment, while it is fixed to the rear group guiding frame 170 in the first embodiment. The shutter unit 179 is fixed to the rear group holding frame 172 and disposed in front of the rear lens group 112. The shutter unit 179 is to control the quantity of light using an electrooptic element, such as a liquid crystal or PLZT (polarizing plate) and incorporates both a diaphragm for controlling the quantity of light passing therethrough by controlling the aperture and a shutter for controlling the quantity of light passing therethrough by controlling the shutter speed.

Since the shutter unit 179 is fixed to the rear group holding frame 172 holding the rear lens group 112, the shutter unit 179 is retracted in the recess section 104 along with the rear lens group 112 as shown in FIG. 21 when the lens barrel is collapsed, and is advanced onto the optical axis along with the rear lens group 112 as shown in FIGS. 19 and 20 when the lens barrel is extended.

The mechanism of the retraction and advancement involved with the collapse and extension of the lens barrel is the same as that in the first embodiment described above, and redundancy of illustration and description thereof will be omitted.

As described above, according to the present invention, the shutter unit may be retracted and advanced along with the rear lens group in response to collapse and extension of the lens barrel.

Now, a third embodiment will be described.

Figure 22:
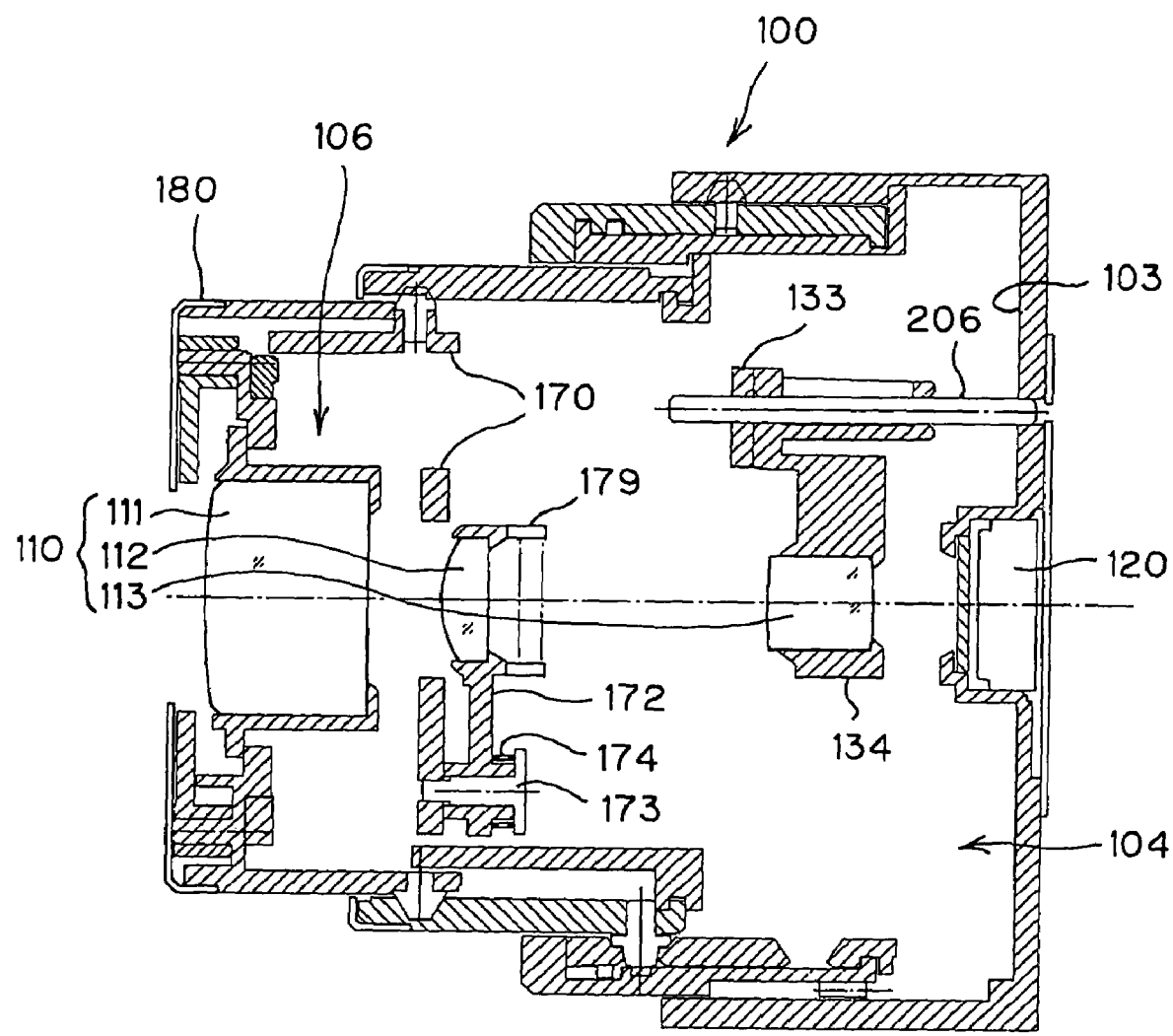
FIG. 22 is a cross-sectional view of a digital camera according to a third embodiment of the present invention in the tele-edge state with the maximum focal length, which is taken along the optical axis.
Figure 23:
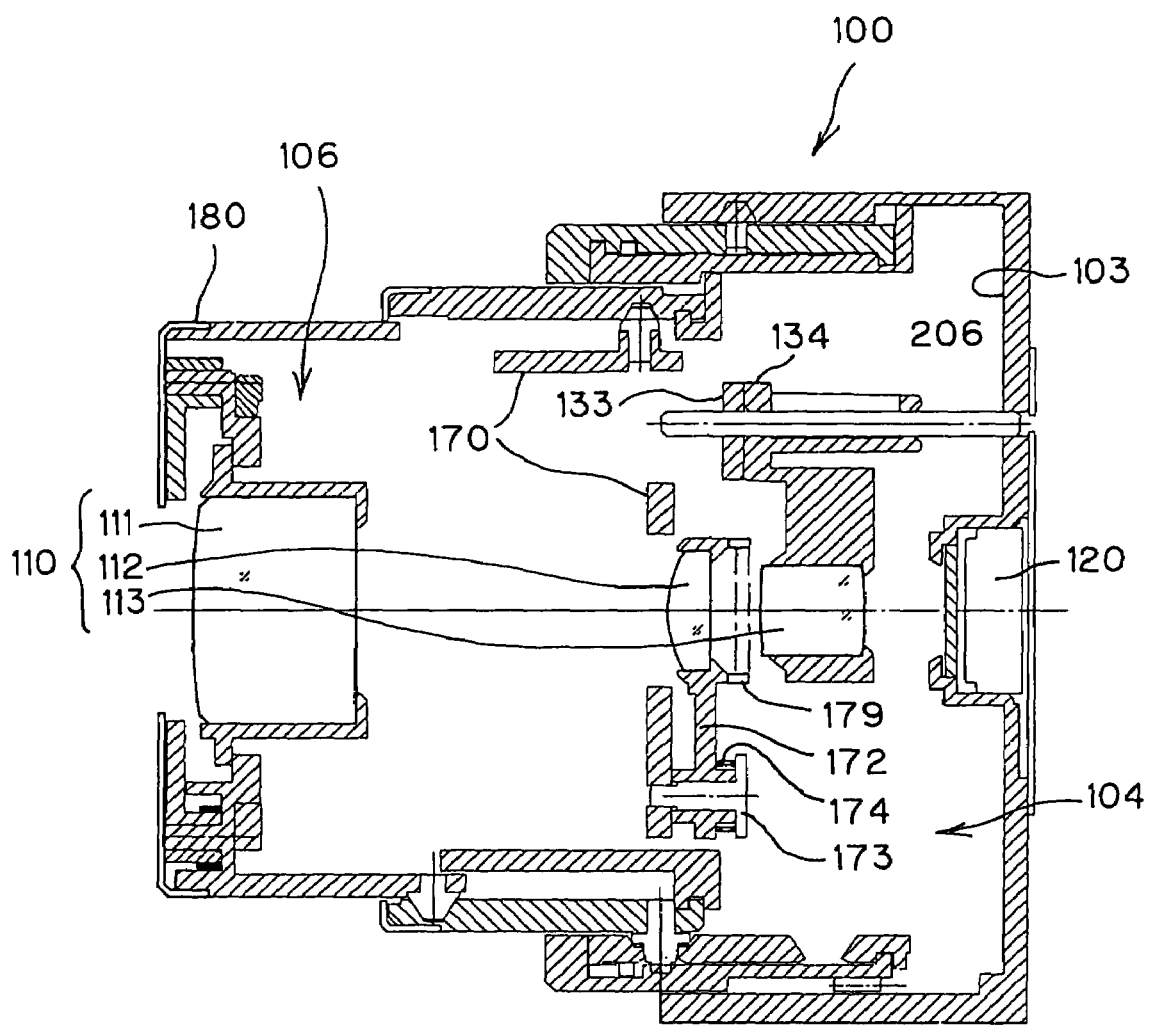
FIG. 23 is a cross-sectional view of the digital camera according to the third embodiment of the present invention in the wide-edge state with the minimum focal length, which is taken along the optical axis.
Figure 24:
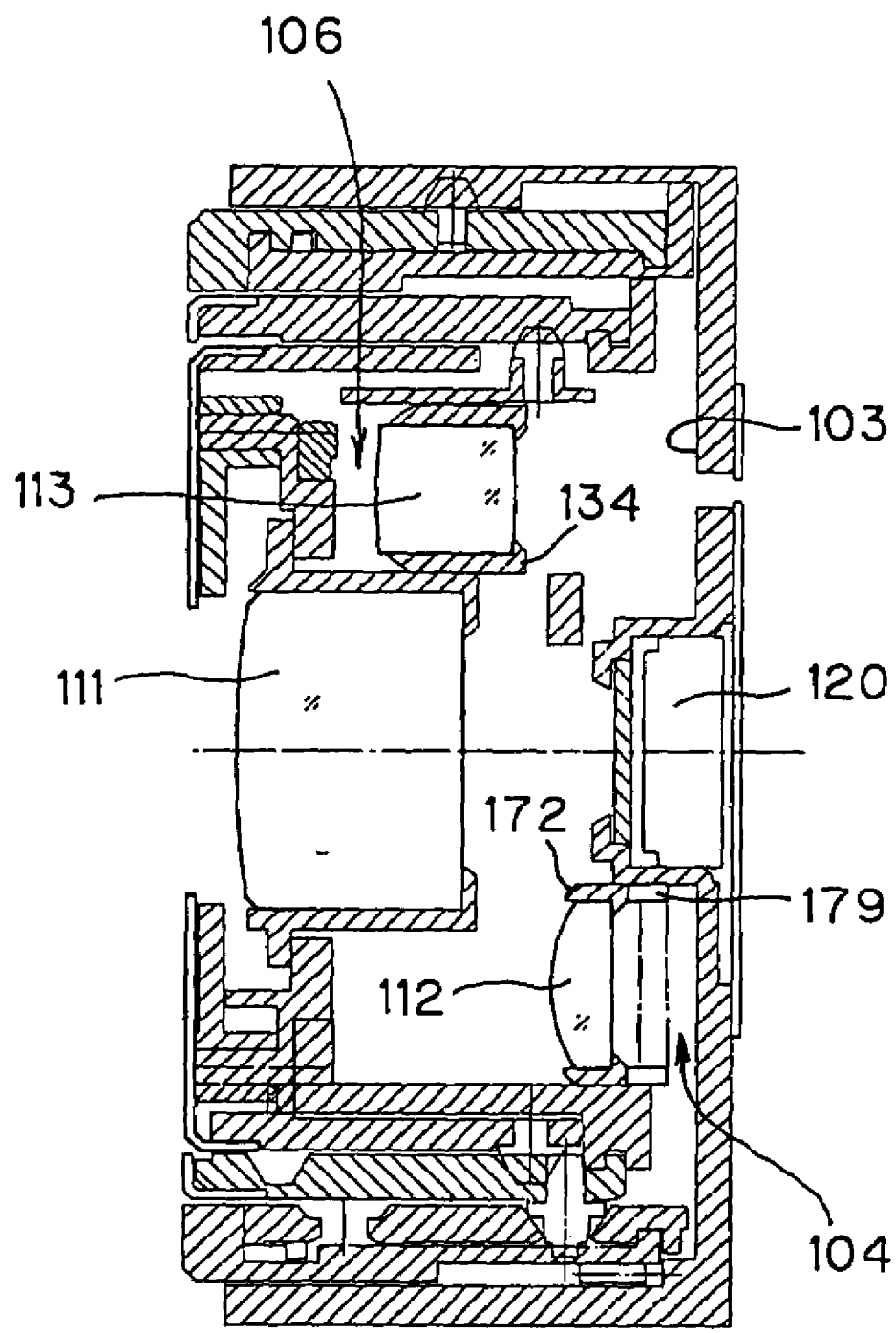
FIG. 24 is a cross-sectional view of the digital camera according to the third embodiment of the present invention in the collapsed state, which is taken along the optical axis.

FIG. 22 is a cross-sectional view of the digital camera according to the third embodiment of the present invention in the tele-edge state with the maximum focal length, which is taken along the optical axis. FIG. 23 is a cross-sectional view of the digital camera according to the third embodiment, which is the same as that shown in FIG. 22, in the wide-edge state with the minimum focal length, which is taken along the optical axis. FIG. 24 is a cross-sectional view of the digital camera according to the third embodiment, which is the same as those shown in FIGS. 22 and 23, in the collapsed state, which is taken along the optical axis.

FIGS. 22, 23 and 24 correspond to FIGS. 7, 9 and 14 concerning the first embodiment, respectively. As in the second embodiment described above, the third embodiment differs from the first embodiment in that the shutter unit 179 is fixed to the rear group holding frame 172 in the third embodiment, while it is fixed to the rear group guiding frame 170 in the first embodiment. However, while the shutter unit 179 is disposed in front of the rear lens group 112 in the second embodiment, the shutter unit 179 is disposed at the back of the rear lens group 112 in the third embodiment. As in the second embodiment, the shutter unit 179 is to control the quantity of light using an electrooptic element, such as a liquid crystal or PLZT (polarizing plate) and incorporates both a diaphragm for controlling the quantity of light passing therethrough by controlling the aperture and a shutter for controlling the quantity of light passing therethrough by controlling the shutter speed.

Since the shutter unit 179 is fixed to the rear group holding frame 172 holding the rear lens group 112, the shutter unit 179 is retracted in the recess section 104 along with the rear lens group 112 as shown in FIG. 24 when the lens barrel is collapsed, and is advanced onto the optical axis along with the rear lens group 112 as shown in FIGS. 22 and 23 when the lens barrel is extended.

The mechanism of the retraction and advancement involved with the collapse and extension of the lens barrel is the same as that in the first embodiment described above, and redundancy of illustration and description thereof will be omitted.

Now, a fourth embodiment of the present invention will be described.

Figure 25:
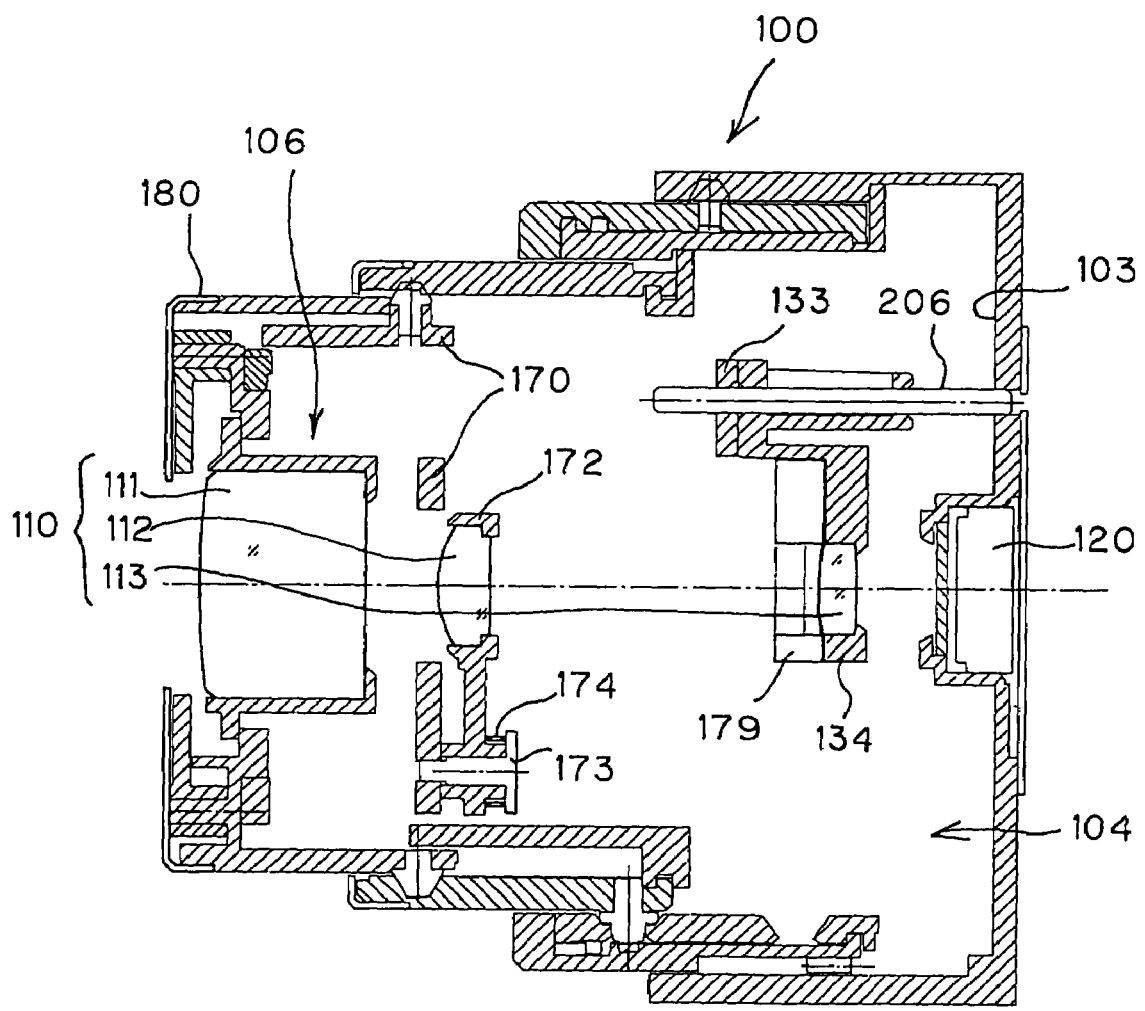
FIG. 25 is a cross-sectional view of a digital camera according to a fourth embodiment of the present invention in the tele-edge state with the maximum focal length, which is taken along the optical axis.
Figure 26:
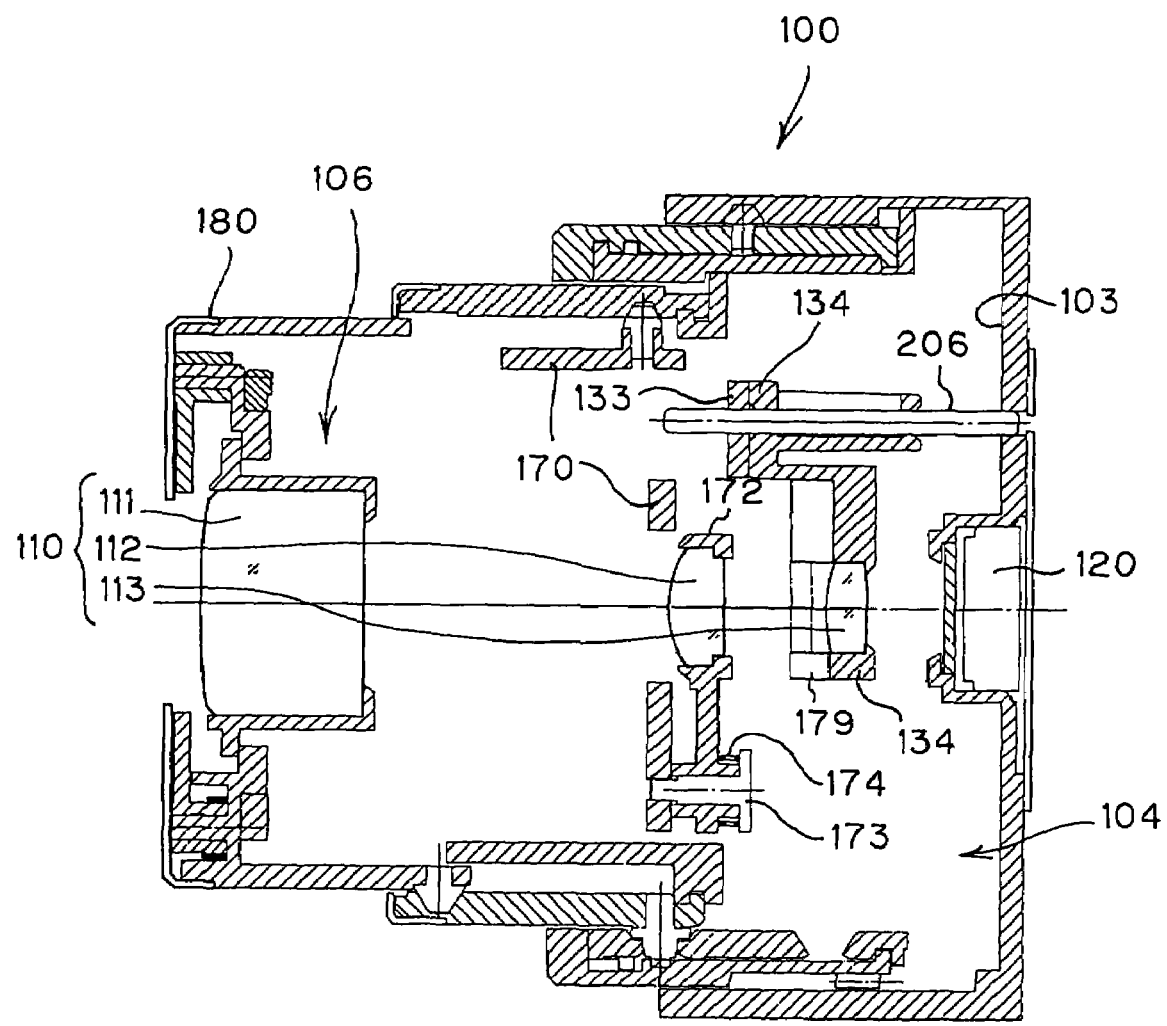
FIG. 26 is a cross-sectional view of the digital camera according to the fourth embodiment of the present invention in the wide-edge state with the minimum focal length, which is taken along the optical axis.
Figure 27:
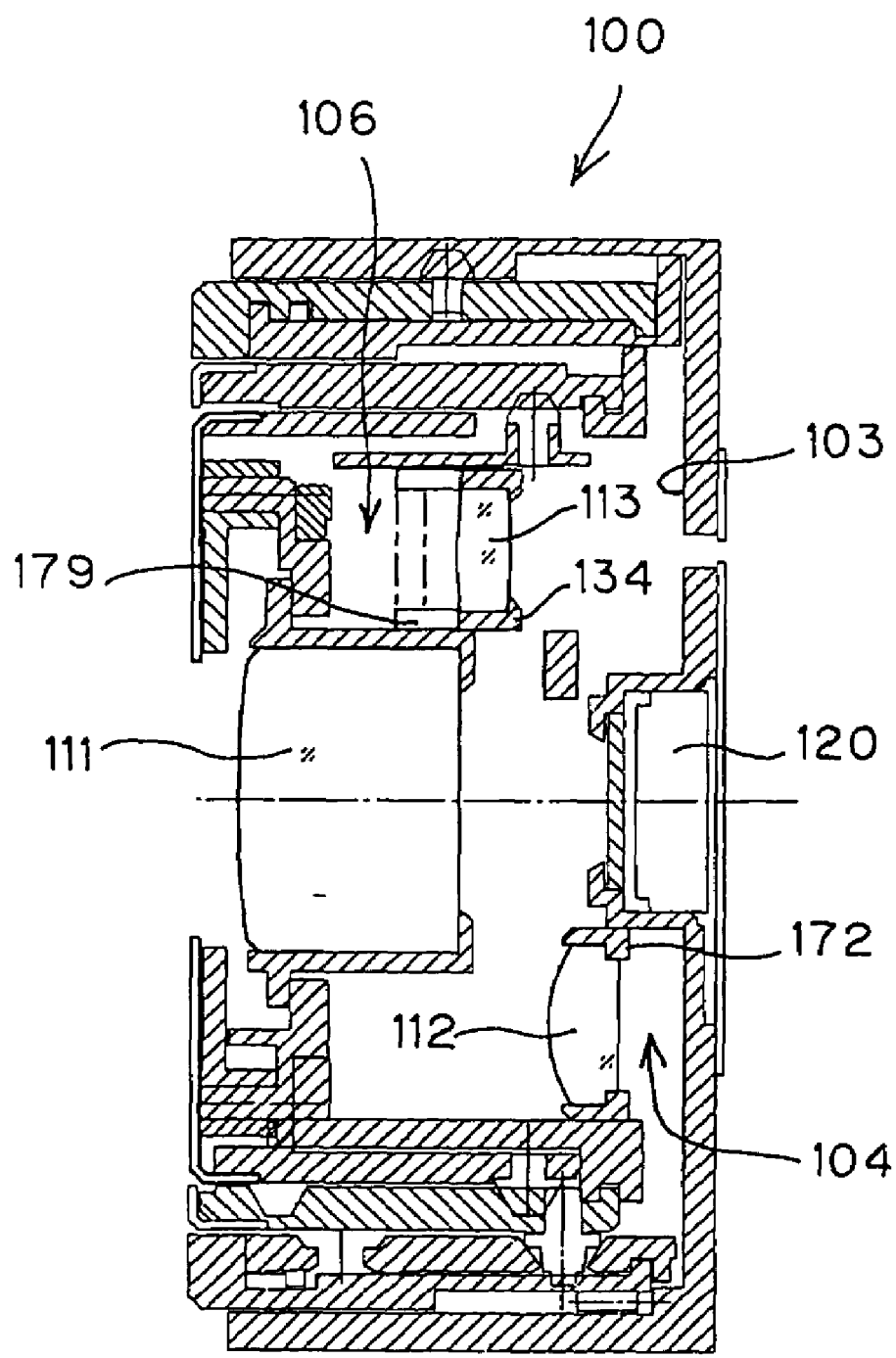
FIG. 27 is a cross-sectional view of the digital camera according to the fourth embodiment of the present invention in the collapsed state, which is taken along the optical axis.

FIG. 25 is a cross-sectional view of the digital camera according to the fourth embodiment of the present invention in the tele-edge state with the maximum focal length, which is taken along the optical axis. FIG. 26 is a cross-sectional view of the digital camera according to the fourth embodiment, which is the same as that shown in FIG. 25, in the wide-edge state with the minimum focal length, which is taken along the optical axis. FIG. 27 is a cross-sectional view of the digital camera according to the fourth embodiment, which is the same as those shown in FIGS. 25 and 26, in the collapsed state, which is taken along the optical axis.

FIGS. 25, 26 and 27 correspond to FIGS. 7, 9 and 14 concerning the first embodiment, respectively. The fourth embodiment differs from the first embodiment in that the shutter unit 179 is fixed to the focusing lens holding frame 134 in the fourth embodiment, while it is fixed to the rear group guiding frame 170 in the first embodiment. The shutter unit 179 is fixed to the focusing lens holding frame 134 and disposed in front of the focusing lens 113. As in the second and third embodiments, the shutter unit 179 is to control the quantity of light using an electrooptic element, such as a liquid crystal or PLZT (polarizing plate) and incorporates both a diaphragm for controlling the quantity of light passing therethrough by controlling the aperture and a shutter for controlling the quantity of light passing therethrough by controlling the shutter speed.

Since the shutter unit 179 is fixed to the focusing lens holding frame 134 holding the focusing lens 113, the shutter unit 179 is retracted in the front lens group side space 106 along with the focusing lens 113 as shown in FIG. 27 when the lens barrel is collapsed, and is advanced onto the optical axis along with the focusing lens 113 as shown in FIGS. 25 and 26 when the lens barrel is extended.

The mechanism of the retraction and advancement involved with the collapse and extension of the lens barrel is the same as that in the first embodiment described above, and redundancy of illustration and description thereof will be omitted.

Now, a fifth embodiment of the present invention will be described.

Figure 28:
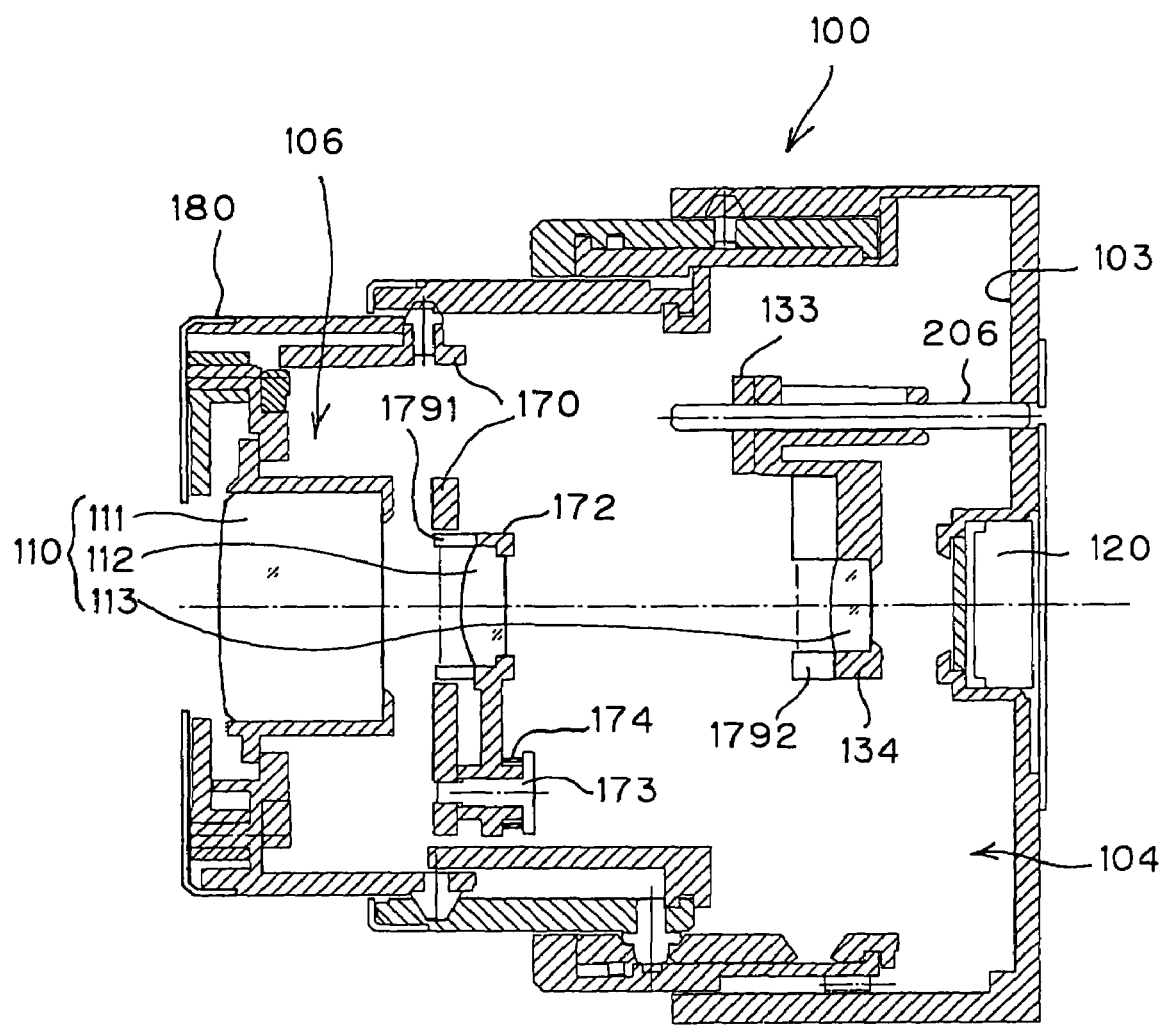
FIG. 28 is a cross-sectional view of a digital camera according to a fifth embodiment of the present invention in the tele-edge state with the maximum focal length, which is taken along the optical axis.
Figure 29:
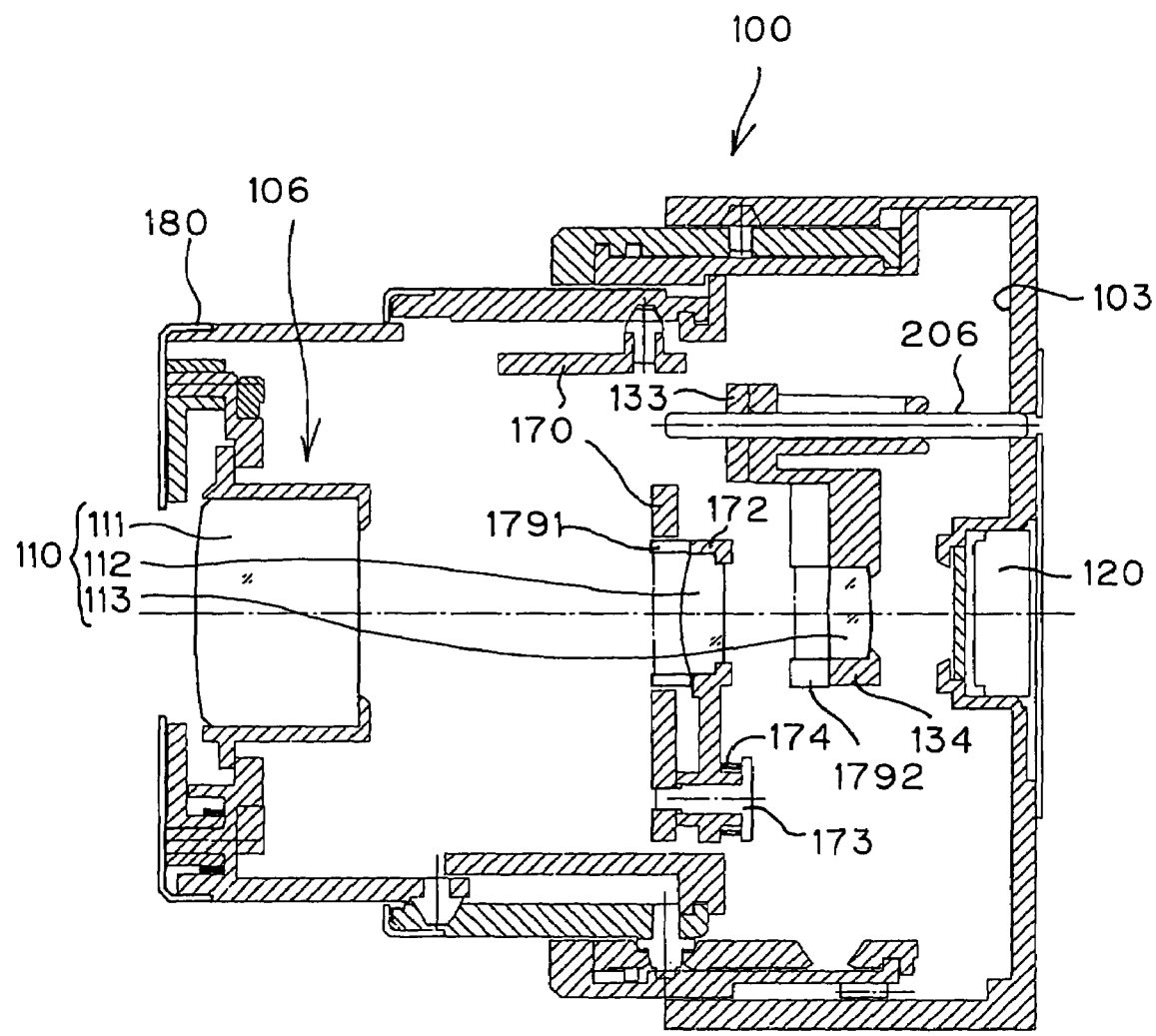
FIG. 29 is a cross-sectional view of the digital camera according to the fifth embodiment of the present invention in the wide-edge state with the minimum focal length, which is taken along the optical axis.
Figure 30:
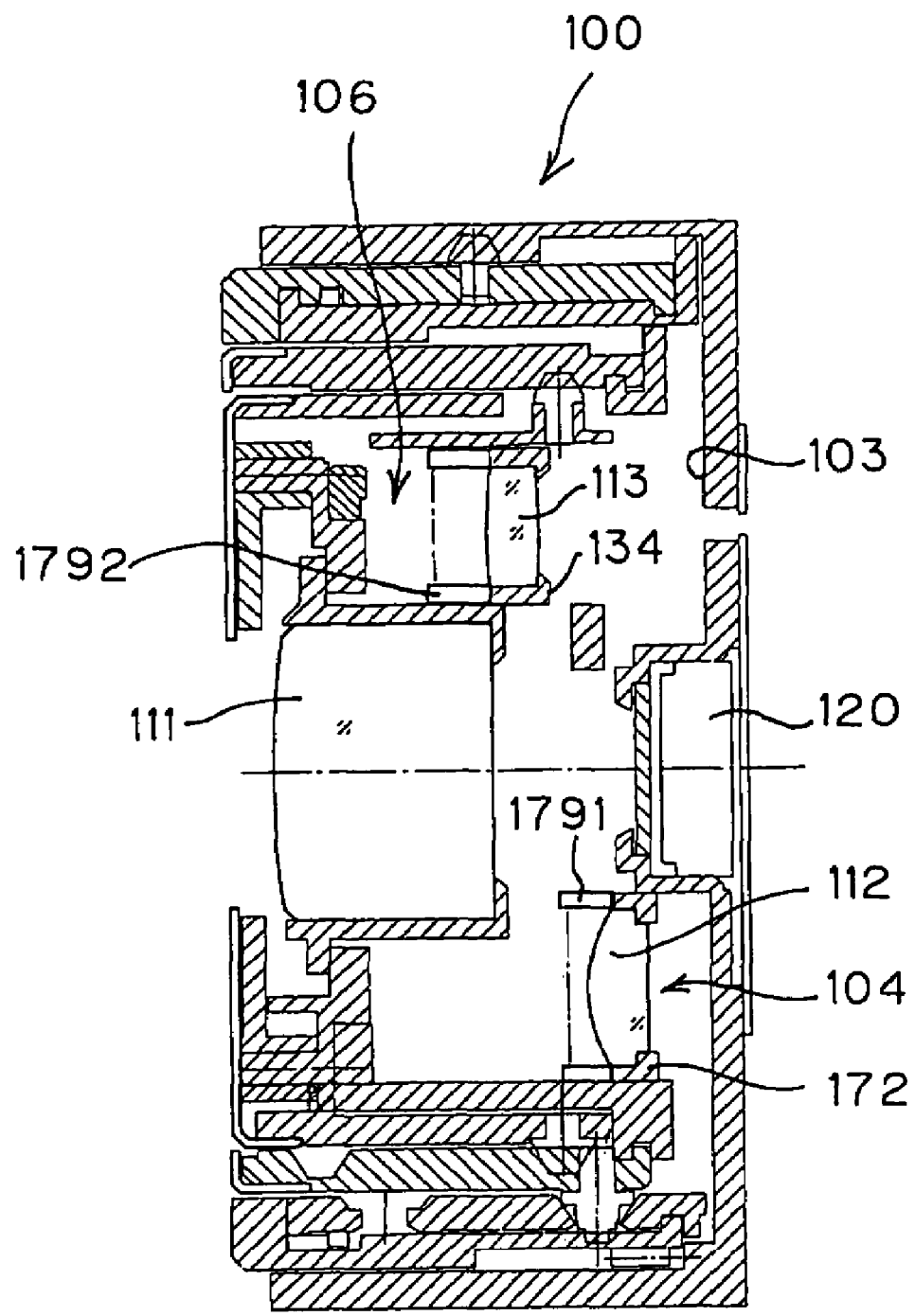
FIG. 30 is a cross-sectional view of the digital camera according to the fifth embodiment of the present invention in the collapsed state, which is taken along the optical axis.

FIG. 28 is a cross-sectional view of the digital camera according to the fifth embodiment of the present invention in the tele-edge state with the maximum focal length, which is taken along the optical axis. FIG. 29 is a cross-sectional view of the digital camera according to the fifth embodiment, which is the same as that shown in FIG. 28, in the wide-edge state with the minimum focal length, which is taken along the optical axis. FIG. 30 is a cross-sectional view of the digital camera according to the fifth embodiment, which is the same as those shown in FIGS. 28 and 29, in the collapsed state, which is taken along the optical axis.

FIGS. 28, 29 and 30 correspond to FIGS. 7, 9 and 14 concerning the first embodiment, respectively. The fifth embodiment differs from the first embodiment in that a diaphragm unit 1791 incorporating a diaphragm that controls the quantity of light passing therethrough by controlling the aperture and a shutter unit 1792 incorporating a shutter that controls the quantity of light passing therethrough by controlling the shutter speed but not incorporating a diaphragm are provided instead of the shutter unit 179 incorporating both a diaphragm and a shutter in the first embodiment, and the diaphragm unit 1791 and the shutter unit 1792 are fixed to the rear group holding frame 172 and the focusing lens holding frame 134, respectively, while the shutter unit 179 incorporating both a diaphragm and a shutter in the first embodiment is fixed to the rear group guiding frame 170. Viewed along the optical axis, the diaphragm unit 1791 is disposed in front of the rear lens group 112, and the shutter unit 1792 is disposed in front of the focusing lens 113. In this embodiment, both the diaphragm unit 1791 and the shutter unit 1792 are to control the quantity of light using an electrooptic element, such as a liquid crystal or PLZT (polarizing plate).

Since the diaphragm unit 1791 and the shutter unit 1792 are fixed to the rear group holding frame 172 holding the rear lens group 112 and the focusing lens holding frame 134 holding the focusing lens 113, respectively, the diaphragm unit 1791 is retracted in the recess section 104 along with the rear lens group 112 as shown in FIG. 30 when the lens barrel is collapsed, and is advanced onto the optical axis along with the rear lens group 112 as shown in FIGS. 28 and 29 when the lens barrel is extended, and the shutter unit 1792 is retracted in the front lens group side space 106 along with the focusing lens 113 as shown in FIG. 30 when the lens barrel is collapsed, and is advanced onto the optical axis along with the focusing lens 113 as shown in FIGS. 28 and 29 when the lens barrel is extended.

The mechanism of the retraction and advancement involved with the collapse and extension of the lens barrel is the same as that in the first embodiment described above, and redundancy of illustration and description thereof will be omitted.

Now, a sixth embodiment of the present invention will be described.

Figure 31:
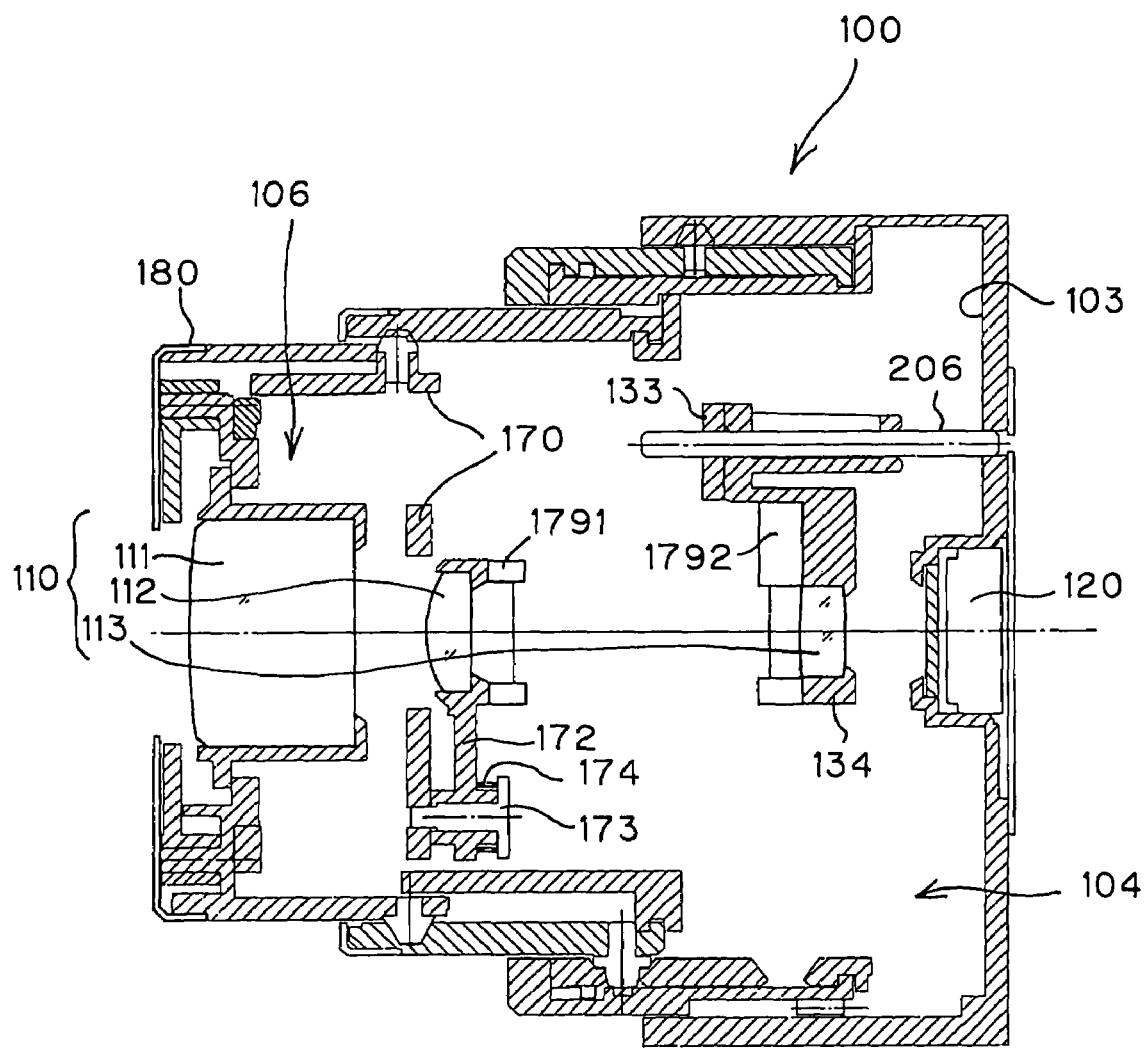
FIG. 31 is a cross-sectional view of a digital camera according to a sixth embodiment of the present invention in the tele-edge state with the maximum focal length, which is taken along the optical axis.
Figure 32:
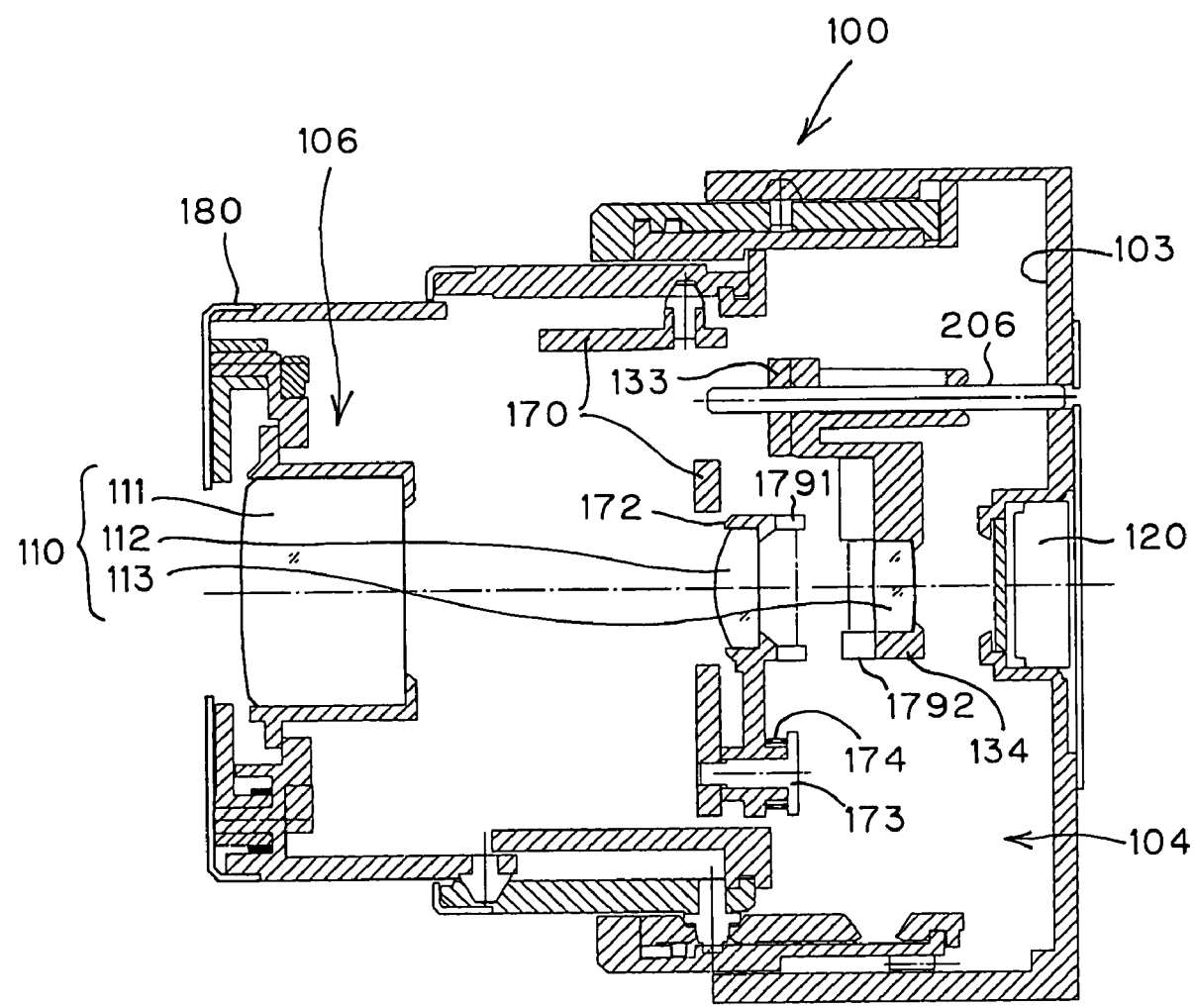
FIG. 32 is a cross-sectional view of the digital camera according to the sixth embodiment of the present invention in the wide-edge state with the minimum focal length, which is taken along the optical axis.
Figure 33:
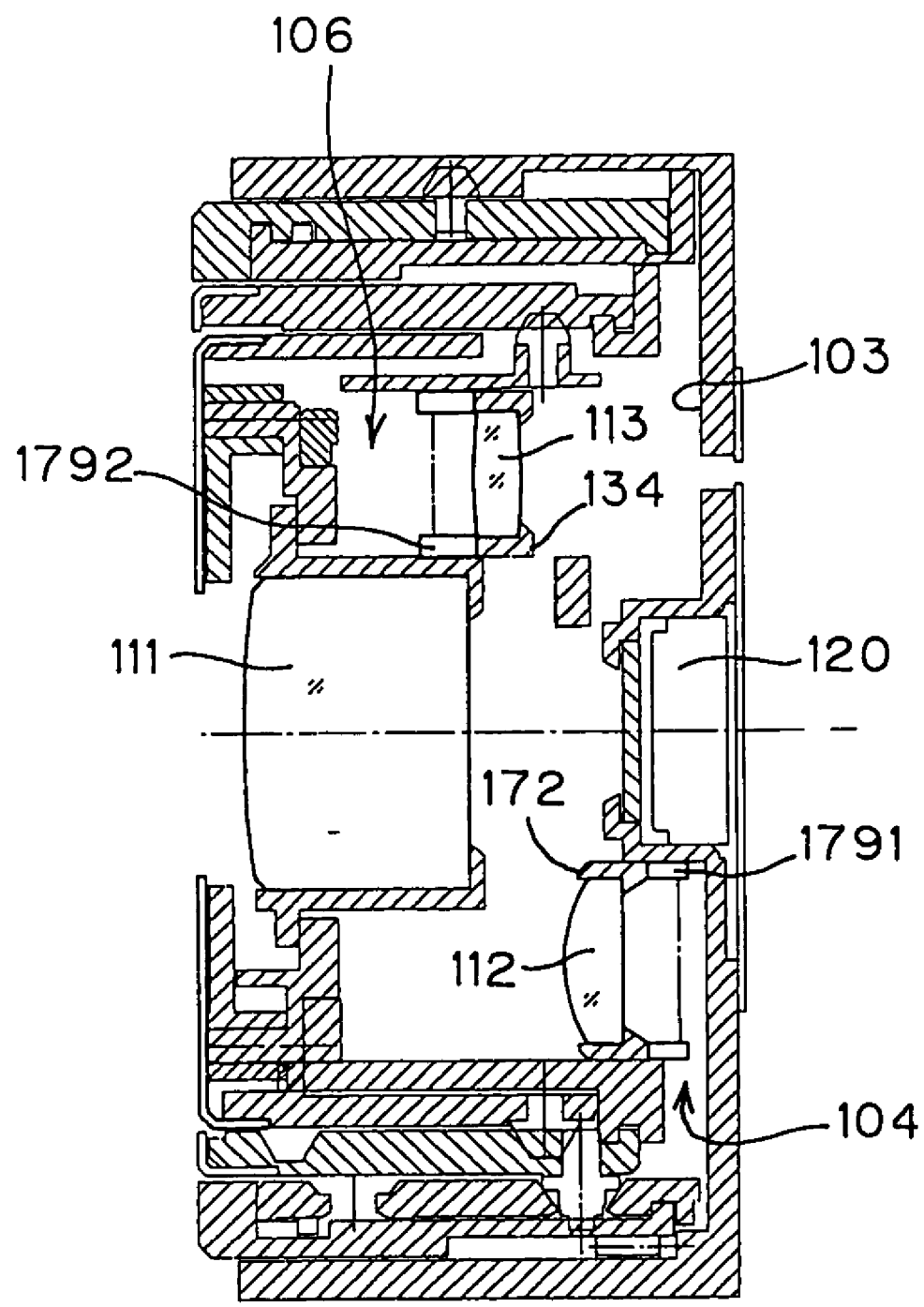
FIG. 33 is a cross-sectional view of the digital camera according to the sixth embodiment of the present invention in the collapsed state, which is taken along the optical axis.

FIG. 31 is a cross-sectional view of the digital camera according to the sixth embodiment of the present invention in the tele-edge state with the maximum focal length, which is taken along the optical axis. FIG. 32 is a cross-sectional view of the digital camera according to the sixth embodiment, which is the same as that shown in FIG. 31, in the wide-edge state with the minimum focal length, which is taken along the optical axis. FIG. 33 is a cross-sectional view of the digital camera according to the sixth embodiment, which is the same as those shown in FIGS. 31 and 32, in the collapsed state, which is taken along the optical axis.

FIGS. 31, 32 and 33 correspond to FIGS. 7, 9 and 14 concerning the first embodiment, respectively. The sixth embodiment differs from the first embodiment in that a diaphragm unit 1791 incorporating a diaphragm that controls the quantity of light passing therethrough by controlling the aperture and a shutter unit 1792 incorporating a shutter that controls the quantity of light passing therethrough by controlling the shutter speed but not incorporating a diaphragm are provided instead of the shutter unit 179 incorporating both a diaphragm and a shutter in the first embodiment, and the diaphragm unit 1791 and the shutter unit 1792 are fixed to the rear group holding frame 172 and the focusing lens holding frame 134, respectively, while the shutter unit 179 incorporating both a diaphragm and a shutter in the first embodiment is fixed to the rear group guiding frame 170. Viewed along the optical axis, the diaphragm unit 1791 is disposed at the back of the rear lens group 112, and the shutter unit 1792 is disposed in front of the focusing lens 113. In this embodiment, both the diaphragm unit 1791 and the shutter unit 1792 are to control the quantity of light using an electrooptic element, such as a liquid crystal or PLZT (polarizing plate).

Since the diaphragm unit 1791 and the shutter unit 1792 are fixed to the rear group holding frame 172 holding the rear lens group 112 and the focusing lens holding frame 134 holding the focusing lens 113, respectively, the diaphragm unit 1791 is retracted in the recess section 104 along with the rear lens group 112 as shown in FIG. 33 when the lens barrel is collapsed, and is advanced onto the optical axis along with the rear lens group 112 as shown in FIGS. 31 and 32 when the lens barrel is extended, and the shutter unit 1792 is retracted in the front lens group side space 106 along with the focusing lens 113 as shown in FIG. 33 when the lens barrel is collapsed, and is advanced onto the optical axis along with the focusing lens 113 as shown in FIGS. 31 and 32 when the lens barrel is extended.

The mechanism of the retraction and advancement involved with the collapse and extension of the lens barrel is the same as that in the first embodiment described above, and redundancy of illustration and description thereof will be omitted.

Now, a seventh embodiment of the present invention will be described.

Figure 34:
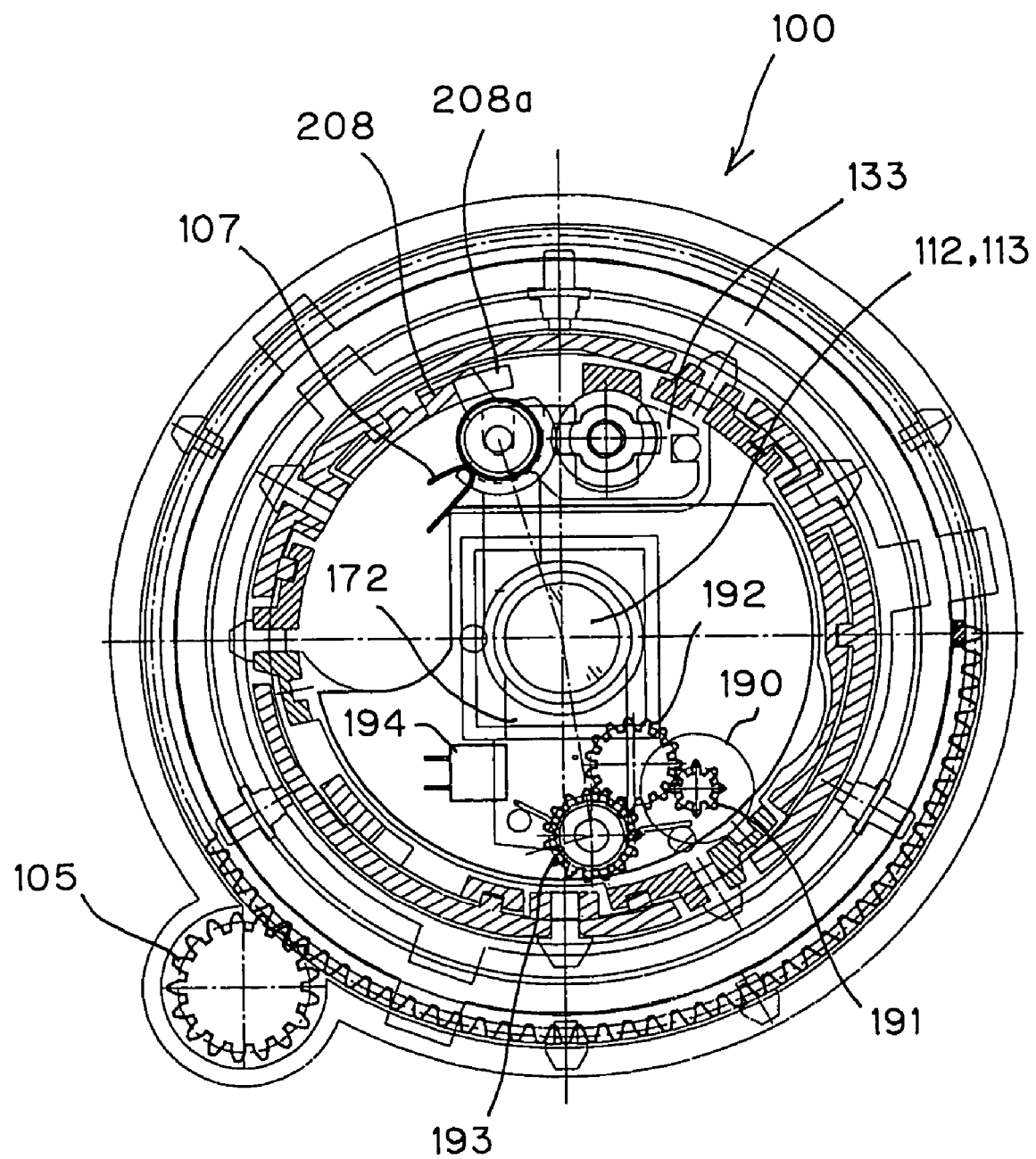
FIG. 34 is a schematic view of essential components of a lens barrel, in an extended state, of a digital camera according to a seventh embodiment of the present invention, which are seen along the optical axis.
Figure 35:
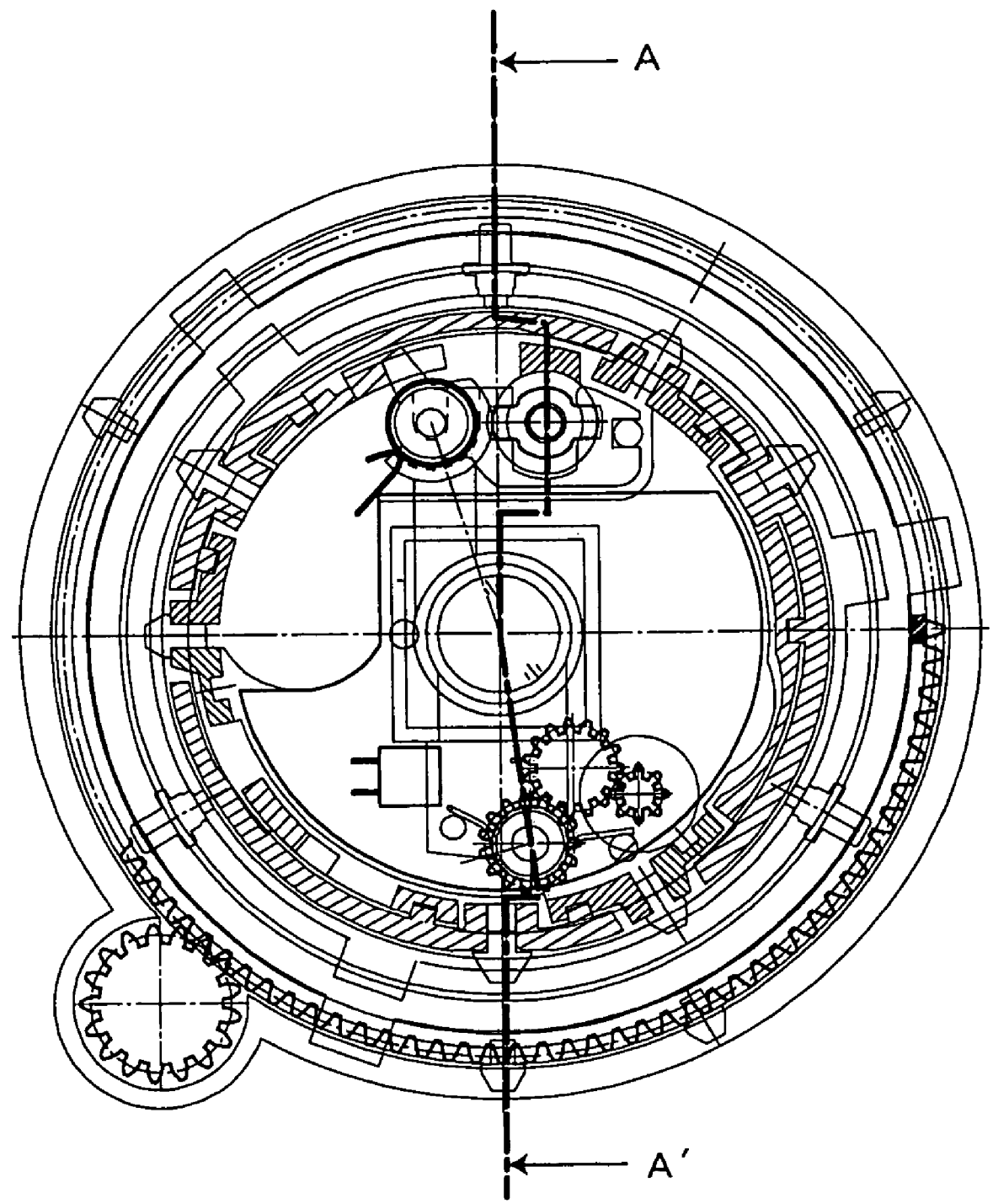
FIG. 35 is a cross-sectional view similar to FIG. 34 with the cutting-plane line A-A' additionally shown.
Figure 36:
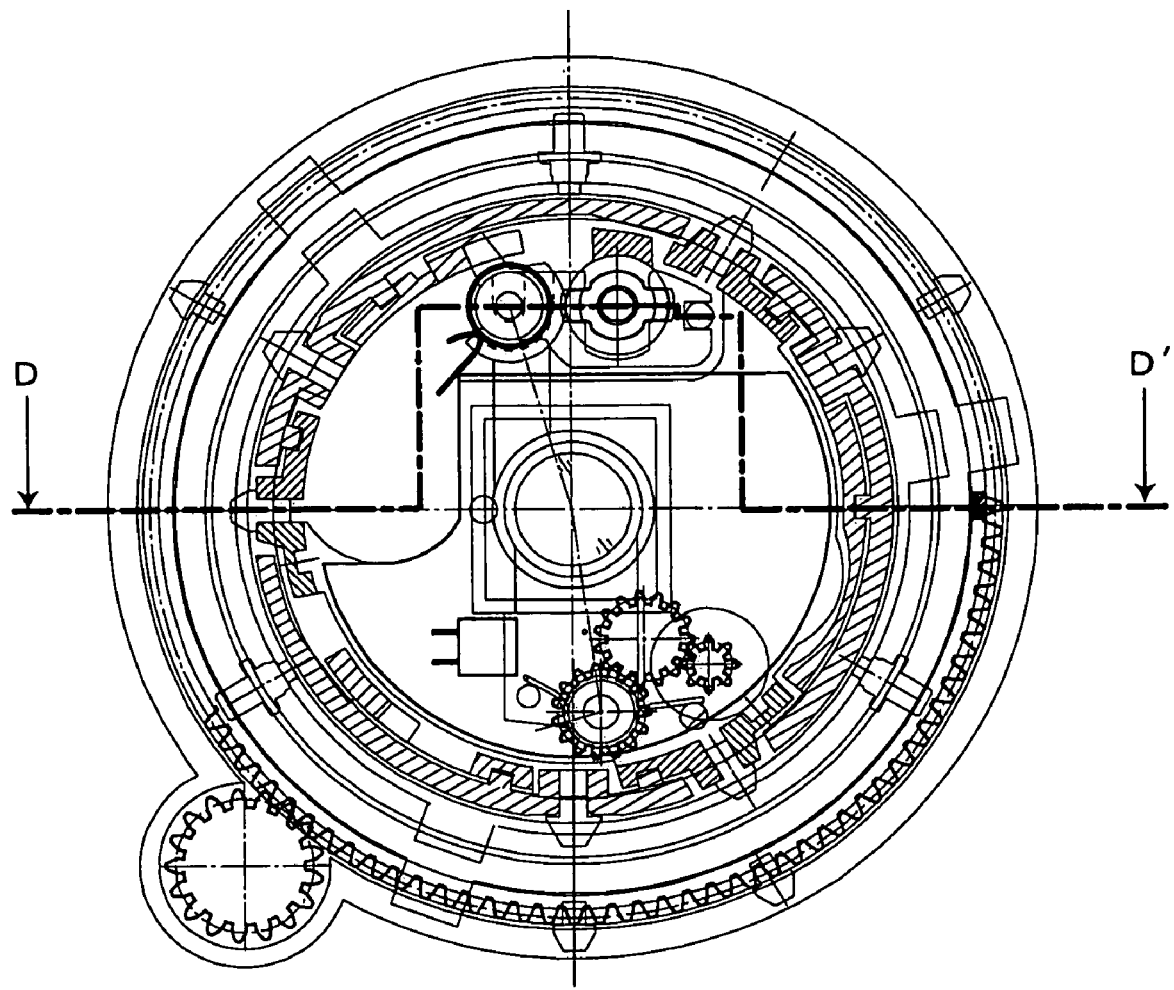
FIG. 36 is a cross-sectional view similar to FIG. 34 with the cutting-plane line D-D' additionally shown.
Figure 37:
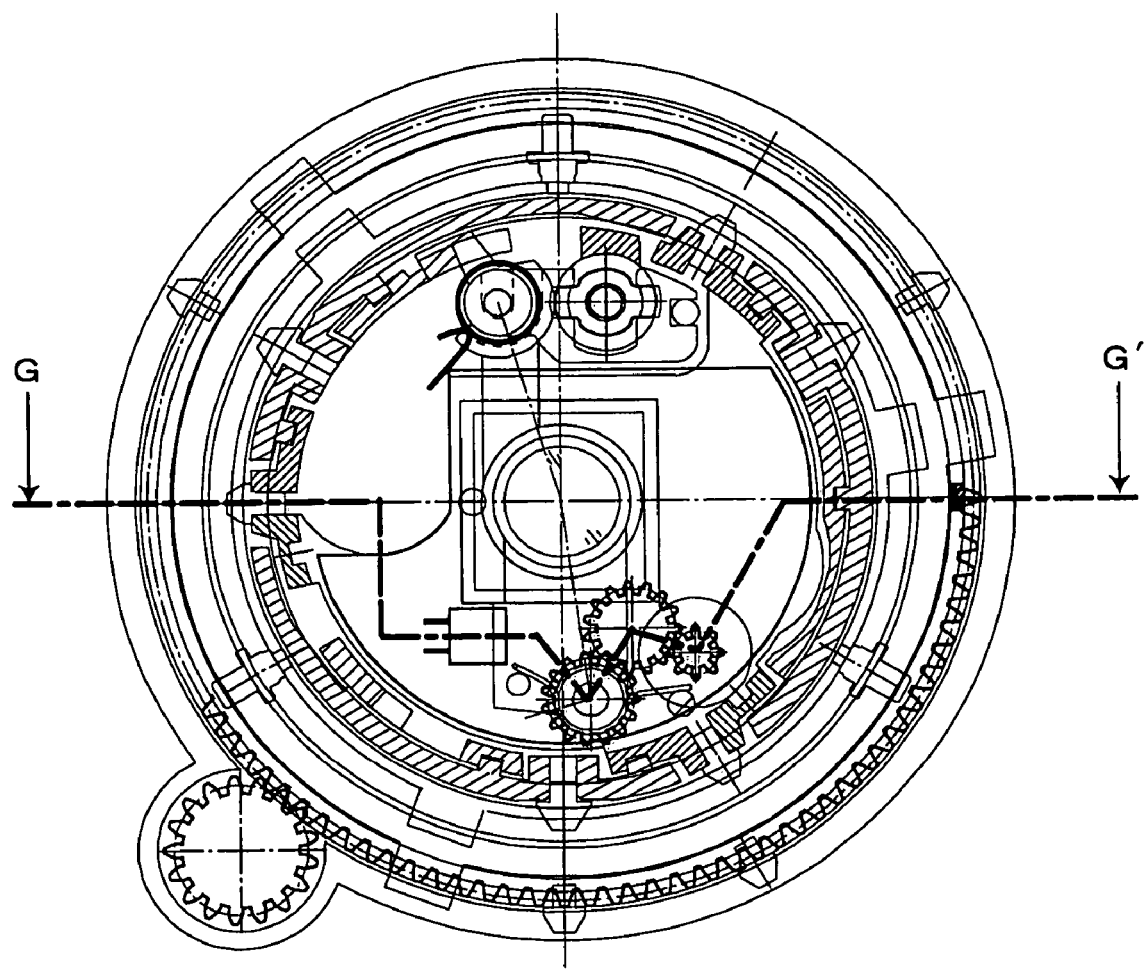
FIG. 37 is a cross-sectional view similar to FIG. 34 with the cutting-plane line G-G' additionally shown.
Figure 38:
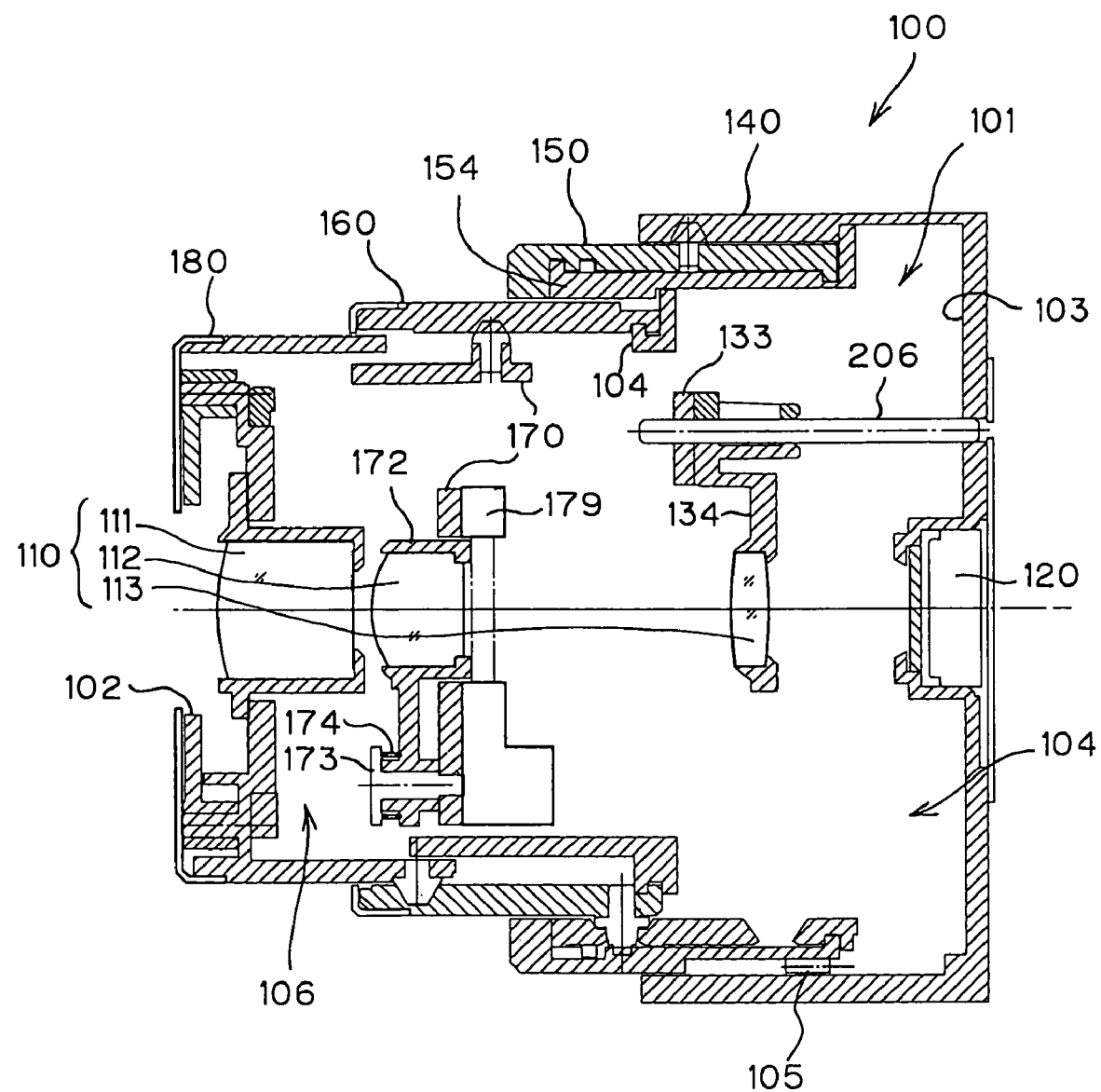
FIG. 38 is a cross-sectional view showing the tele-edge state with the maximum focal length taken along the cutting-plane line A-A' shown in FIG. 35.
Figure 39:
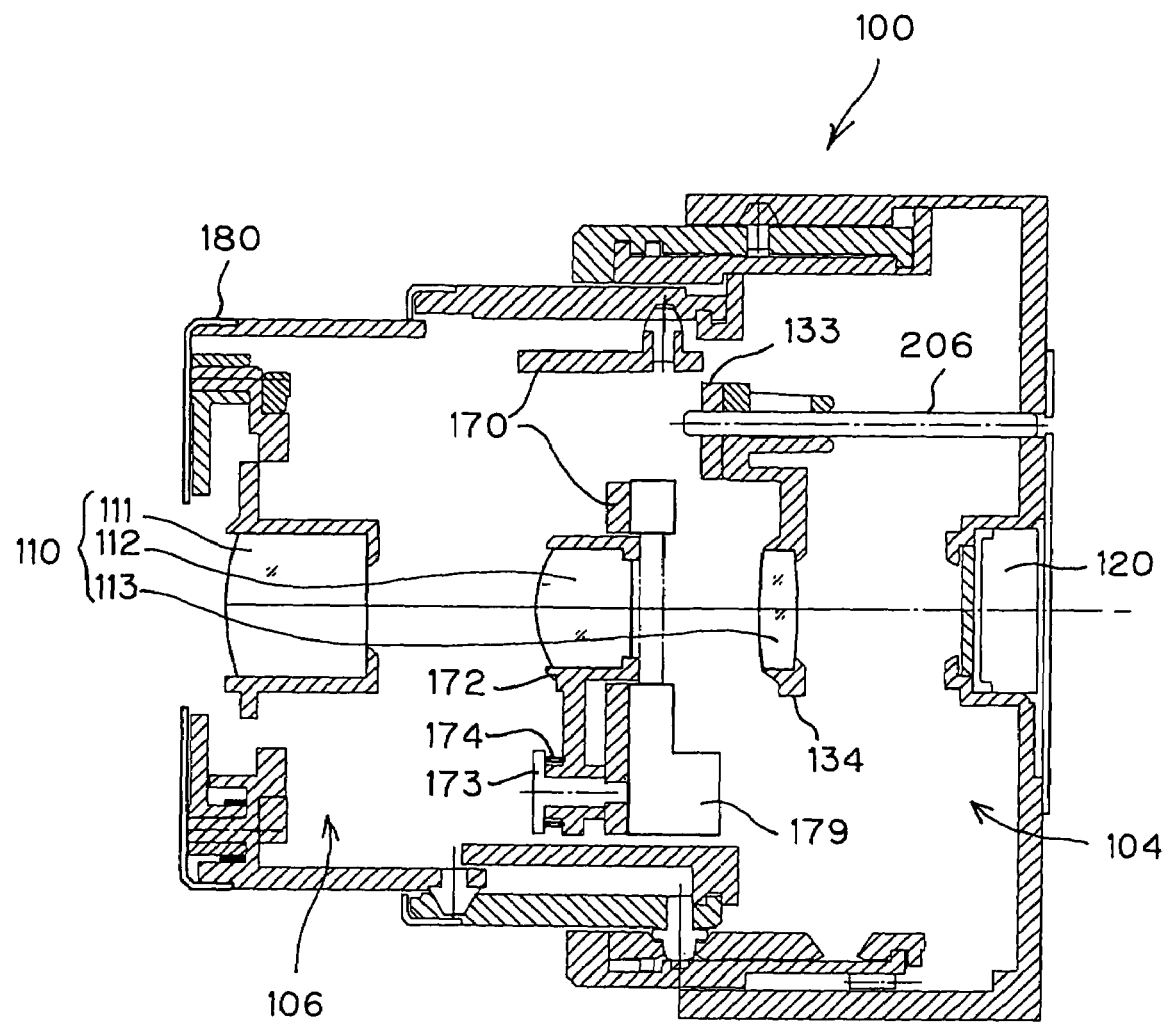
FIG. 39 is a cross-sectional view showing the wide-edge state with the minimum focal length taken along the same cutting-plane line as in FIG. 38.
Figure 40:
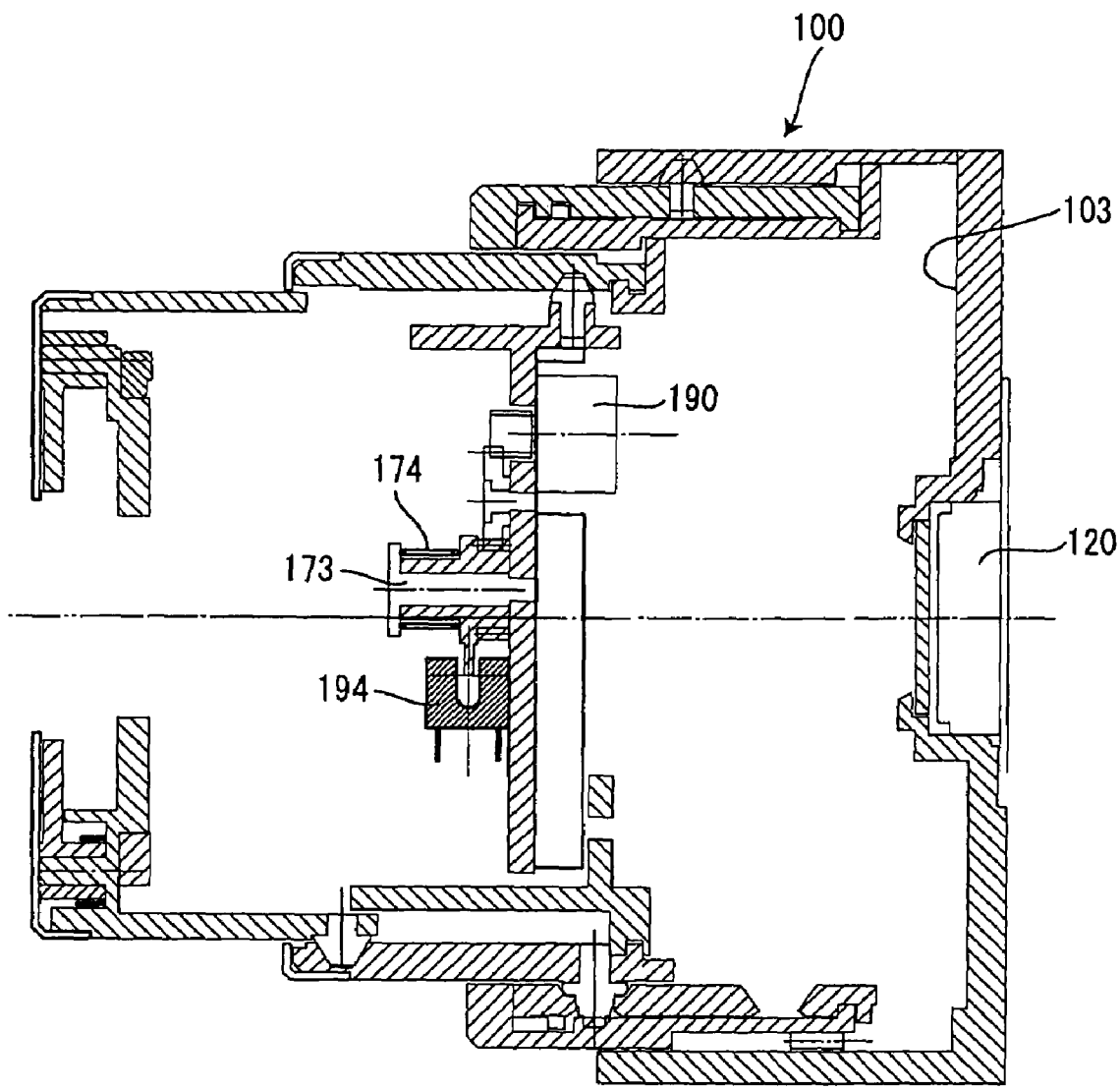
FIG. 40 is a cross-sectional view of essential component in the wide-edge state taken along the cutting-plane line G-G' in FIG. 37.
Figure 41:
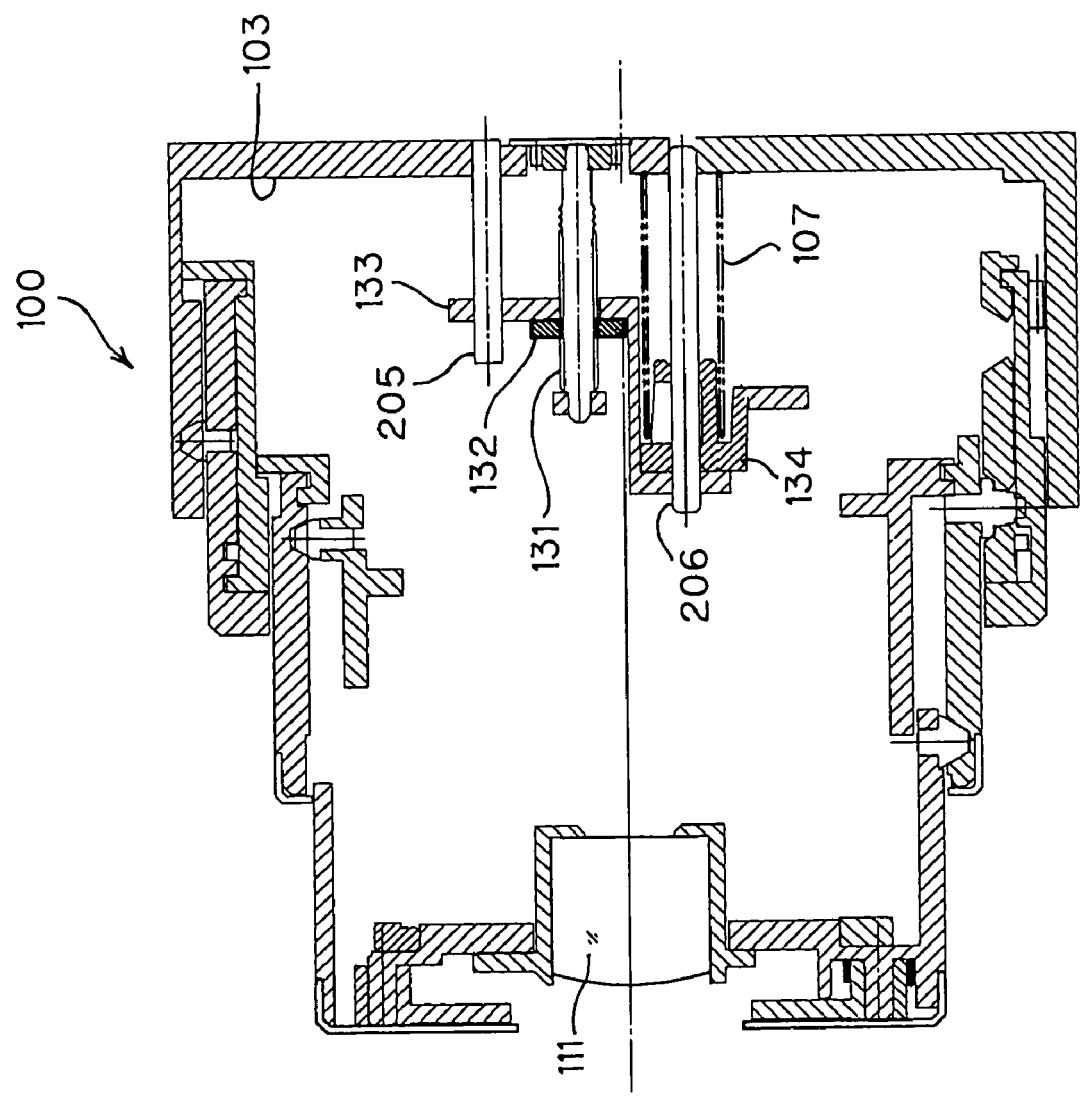
FIG. 41 is a cross-sectional view of essential component in the wide-edge state taken along the cutting-plane line D-D' in FIG. 36.
Figure 42:
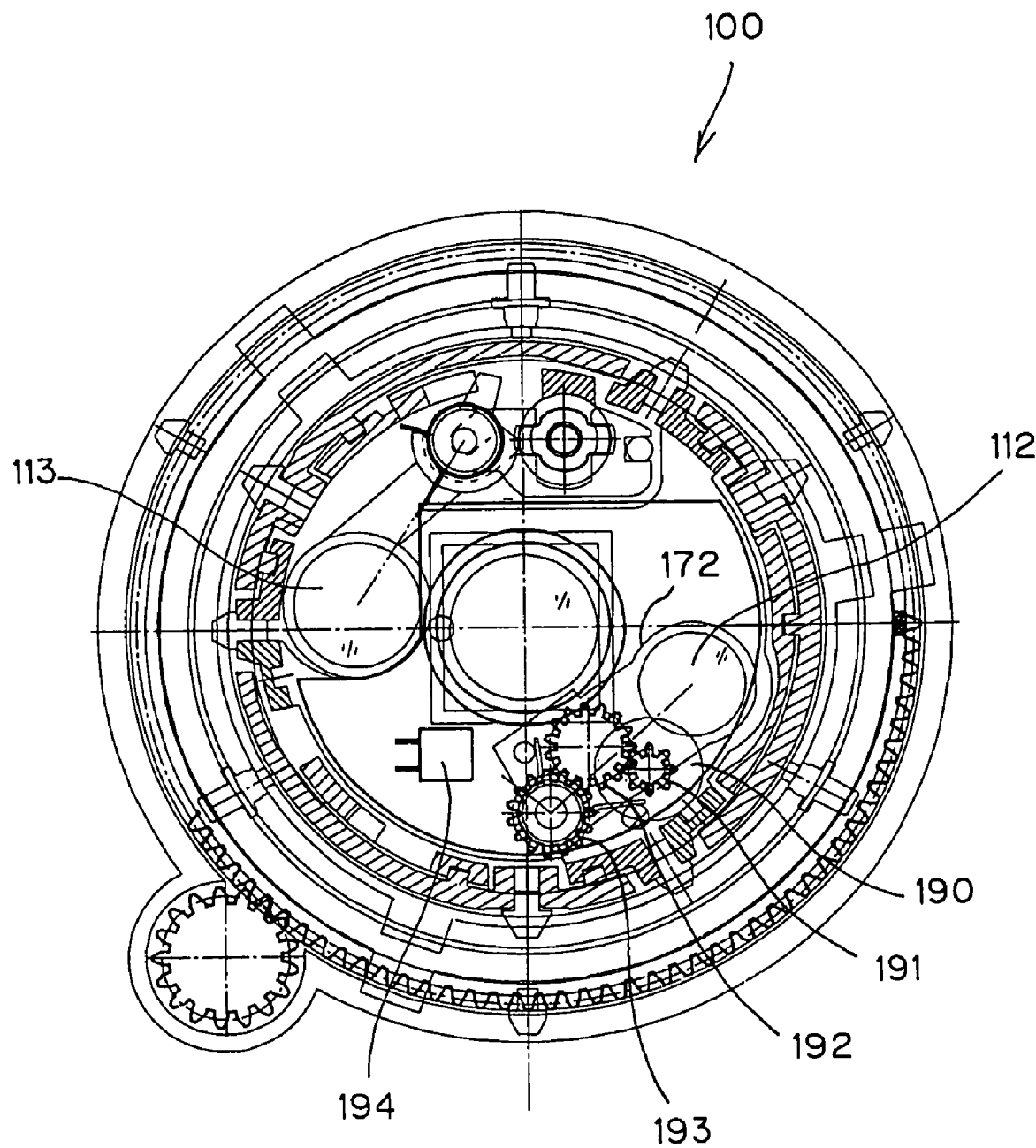
FIG. 42 is a schematic view of essential components of the lens barrel, in the collapsed state, of the digital camera according to the seventh embodiment, which are seen along the optical axis.
Figure 43:
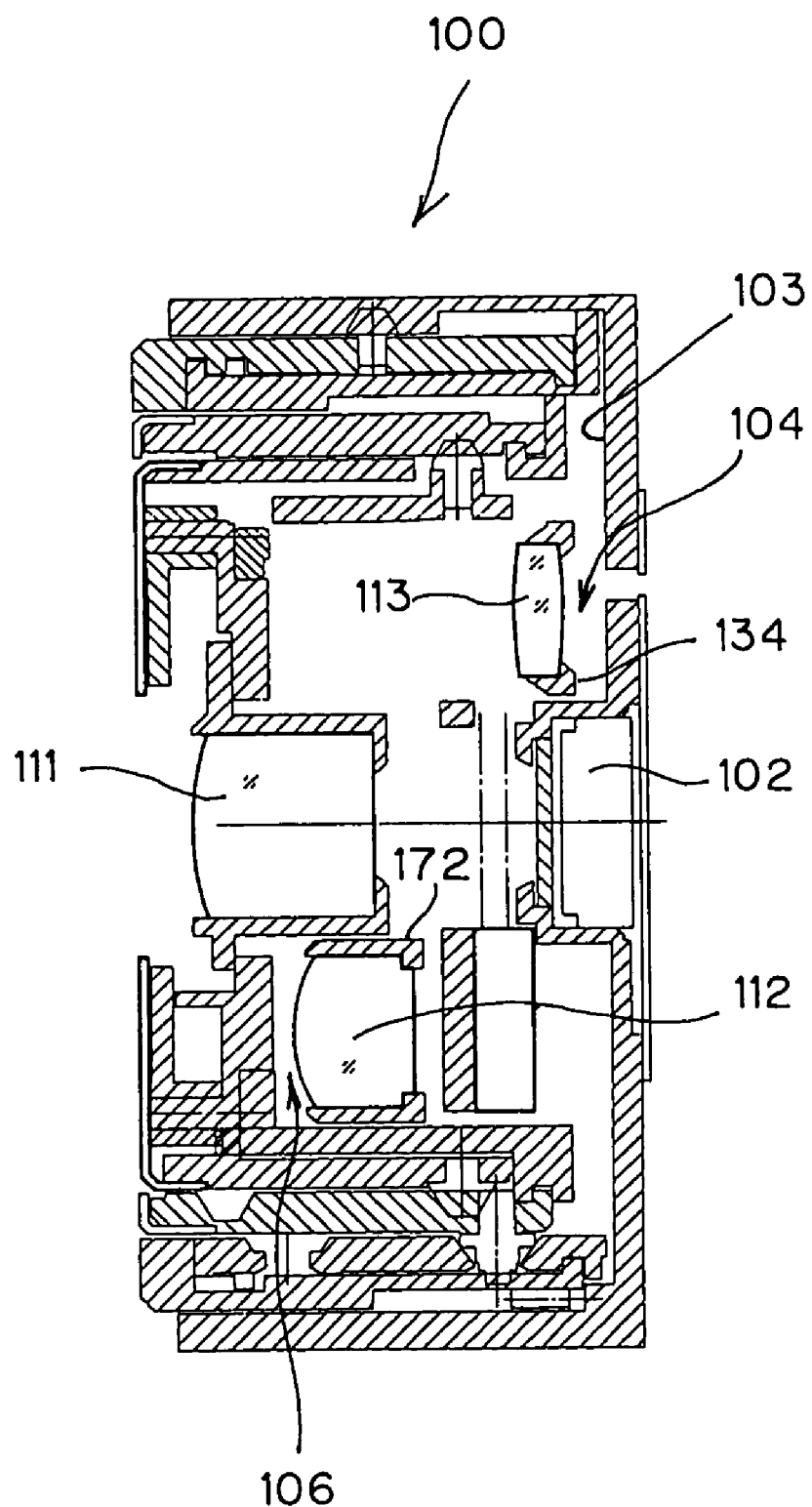
FIG. 43 is a cross-sectional view taken by cutting the arrangement shown in FIG. 42 along a line corresponding to the cutting-plane line C-C' in FIG. 13 which shows the first embodiment and corresponds to FIG. 42.
Figure 44:
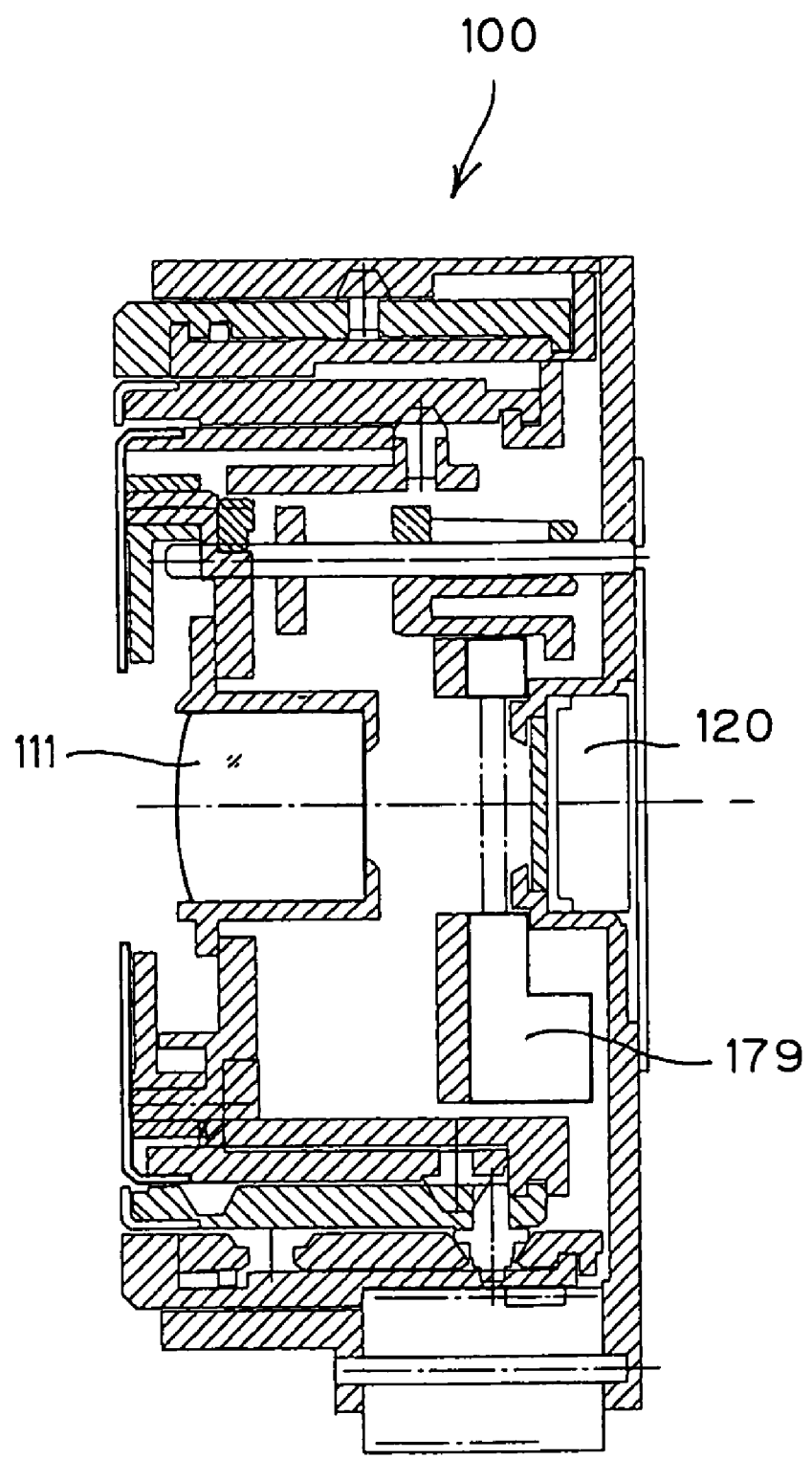
FIG. 44 is a cross-sectional view taken by cutting the arrangement shown in FIG. 42 along a line corresponding to the cutting-plane line B-B' in FIG. 13 which shows the first embodiment and corresponds to FIG. 42.

FIG. 34 is a schematic view of essential components of a lens barrel, in the extended state, of a digital camera according to the seventh embodiment of the present invention, which are seen along the optical axis. FIG. 34 is a cross-sectional view taken by cutting the arrangement shown in FIG. 38 described later along a line corresponding to the cutting-plane line F-F' in FIG. 8 which shows the first embodiment described above and corresponds to FIG. 38. FIG. 35 is a cross-sectional view similar to FIG. 34 with the cutting-plane line A-A' additionally shown. FIG. 36 is a cross-sectional view similar to FIG. 34 with the cutting-plane line D-D' additionally shown. FIG. 37 is a cross-sectional view similar to FIG. 34 with the cutting-plane line G-G' additionally shown. FIG. 38 is a cross-sectional view showing the tele-edge state with the maximum focal length taken along the cutting-plane line A-A'shown in FIG. 35. FIG. 39 is a cross-sectional view showing the wide-edge state with the minimum focal length taken along the same cutting-plane line as in FIG. 38. FIG. 40 is a cross-sectional view of essential component in the wide-edge state taken along the cutting-plane line G-G' in FIG. 37. FIG. 41 is a cross-sectional view of essential component in the wide-edge state taken along the cutting-plane line D-D' in FIG. 36. FIG. 42 is a schematic view of essential components of the lens barrel, in the collapsed state, of the digital camera according to the seventh embodiment, which are seen along the optical axis. FIG. 42 is a cross-sectional view taken by cutting the arrangement shown in FIG. 43 described later along a line corresponding to the cutting-plane line E-E' in FIG. 15 which shows the first embodiment described above and corresponds to FIG. 43. FIG. 43 is a cross-sectional view taken by cutting the arrangement shown in FIG. 42 along a line corresponding to the cutting-plane line C-C' in FIG. 13 which shows the first embodiment described above and corresponds to FIG. 42. FIG. 44 is a cross-sectional view taken by cutting the arrangement shown in FIG. 42 along a line corresponding to the cutting-plane line B-B' in FIG. 13 which shows the first embodiment described above and corresponds to FIG. 42.

In the first embodiment described earlier, the shutter unit 179 is disposed in front of the rear group guiding frame 170, and the rear group holding frame 172 is disposed at the back of the rear group guiding frame 170, viewed along the optical axis. However, according to the seventh embodiment, the shutter unit 179 is attached to the rear of the rear group guiding frame 170, and the rear group holding frame 172 is attached to the front of the rear group guiding frame 170, viewed along the optical axis.

In addition, according to the seventh embodiment, the shapes of the focusing lens 113 and focusing lens holding frame 134 holding the focusing lens 113 are different from those in the first embodiment.

Furthermore, according to the seventh embodiment, the protrusion 209 protruding from the wall member 103 into the first embodiment shown in FIG. 10 is not provided, and the lever 175 that engages with the protrusion is also omitted.

Instead, according to the seventh embodiment, there are provided a stepping motor 190, a driving gear 191 fixed to a rotation shaft of the stepping motor 190 for transmitting the rotational driving force of the stepping motor 190 to the rear group holding frame 172, a transmission gear 192 for transmitting the driving force of the driving gear, a receiving gear 193 fixed to the rear group holding frame 172, and a photo interrupter 194 for detecting that the rear group holding frame 172 is located on the optical axis.

The rotational driving force of the stepping motor 190 is transmitted to the rear group holding frame 172 via the driving gear 191, transmission gear 192 and receiving gear 193 to cause the rear group holding frame 172 to rotate about the rotation shaft 173, thereby rotating the rear lens group 112 between a position on the optical axis and the retracted position. In the seventh embodiment, again, the coil spring 174 (see FIG. 38) is provided around the rotation shaft 173, and the biasing force of the coil spring 174 enables the rear lens group 112 to stably remain at the position on the optical axis.

As shown in the seventh embodiment, a driving source that causes the rear lens group 112 to rotate by rotating the rear group holding frame 172 may be provided, besides the driving source for collapsing and extending the lens barrel.

In the seventh embodiment, as shown in FIG. 43, the thickness of the digital camera in the collapsed state is reduced by retracting the rear lens group 112 in the retracted position provided in the front lens group side space 106 at the side of the front lens group 111 and retracting the focusing lens 113 in the retracted position provided in the recess section 104 at the side of the CCD 120 when the lens barrel is collapsed.

Now, an eighth embodiment of the present invention will be described.

Figure 45:
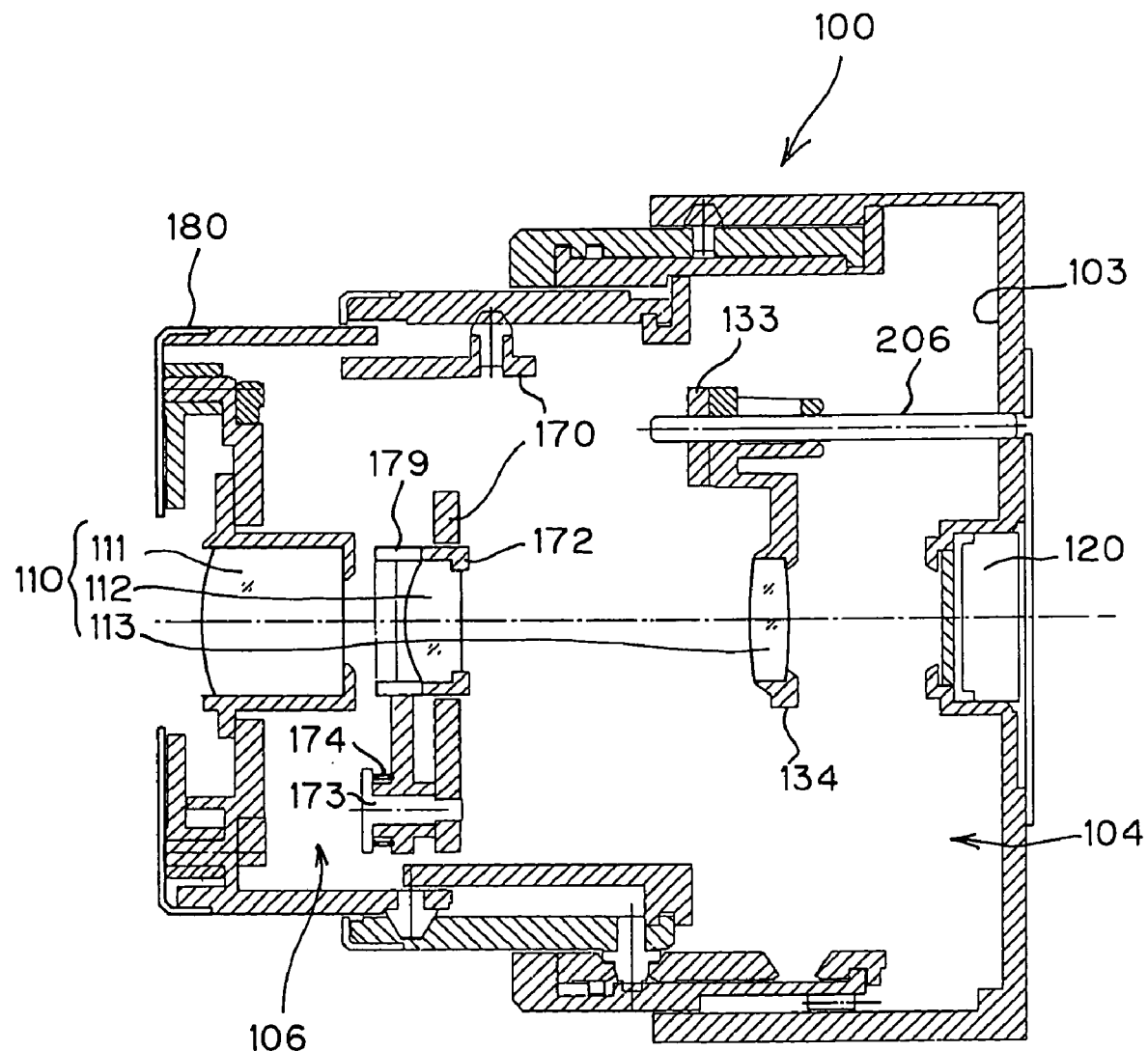
FIG. 45 is a cross-sectional view of a digital camera according to an eighth embodiment of the present invention in the tele-edge state with the maximum focal length, which is taken along the optical axis.
Figure 46:
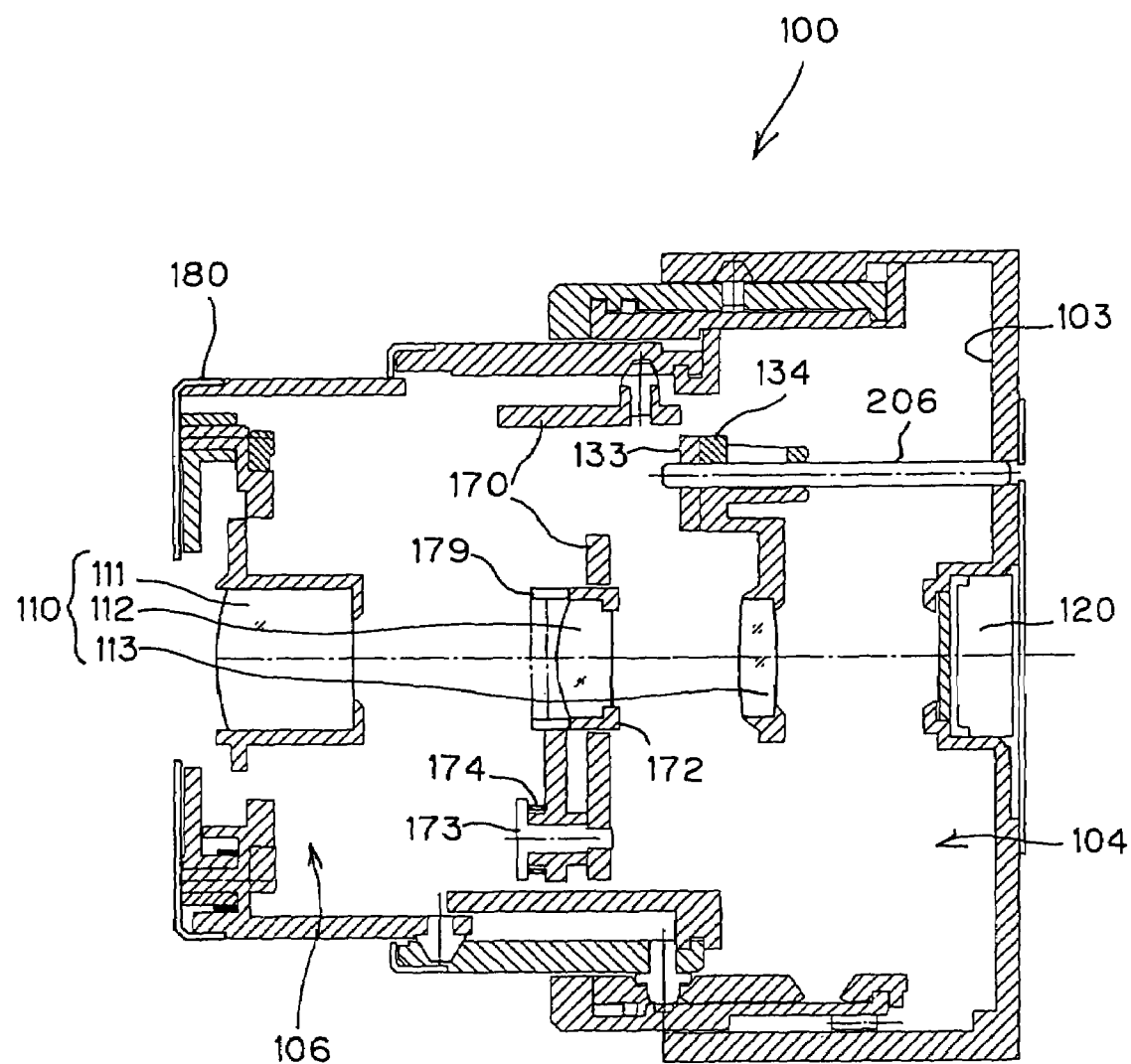
FIG. 46 is a cross-sectional view of the digital camera according to the eighth embodiment of the present invention in the wide-edge state with the minimum focal length, which is taken along the optical axis.
Figure 47:
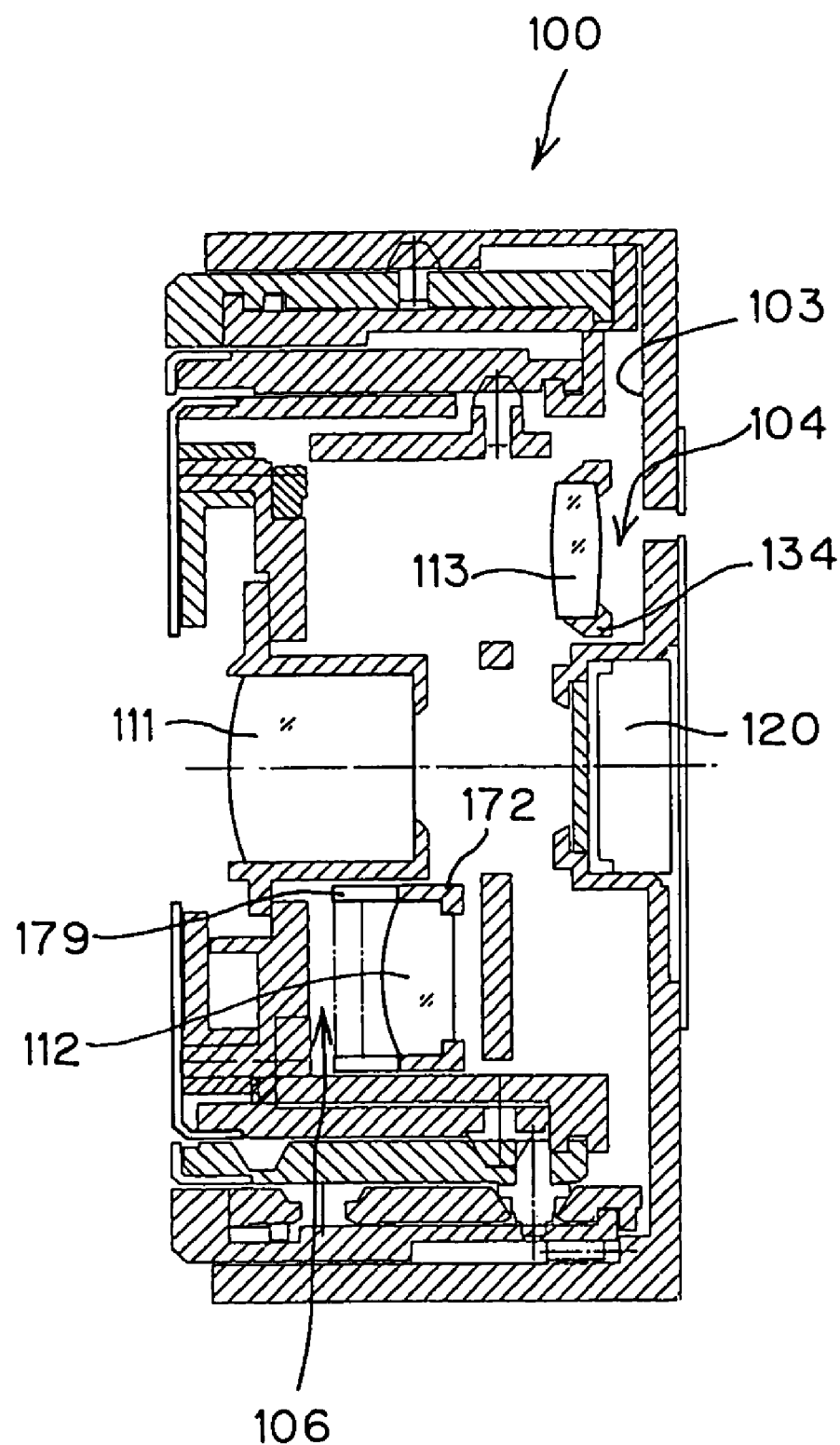
FIG. 47 is a cross-sectional view of the digital camera according to the eighth embodiment of the present invention in the collapsed state, which is taken along the optical axis.

FIG. 45 is a cross-sectional view of the digital camera according to the eighth embodiment of the present invention in the tele-edge state with the maximum focal length, which is taken along the optical axis. FIG. 46 is a cross-sectional view of the digital camera according to the eighth embodiment, which is the same as that shown in FIG. 45, in the wide-edge state with the minimum focal length, which is taken along the optical axis. FIG. 47 is a cross-sectional view of the digital camera according to the eighth embodiment, which is the same as those shown in FIGS. 45 and 46, in the collapsed state, which is taken along the optical axis.

FIGS. 45, 46 and 47 correspond to FIGS. 38, 39 and 43 concerning the seventh embodiment, respectively. The eighth embodiment differs from the seventh embodiment in that the shutter unit 179 is fixed to the rear group holding frame 172 in the eighth embodiment, while it is fixed to the rear group guiding frame 170 in the seventh embodiment. The shutter unit 179 is fixed to the rear group holding frame 172 and disposed in front of the rear lens group 112. The shutter unit 179 is to control the quantity of light using an electrooptic element, such as a liquid crystal or PLZT (polarizing plate) and incorporates both a diaphragm for controlling the quantity of light passing therethrough by controlling the aperture and a shutter for controlling the quantity of light passing therethrough by controlling the shutter speed.

Since the shutter unit 179 is fixed to the rear group holding frame 172 holding the rear lens group 112, the shutter unit 179 is retracted in the front lens group side space 106 along with the rear lens group 112 as shown in FIG. 47 when the lens barrel is collapsed, and is advanced onto the optical axis along with the rear lens group 112 as shown in FIGS. 45 and 46 when the lens barrel is extended.

The mechanism of the retraction and advancement involved with the collapse and extension of the lens barrel is the same as that in the seventh embodiment described above, and redundancy of illustration and description thereof will be omitted.

In this way, the shutter unit may be retracted and advanced along with the rear lens group depending on the collapse and extension of the lens barrel, according to the present invention.

Now, a ninth embodiment will be described.

Figure 48:
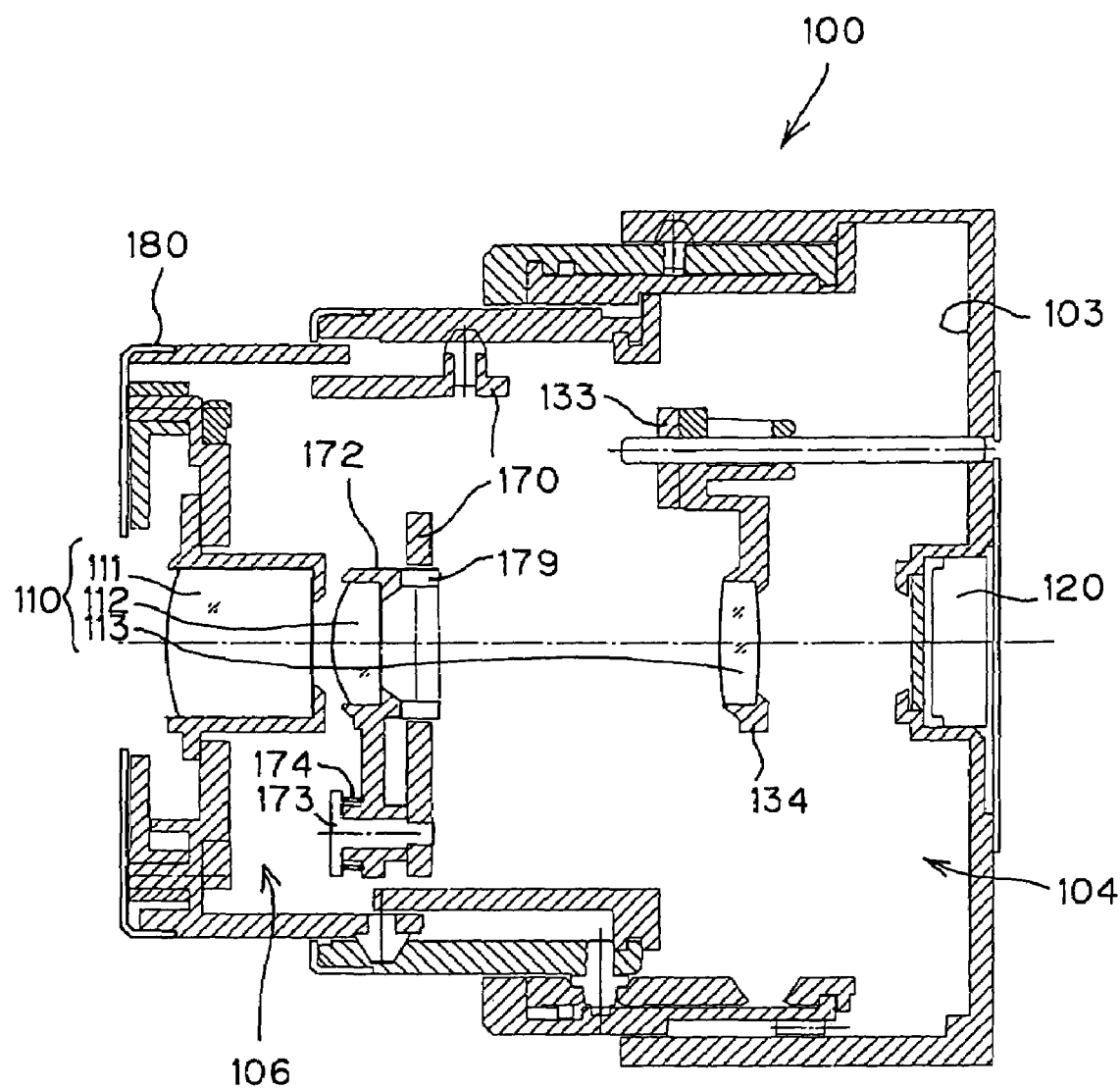
FIG. 48 is a cross-sectional view of a digital camera according to a ninth embodiment of the present invention in the tele-edge state with the maximum focal length, which is taken along the optical axis.
Figure 49:
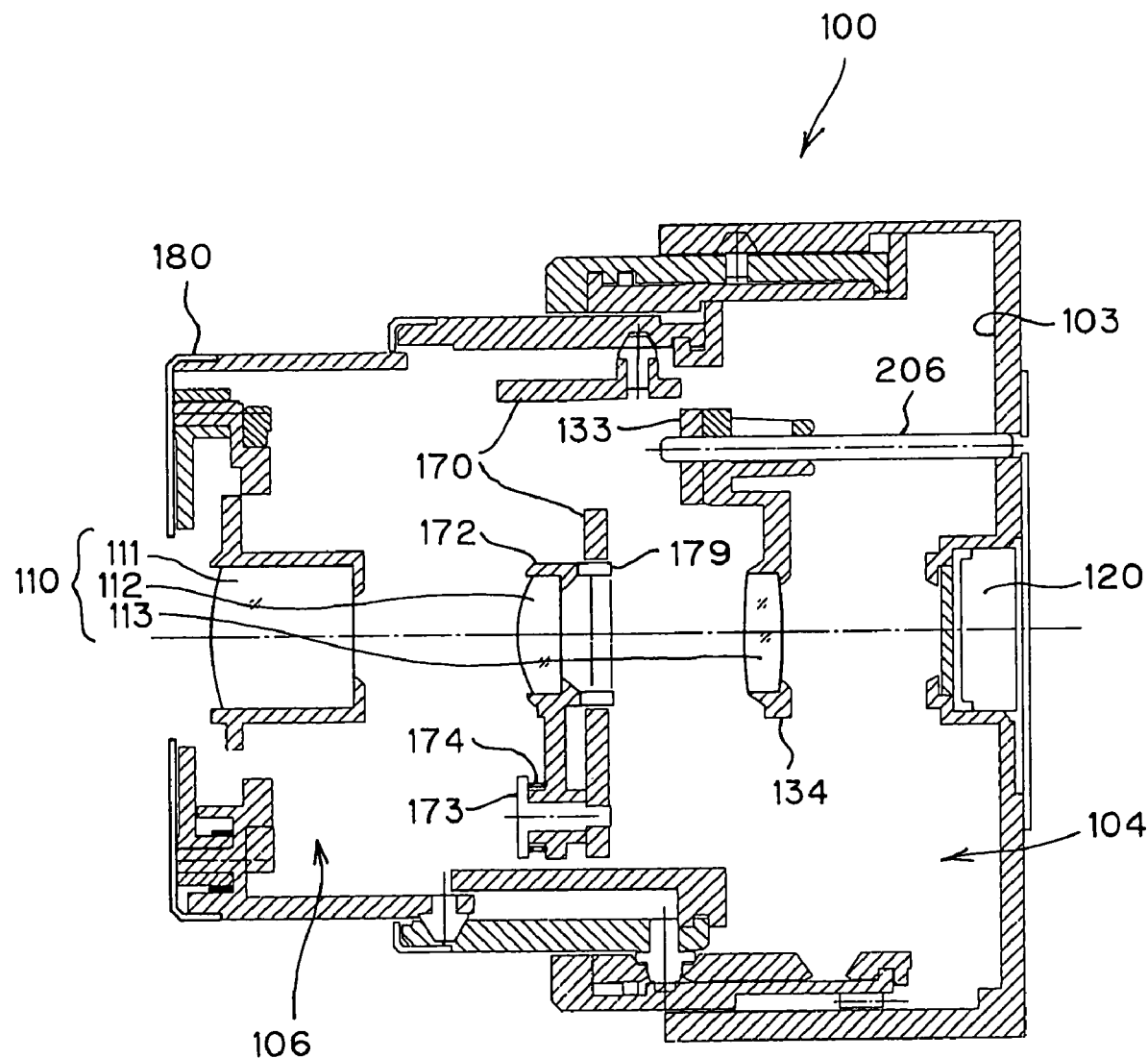
FIG. 49 is a cross-sectional view of the digital camera according to the ninth embodiment of the present invention in the wide-edge state with the minimum focal length, which is taken along the optical axis.
Figure 50:
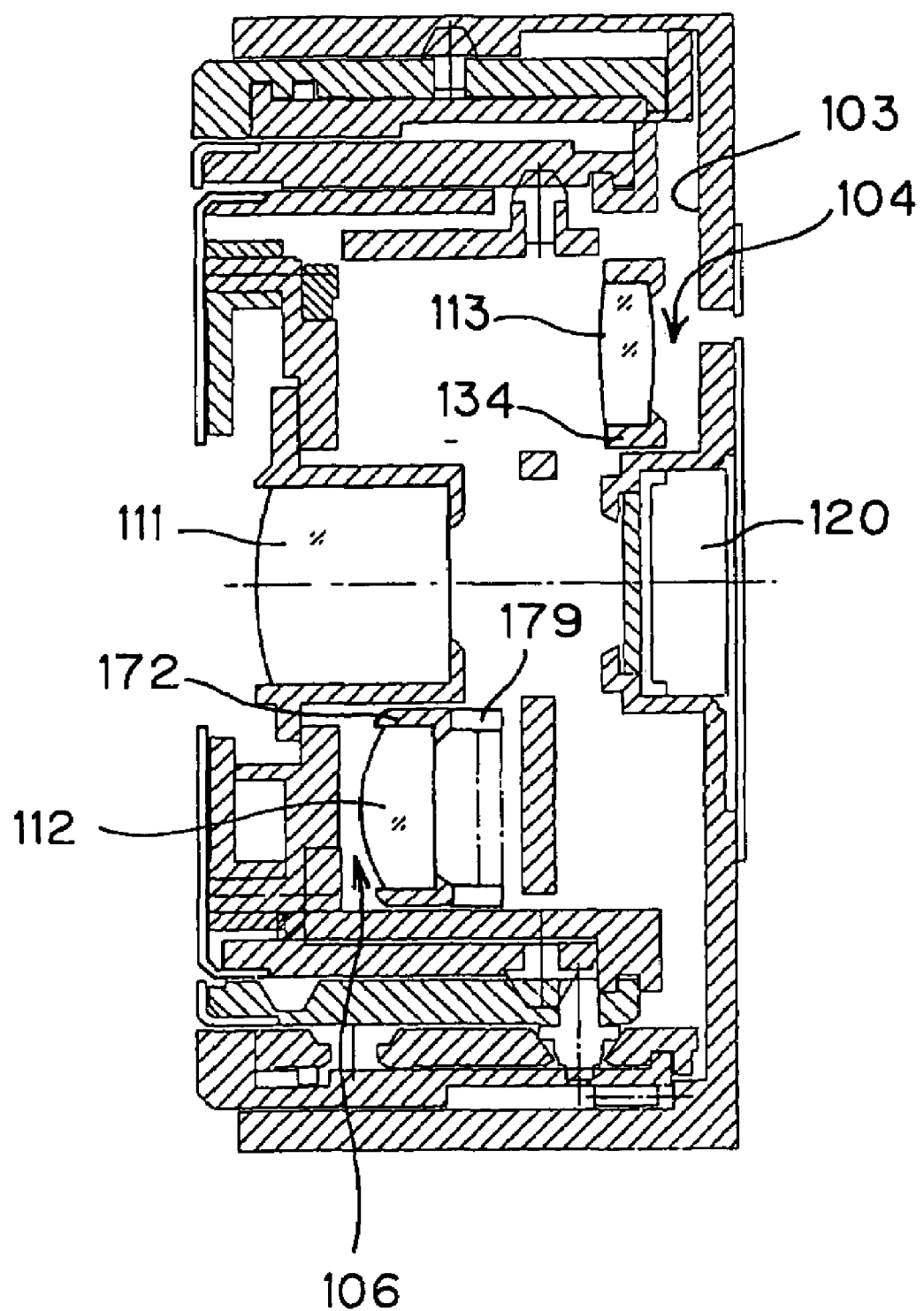
FIG. 50 is a cross-sectional view of the digital camera according to the ninth embodiment of the present invention in the collapsed state, which is taken along the optical axis.

FIG. 48 is a cross-sectional view of the digital camera according to the ninth embodiment of the present invention in the tele-edge state with the maximum focal length, which is taken along the optical axis. FIG. 49 is a cross-sectional view of the digital camera according to the ninth embodiment, which is the same as that shown in FIG. 48, in the wide-edge state with the minimum focal length, which is taken along the optical axis. FIG. 50 is a cross-sectional view of the digital camera according to the ninth embodiment, which is the same as those shown in FIGS. 48 and 49, in the collapsed state, which is taken along the optical axis.

FIGS. 48, 49 and 50 correspond to FIGS. 38, 39 and 43 concerning the seventh embodiment, respectively. As in the eighth embodiment described above, the ninth embodiment differs from the seventh embodiment in that the shutter unit 179 is fixed to the rear group holding frame 172 in the ninth embodiment, while it is fixed to the rear group guiding frame 170 in the seventh embodiment. However, while the shutter unit 179 is disposed in front of the rear lens group 112 in the eighth embodiment, the shutter unit 179 is disposed at the back of the rear lens group 112 in the ninth embodiment. As in the eighth embodiment, the shutter unit 179 is to control the quantity of light using an electrooptic element, such as a liquid crystal or PLZT (polarizing plate) and incorporates both a diaphragm for controlling the quantity of light passing therethrough by controlling the aperture and a shutter for controlling the quantity of light passing therethrough by controlling the shutter speed.

Since the shutter unit 179 is fixed to the rear group holding frame 172 holding the rear lens group 112, the shutter unit 179 is retracted in the front lens group side space 106 along with the rear lens group 112 as shown in FIG. 50 when the lens barrel is collapsed, and is advanced onto the optical axis along with the rear lens group 112 as shown in FIGS. 48 and 49 when the lens barrel is extended.

The mechanism of the retraction and advancement involved with the collapse and extension of the lens barrel is the same as that in the seventh embodiment described above, and redundancy of illustration and description thereof will be omitted.

Now, a tenth embodiment of the present invention will be described.

Figure 51:
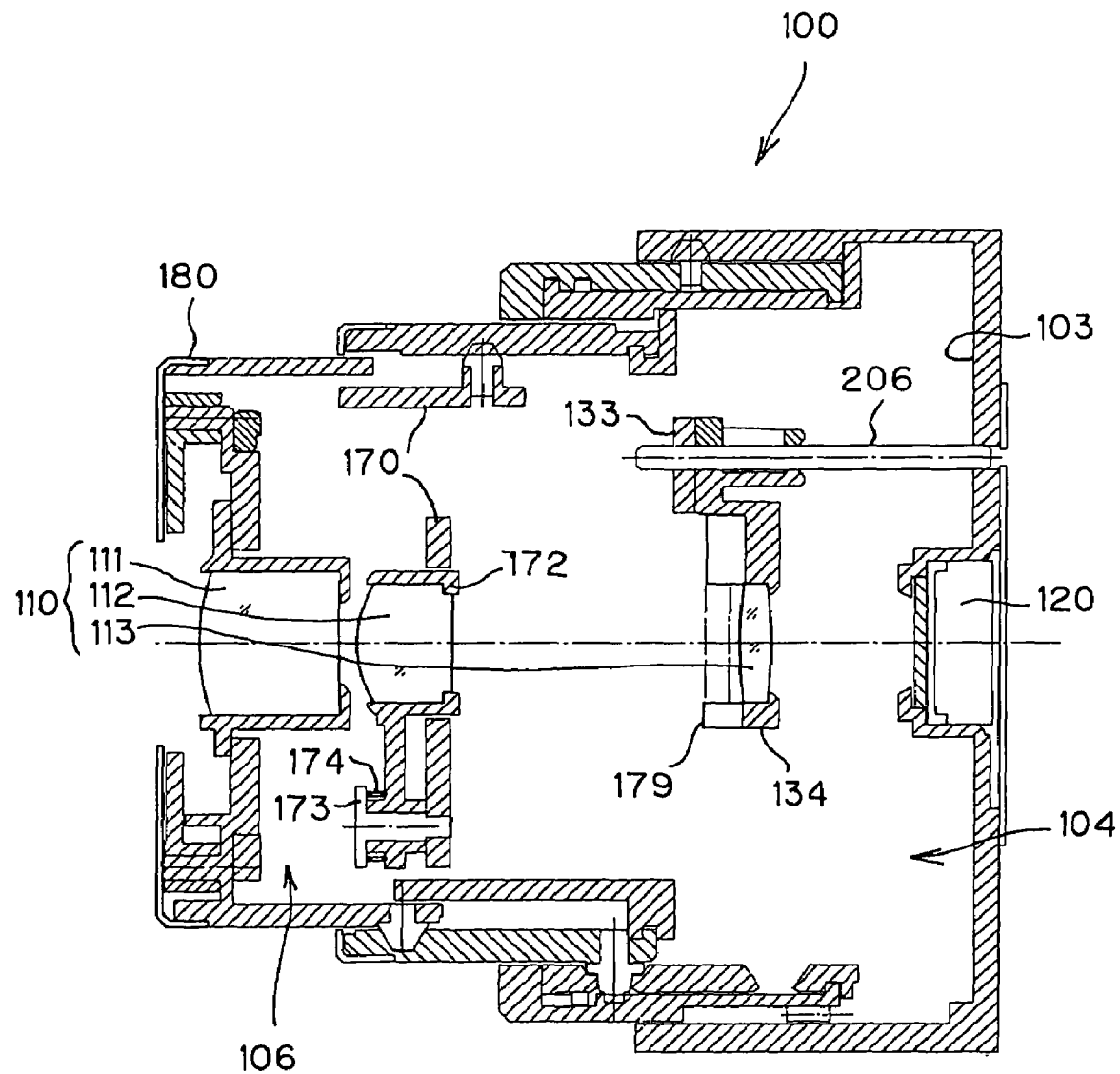
FIG. 51 is a cross-sectional view of a digital camera according to a tenth embodiment of the present invention in the tele-edge state with the maximum focal length, which is taken along the optical axis.
Figure 52:
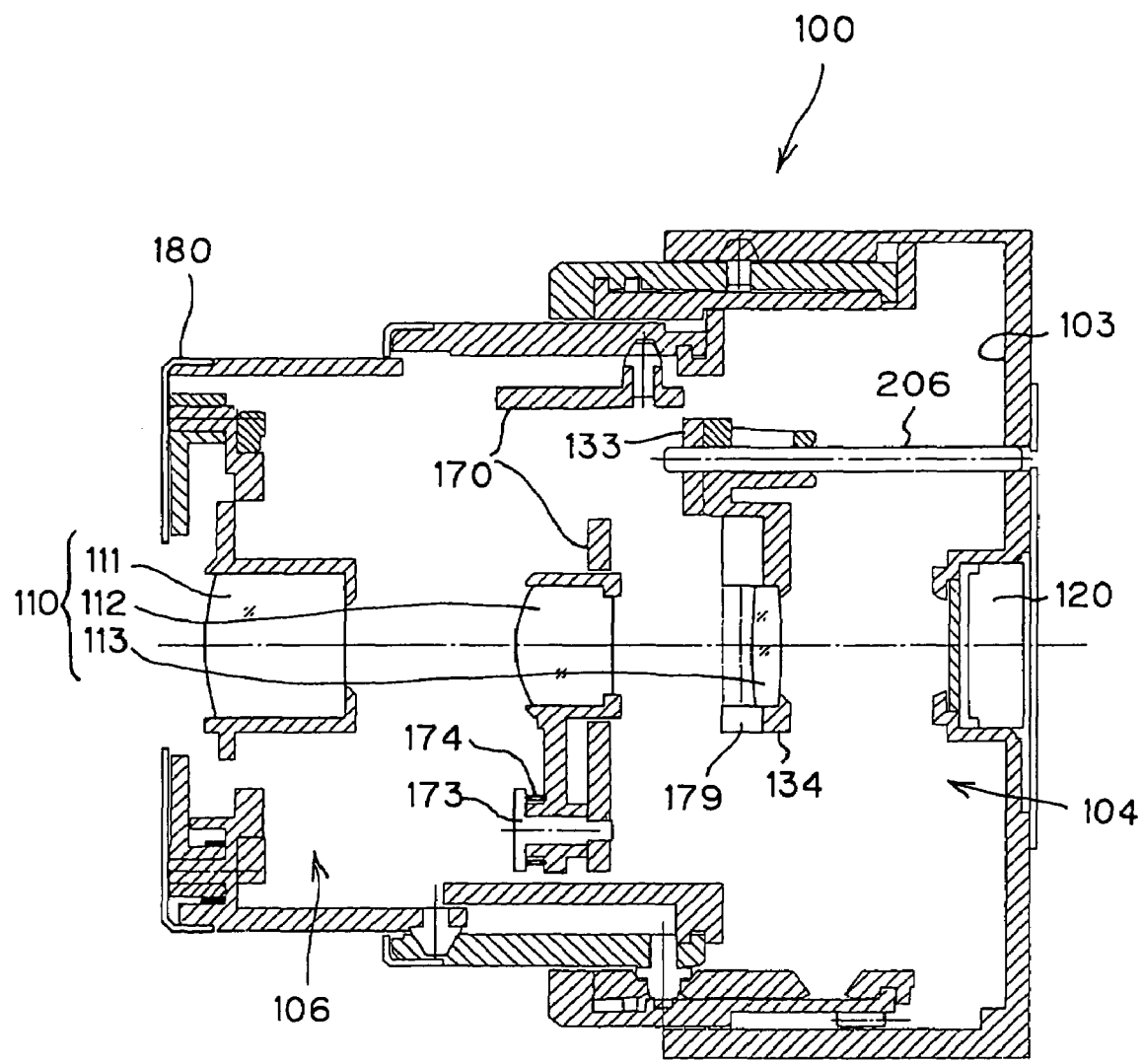
FIG. 52 is a cross-sectional view of the digital camera according to the tenth embodiment of the present invention in the wide-edge state with the minimum focal length, which is taken along the optical axis.
Figure 53:
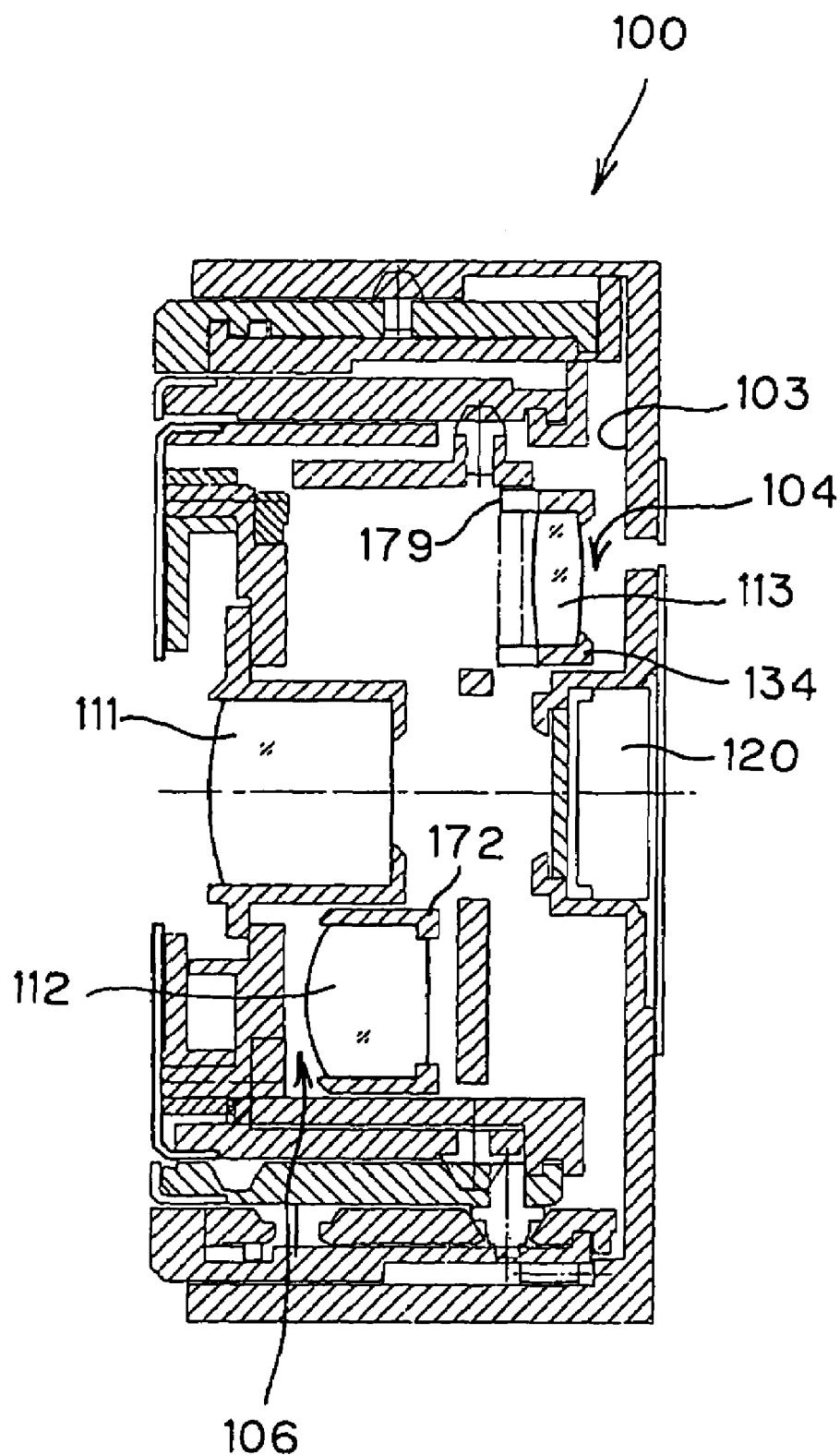
FIG. 53 is a cross-sectional view of the digital camera according to the tenth embodiment of the present invention in the collapsed state, which is taken along the optical axis.

FIG. 51 is a cross-sectional view of the digital camera according to the tenth embodiment of the present invention in the tele-edge state with the maximum focal length, which is taken along the optical axis. FIG. 52 is a cross-sectional view of the digital camera according to the tenth embodiment, which is the same as that shown in FIG. 51, in the wide-edge state with the minimum focal length, which is taken along the optical axis. FIG. 53 is a cross-sectional view of the digital camera according to the tenth embodiment, which is the same as those shown in FIGS. 51 and 52, in the collapsed state, which is taken along the optical axis.

FIGS. 51, 52 and 53 correspond to FIGS. 38, 39 and 43 concerning the seventh embodiment, respectively. The tenth embodiment differs from the seventh embodiment in that the shutter unit 179 is fixed to the focusing lens holding frame 134 in the tenth embodiment, while it is fixed to the rear group guiding frame 170 in the seventh embodiment. The shutter unit 179 is fixed to the focusing lens holding frame 134 and disposed in front of the focusing lens 113. As in the eighth and ninth embodiments, the shutter unit 179 is to control the quantity of light using an electrooptic element, such as a liquid crystal or PLZT (polarizing plate) and incorporates both a diaphragm for controlling the quantity of light passing therethrough by controlling the aperture and a shutter for controlling the quantity of light passing therethrough by controlling the shutter speed.

Since the shutter unit 179 is fixed to the focusing lens holding frame 134 holding the focusing lens 113, the shutter unit 179 is retracted in the recess section 104 along with the focusing lens 113 as shown in FIG. 53 when the lens barrel is collapsed, and is advanced onto the optical axis along with the focusing lens 113 as shown in FIGS. 51 and 52 when the lens barrel is extended.

The mechanism of the retraction and advancement involved with the collapse and extension of the lens barrel is the same as that in the seventh embodiment described above, and redundancy of illustration and description thereof will be omitted.

Now, an eleventh embodiment of the present invention will be described.

Figure 54:
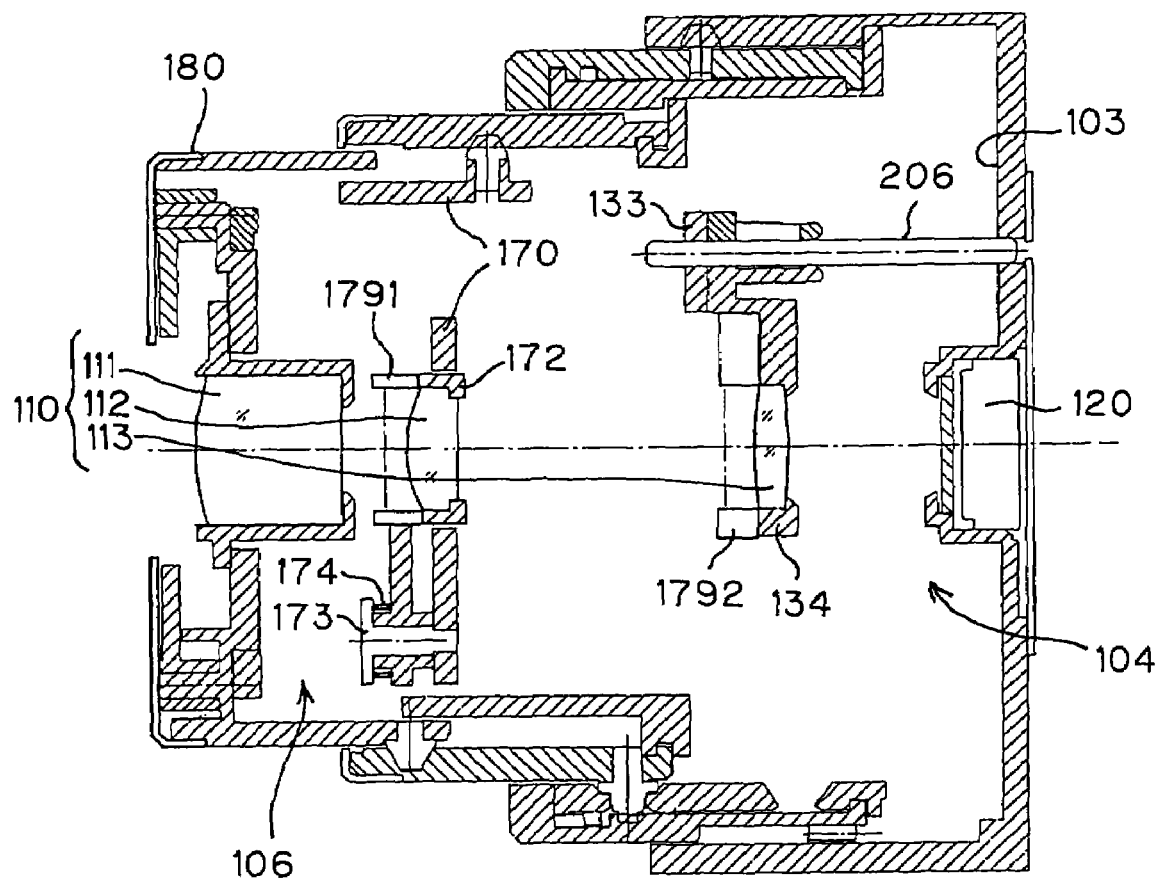
FIG. 54 is a cross-sectional view of a digital camera according to an eleventh embodiment of the present invention in the tele-edge state with the maximum focal length, which is taken along the optical axis.
Figure 55:
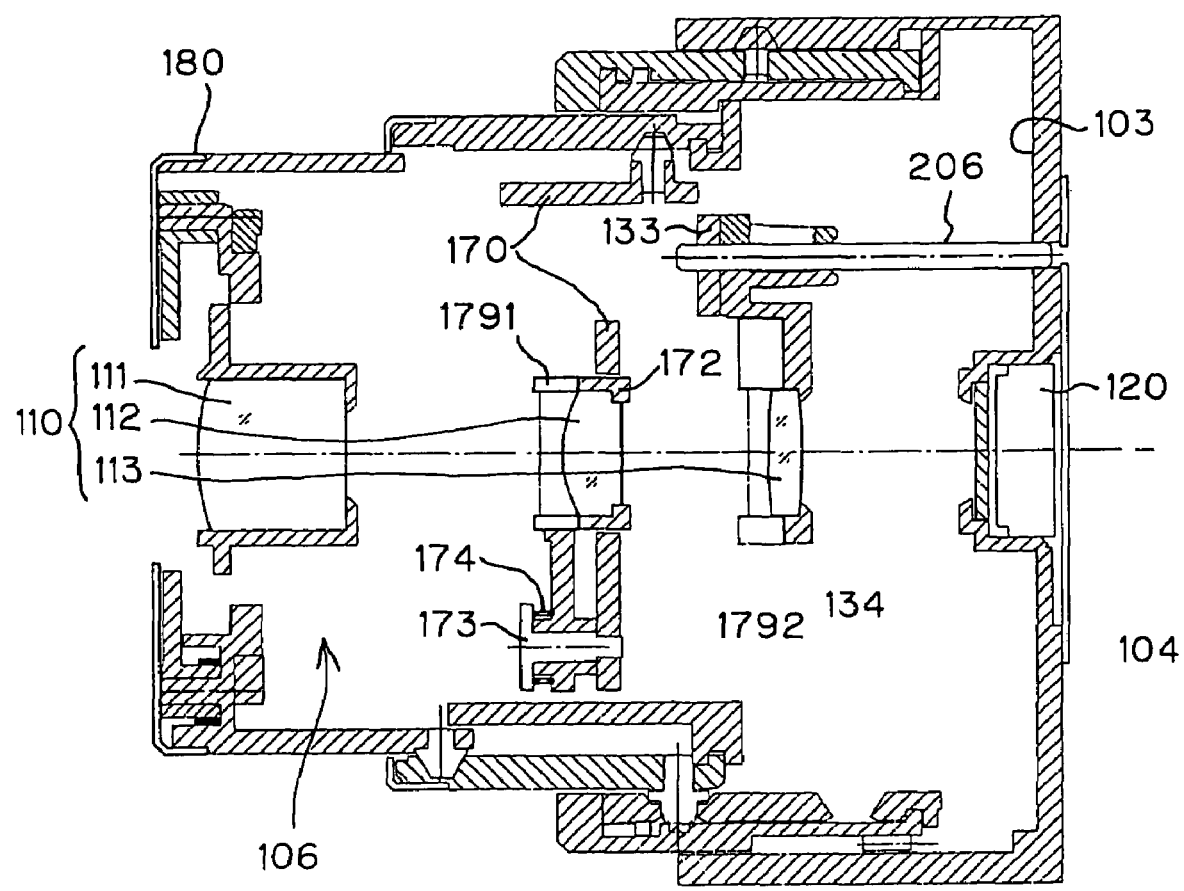
FIG. 55 is a cross-sectional view of the digital camera according to the eleventh embodiment of the present invention in the wide-edge state with the minimum focal length, which is taken along the optical axis.
Figure 56:
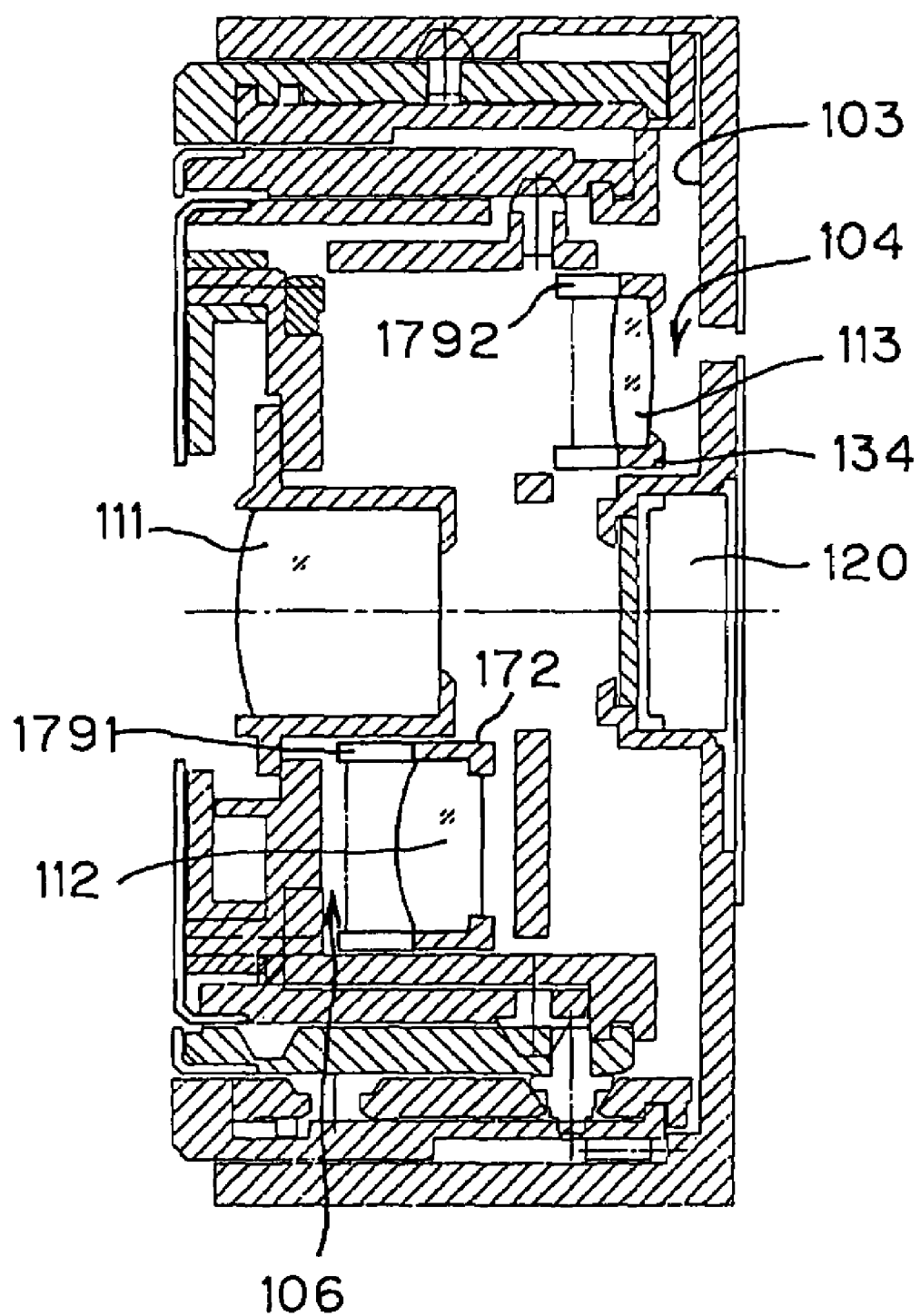
FIG. 56 is a cross-sectional view of the digital camera according to the eleventh embodiment of the present invention in the collapsed state, which is taken along the optical axis.

FIG. 54 is a cross-sectional view of the digital camera according to the eleventh embodiment of the present invention in the tele-edge state with the maximum focal length, which is taken along the optical axis. FIG. 55 is a cross-sectional view of the digital camera according to the eleventh embodiment, which is the same as that shown in FIG. 54, in the wide-edge state with the minimum focal length, which is taken along the optical axis. FIG. 56 is a cross-sectional view of the digital camera according to the eleventh embodiment, which is the same as those shown in FIGS. 54 and 55, in the collapsed state, which is taken along the optical axis.

FIGS. 54, 55 and 56 correspond to FIGS. 38, 39 and 43 concerning the seventh embodiment, respectively. The eleventh embodiment differs from the seventh embodiment in that a diaphragm unit 1791 incorporating a diaphragm that controls the quantity of light passing therethrough by controlling the aperture and a shutter unit 1792 incorporating a shutter that controls the quantity of light passing therethrough by controlling the shutter speed but not incorporating a diaphragm are provided instead of the shutter unit 179 incorporating both a diaphragm and a shutter in the seventh embodiment, and the diaphragm unit 1791 and the shutter unit 1792 are fixed to the rear group holding frame 172 and the focusing lens holding frame 134, respectively, while the shutter unit 179 incorporating both a diaphragm and a shutter in the seventh embodiment is fixed to the rear group guiding frame 170. Viewed along the optical axis, the diaphragm unit 1791 is disposed in front of the rear lens group 112, and the shutter unit 1792 is disposed in front of the focusing lens 113. In this embodiment, both the diaphragm unit 1791 and the shutter unit 1792 are to control the quantity of light using an electrooptic element, such as a liquid crystal or PLZT (polarizing plate).

Since the diaphragm unit 1791 and the shutter unit 1792 are fixed to the rear group holding frame 172 holding the rear lens group 112 and the focusing lens holding frame 134 holding the focusing lens 113, respectively, the diaphragm unit 1791 is retracted in the front lens group side space 106 along with the rear lens group 112 as shown in FIG. 56 when the lens barrel is collapsed, and is advanced onto the optical axis along with the rear lens group 112 as shown in FIGS. 54 and 55 when the lens barrel is extended, and the shutter unit 1792 is retracted in the recess section 104 along with the focusing lens 113 as shown in FIG. 56 when the lens barrel is collapsed, and is advanced onto the optical axis along with the focusing lens 113 as shown in FIGS. 54 and 55 when the lens barrel is extended.

The mechanism of the retraction and advancement involved with the collapse and extension of the lens barrel is the same as that in the seventh embodiment described above, and redundancy of illustration and description thereof will be omitted.

Now, a twelfth embodiment of the present invention will be described.

Figure 57:
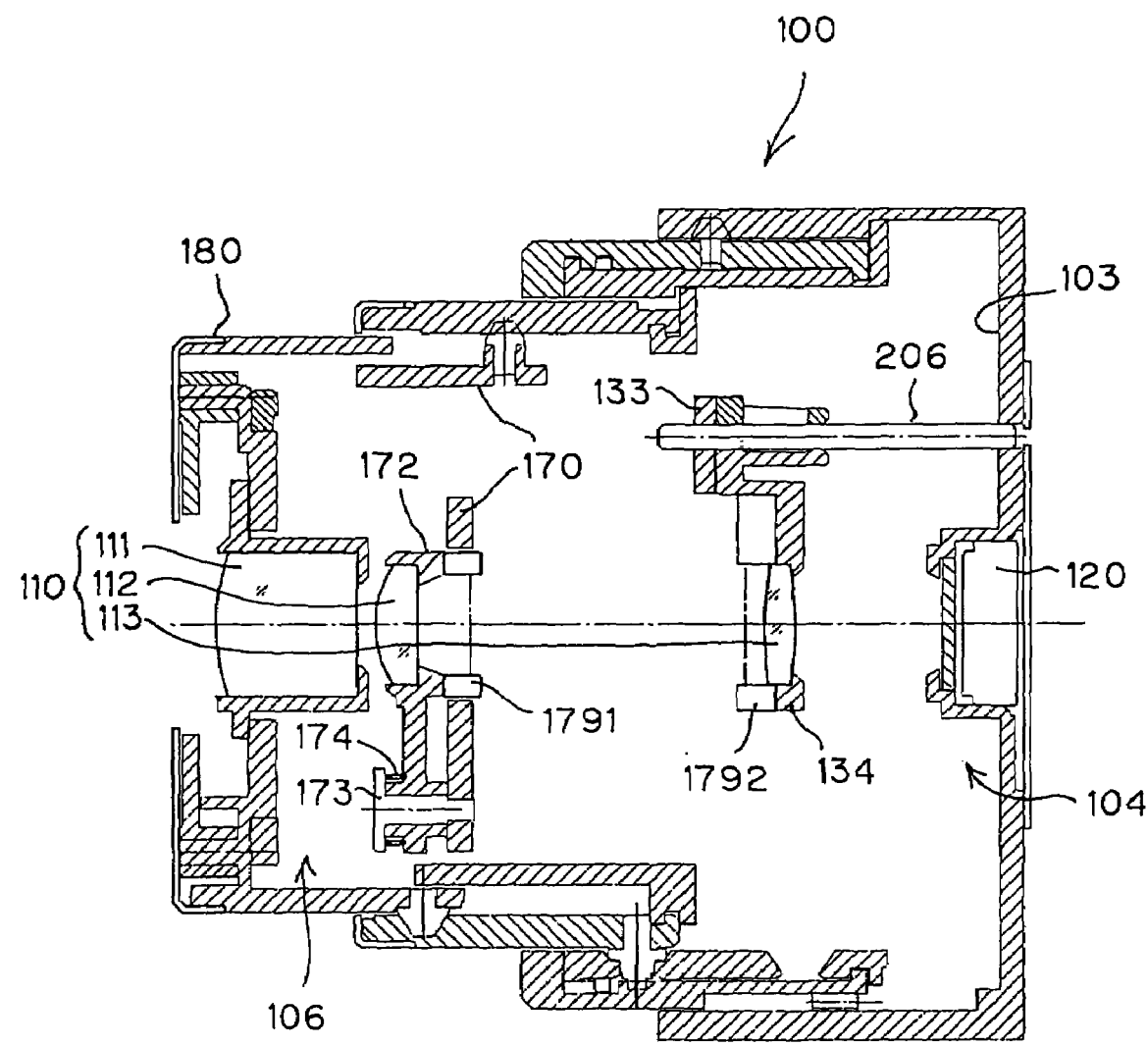
FIG. 57 is a cross-sectional view of a digital camera according to a twelfth embodiment of the present invention in the tele-edge state with the maximum focal length, which is taken along the optical axis.
Figure 58:
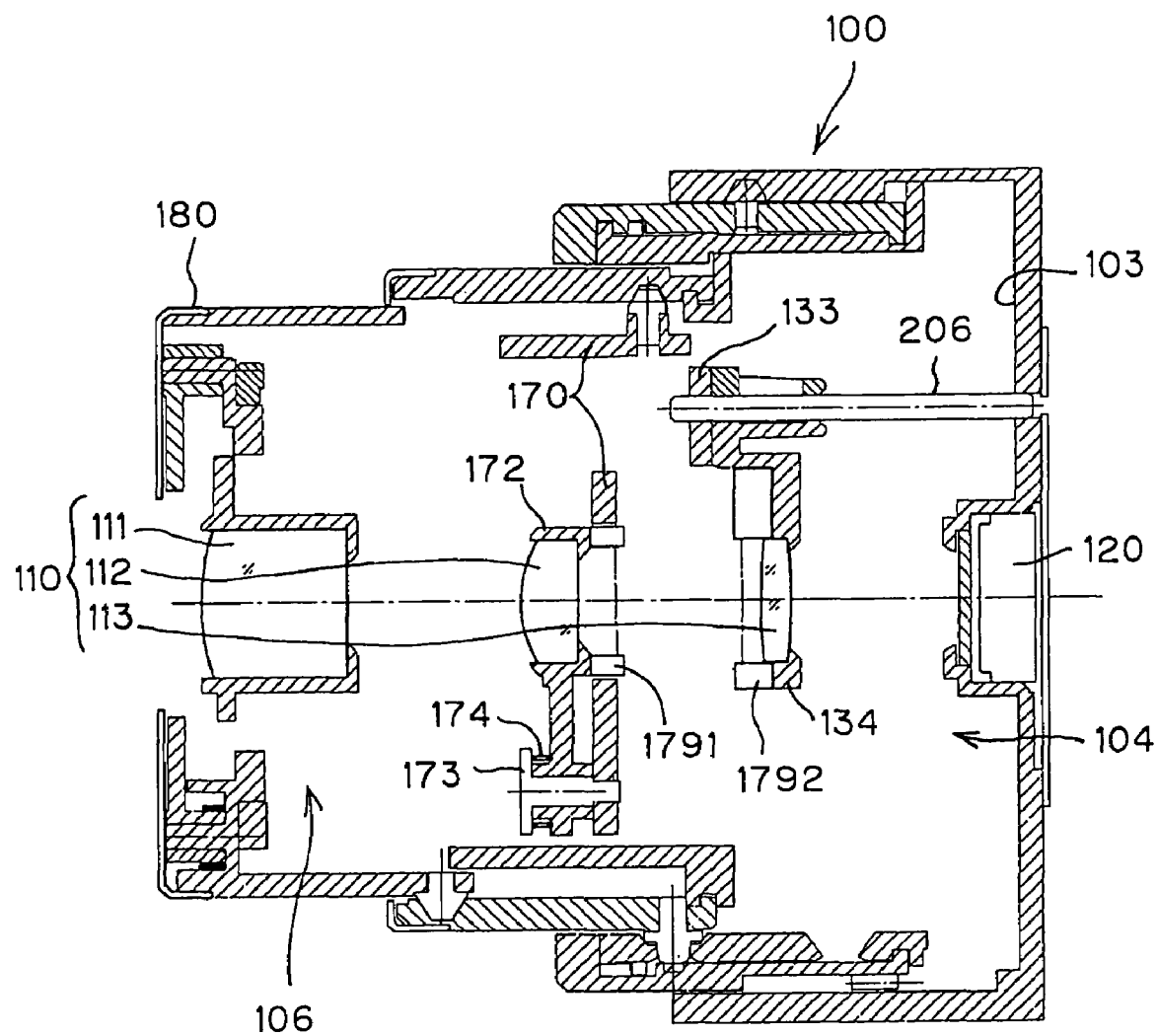
FIG. 58 is a cross-sectional view of the digital camera according to the twelfth embodiment of the present invention in the wide-edge state with the minimum focal length, which is taken along the optical axis.
Figure 59:
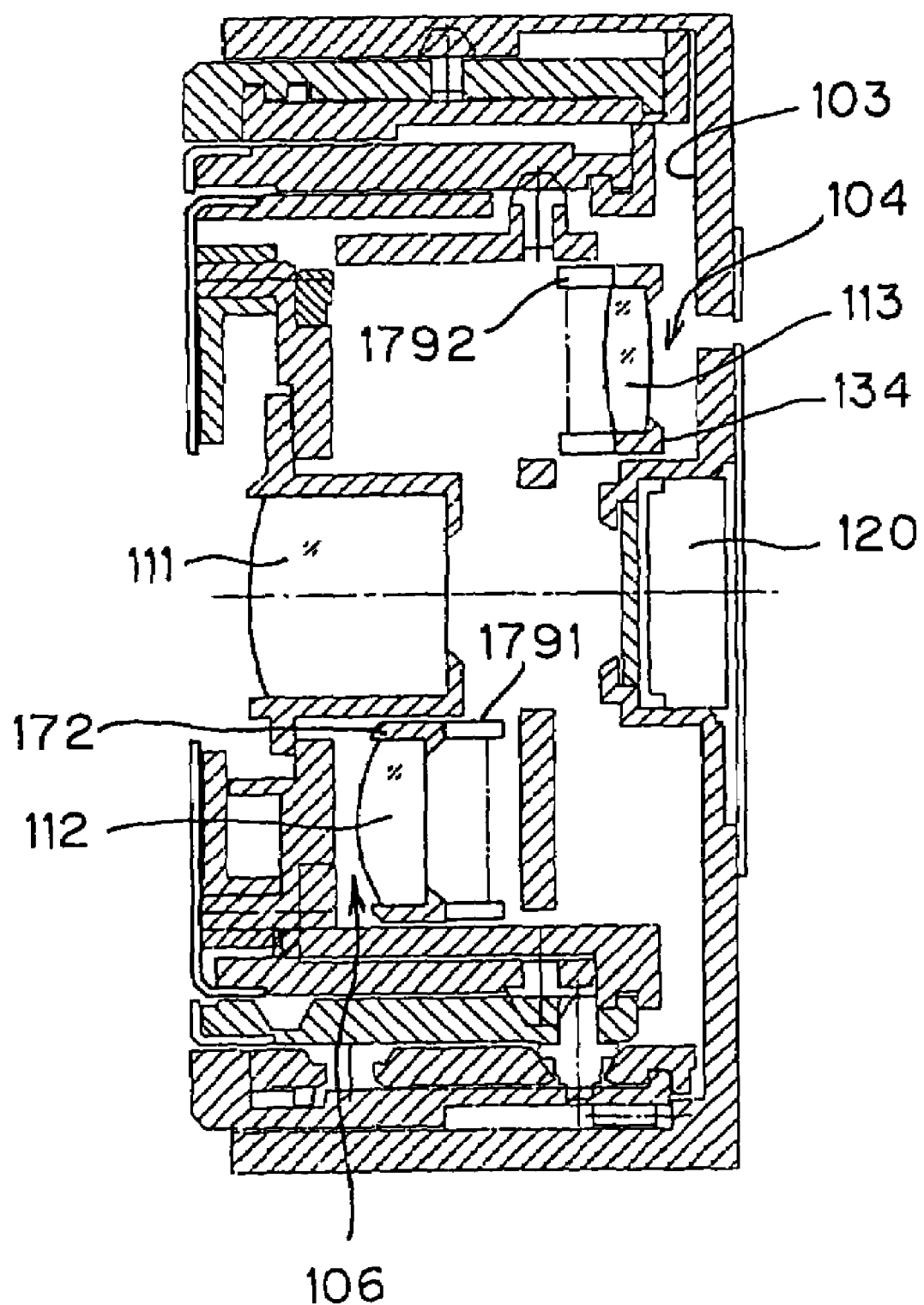
FIG. 59 is a cross-sectional view of the digital camera according to the twelfth embodiment of the present invention in the collapsed state, which is taken along the optical axis.

FIG. 57 is a cross-sectional view of the digital camera according to the twelfth embodiment of the present invention in the tele-edge state with the maximum focal length, which is taken along the optical axis. FIG. 58 is a cross-sectional view of the digital camera according to the twelfth embodiment, which is the same as that shown in FIG. 57, in the wide-edge state with the minimum focal length, which is taken along the optical axis. FIG. 59 is a cross-sectional view of the digital camera according to the twelfth embodiment, which is the same as those shown in FIGS. 57 and 58, in the collapsed state, which is taken along the optical axis.

FIGS. 57, 58 and 59 correspond to FIGS. 38, 39 and 43 concerning the seventh embodiment, respectively. The twelfth embodiment differs from the seventh embodiment in that a diaphragm unit 1791 incorporating a diaphragm that controls the quantity of light passing therethrough by controlling the aperture and a shutter unit 1792 incorporating a shutter that controls the quantity of light passing therethrough by controlling the shutter speed but not incorporating a diaphragm are provided instead of the shutter unit 179 incorporating both a diaphragm and a shutter in the seventh embodiment, and the diaphragm unit 1791 and the shutter unit 1792 are fixed to the rear group holding frame 172 and the focusing lens holding frame 134, respectively, while the shutter unit 179 incorporating both a diaphragm and a shutter in the seventh embodiment is fixed to the rear group guiding frame 170. Viewed along the optical axis, the diaphragm unit 1791 is disposed at the back of the rear lens group 112, and the shutter unit 1792 is disposed in front of the focusing lens 113. In this embodiment, both the diaphragm unit 1791 and the shutter unit 1792 are to control the quantity of light using an electrooptic element, such as a liquid crystal or PLZT (polarizing plate).

Since the diaphragm unit 1791 and the shutter unit 1792 are fixed to the rear group holding frame 172 holding the rear lens group 112 and the focusing lens holding frame 134 holding the focusing lens 113, respectively, the diaphragm unit 1791 is retracted in the front lens group side space 106 along with the rear lens group 112 as shown in FIG. 59 when the lens barrel is collapsed, and is advanced onto the optical axis along with the rear lens group 112 as shown in FIGS. 57 and 58 when the lens barrel is extended, and the shutter unit 1792 is retracted in the recess section 104 along with the focusing lens 113 as shown in FIG. 59 when the lens barrel is collapsed, and is advanced onto the optical axis along with the focusing lens 113 as shown in FIGS. 57 and 58 when the lens barrel is extended.

The mechanism of the retraction and advancement involved with the collapse and extension of the lens barrel is the same as that in the seventh embodiment described above, and redundancy of illustration and description thereof will be omitted.

In the fifth, sixth, eleventh and twelfth embodiments, the diaphragm unit 1791 is fixed to the rear group holding frame 172, and the shutter unit 1792 is fixed to the focusing lens holding frame 134. However, the shutter unit 1792 may be fixed to the rear group holding frame 172, and the diaphragm unit 1791 be fixed to the focusing lens holding frame 134.

In the second to sixth embodiments and eighth to twelfth embodiments, the shutter unit 179 (or the diaphragm unit 1791 and the shutter unit 1792) is described as one using an electrooptic element, such as a liquid crystal or PLZT. However, the shutter unit 179 (or the diaphragm unit 1791 or shutter unit 1792) which is retracted along with the rear lens group (or the focusing lens) is not necessarily required to use the electrooptic element, and a mechanical shutter unit which mechanically controls the aperture or shutter speed or an iris shutter (diaphragm) unit which advances or retracts an iris having a predetermined aperture onto or from the optical axis may be used.

Furthermore, while both the diaphragm and the shutter are provided in these embodiments, one unit which serves as both diaphragm and shutter may be used. In this regard, the same holds true for the shutter unit using an electrooptic element, and one unit which uses an electrooptic element and serves both as diaphragm and shutter may be used.

In the first and seventh embodiments, the shutter unit 179 remains on the optical axis without being retracted when the lens barrel is collapsed. While the arrangement of the shutter unit 179 has not been mentioned in the description of the first and seventh embodiments, the shutter unit which remains on the optical axis when the lens barrel is collapsed may be a shutter unit using an electrooptic element, a mechanical shutter unit or an iris shutter unit.

In the above description of the embodiments, the digital camera has been assumed as one for still picture. However, the present invention can be equally applied to digital cameras for moving picture or digital cameras for both still picture and moving image. Furthermore, the above description has been made by taking as an example the three-group taking lens which consists of the front lens group, the rear lens group and the focusing lens arranged in this order from the front along the optical axis, has a variable focal length and adjusts the focus by displacing the focusing lens. However, the present invention is not limited thereto and can be generally applied to digital cameras having a taking lens which consists of plural lens groups including a focusing lens arranged on the optical axis, has a variable focal length and adjusts the focus by displacing the focusing lens.

What is claimed is:

1. A digital camera that captures object light and generates an image signal, comprising:
   a taking lens having a variable focal length and comprising three or more lens groups including a front lens group, which is disposed forward along an optical axis;
   a lens barrel that has an inner space for housing the taking lens and is capable of being extended or collapsed, the inner space having an opening for the front lens group to see the outside on the front thereof and being defined by a wall at the rear thereof, and the focal length being adjusted when the lens barrel is extended; and
   a solid-state image pickup device that receives object light focused by the taking lens and generates an image signal, the solid-state image pickup device being supported on the wall,
   wherein the lens barrel has a lens group retraction/advancement mechanism which, when the lens barrel is collapsed, retracts a first lens group into a front lens group side space and retracts a second lens group into a recess section, which is defined by the solid-state image pickup device and the wall in a space at the side of the solid-state image pickup device, and, when the lens barrel is extended, advances both the first lens group and the second lens group onto the optical axis, the first lens group being one of the three or more lens groups constituting the taking lens which is other than the front lens group, and the second lens group being one other than the front lens group and the first lens group;
   wherein the lens barrel comprises:
      a first lens group guiding frame that moves along the optical axis and positions the first lens group along the optical axis;
      a first lens group holding frame that holds the first lens group, is pivotally supported on the first lens group guiding frame, rotates the first lens group to bring the first lens group onto the optical axis when the lens barrel is extended and rotates the first lens group to bring the first lens group into the front lens group side space when the lens barrel is collapsed;
      a second lens group guiding frame that moves along the optical axis and positions the second lens group along the optical axis; and
      a second lens group holding frame that holds the second lens group, is pivotally supported on the second lens group guiding frame, rotates the second lens group to bring the second lens group onto the optical axis when the lens barrel is extended and rotates the second lens group to bring the second lens group into the recess section when the lens barrel is collapsed;
   wherein the digital camera further comprises:
      a light quantity controlling member that is housed in the lens barrel, moves integrally with the first lens group along the optical axis of the taking lens and, when the light quantity controlling member is disposed on the optical axis, varies the quantity of object light passing through the taking lens in a direction of the optical axis,
   wherein the first lens group holding frame retracts the light quantity controlling member integrally with the first lens group into the front lens group side space when the lens barrel is collapsed and advances the light quantity controlling member integrally with the first lens group onto the optical axis when the lens barrel is extended.

2. The digital camera according to claim 1, wherein the light quantity controlling member comprises an electrooptic element.

3. The digital camera according to claim 1, wherein the light quantity controlling member is a diaphragm member that controls the aperture to control the quantity of object light passing through the taking lens.

4. The digital camera according to claim 1, wherein the light quantity controlling member is a shutter member that controls the shutter speed to control the quantity of object light passing through the taking lens.

5. A digital camera that captures object light and generates an image signal, comprising:
   a taking lens having a variable focal length and comprising three or more lens groups including a front lens group, which is disposed forward along an optical axis;
   a lens barrel that has an inner space for housing the taking lens and is capable of being extended or collapsed, the inner space having an opening for the front lens group to see the outside on the front thereof and being defined by a wall at the rear thereof, and the focal length being adjusted when the lens barrel is extended; and
   a solid-state image pickup device that receives object light focused by the taking lens and generates an image signal, the solid-state image pickup device being supported on the wall,
   wherein the lens barrel has a lens group retraction/advancement mechanism which, when the lens barrel is collapsed, retracts a first lens group into a front lens group side space and retracts a second lens group into a recess section, which is defined by the solid-state image pickup device and the wall in a space at the side of the solid-state image pickup device, and, when the lens barrel is extended, advances both the first lens group and the second lens group onto the optical axis, the first lens group being one of the three or more lens groups constituting the taking lens which is other than the front lens group, and the second lens group being one other than the front lens group and the first lens group;
   wherein the lens barrel comprises:
      a first lens group guiding frame that moves along the optical axis and positions the first lens group along the optical axis;
      a first lens group holding frame that holds the first lens group, is pivotally supported on the first lens group guiding frame, rotates the first lens group to bring the first lens group onto the optical axis when the lens barrel is extended and rotates the first lens group to bring the first lens group into the front lens group side space when the lens barrel is collapsed;
      a second lens group guiding frame that moves along the optical axis and positions the second lens group along the optical axis; and
      a second lens group holding frame that holds the second lens group, is pivotally supported on the second lens group guiding frame, rotates the second lens group to bring the second lens group onto the optical axis when the lens barrel is extended and rotates the second lens group to bring the second lens group into the recess section when the lens barrel is collapsed;

wherein the digital camera further comprises:

a light quantity controlling member that is housed in the lens barrel, moves integrally with the second lens group along the optical axis of the taking lens and, when the light quantity controlling member is disposed on the optical axis, varies quantity of object light passing through the taking lens in a direction of the optical axis, wherein the second lens group holding frame retracts the light quantity controlling member integrally with the second lens group into the recess section when the lens barrel is collapsed and advances the light quantity controlling member integrally with the second lens group onto the optical axis when the lens barrel is extended.

6. The digital camera according to claim 5, wherein the light quantity controlling member comprises an electrooptic element.

7. The digital camera according to claim 5, wherein the light quantity controlling member is a diaphragm member that controls the aperture to control the quantity of object light passing through the taking lens.

8. The digital camera according to claim 5, wherein the light quantity controlling member is a shutter member that controls the shutter speed to control the quantity of object light passing through the taking lens.

9. A digital camera that captures object light and generates an image signal, comprising:

a taking lens having a variable focal length and comprising three or more lens groups including a front lens group, which is disposed forward along an optical axis;

a lens barrel that has an inner space for housing the taking lens and is capable of being extended or collapsed, the inner space having an opening for the front lens group to see the outside on the front thereof and being defined by a wall at the rear thereof, and the focal length being adjusted when the lens barrel is extended; and a solid-state image pickup device that receives object light focused by the taking lens and generates an image signal, the solid-state image pickup device being supported on the wall, wherein the lens barrel has a lens group retraction/advancement mechanism which, when the lens barrel is collapsed, retracts a first lens group into a front lens group side space and retracts a second lens group into a recess section, which is defined by the solid-state image pickup device and the wall in a space at the side of the solid-state image pickup device, and, when the lens barrel is extended, advances both the first lens group and the second lens group onto the optical axis, the first lens group being one of the three or more lens groups constituting the taking lens which is other than the front lens group, and the second lens group being one other than the front lens group and the first lens group;

wherein the lens barrel comprises:

a first lens group guiding frame that moves along the optical axis and positions the first lens group along the optical axis;

a first lens group holding frame that holds the first lens group, is pivotally supported on the first lens group guiding frame, rotates the first lens group to bring the first lens group onto the optical axis when the lens barrel is extended and rotates the first lens group to bring the first lens group into the front lens group side space when the lens barrel is collapsed;

a second lens group guiding frame that moves along the optical axis and positions the second lens group along the optical axis; and a second lens group holding frame that holds the second lens group, is pivotally supported on the second lens group guiding frame, rotates the second lens group to bring the second lens group onto the optical axis when the lens barrel is extended and rotates the second lens group to bring the second lens group into the recess section when the lens barrel is collapsed;

wherein the digital camera further comprises:

a first light quantity controlling member that is housed in the lens barrel, moves integrally with the first lens group along the optical axis of the taking lens and, when the first light quantity controlling member is disposed on the optical axis, varies quantity of object light passing through the taking lens in a direction of the optical axis; and a second light quantity controlling member that moves integrally with the second lens group along the optical axis and, when the second light quantity controlling member is disposed on the optical axis, varies the quantity of object light passing through the taking lens in a direction of the optical axis, wherein, when the lens barrel is collapsed, the first lens group holding frame retracts the first light quantity controlling member integrally with the first lens group into the front lens group side space, and the second lens group holding frame retracts the second light quantity controlling member integrally with the second lens group into the recess section, and, when the lens barrel is extended, the first lens group holding frame advances the first light quantity controlling member integrally with the first lens group onto the optical axis of the taking lens, and the second lens group holding frame advances the second light quantity controlling member integrally with the second lens group onto the optical axis.

10. The digital camera according to claim 9, wherein at least one of the first and second light quantity controlling members comprises an electrooptic element.

11. The digital camera according to claim 9, wherein at least one of the first and second light quantity controlling members is a diaphragm member that controls the aperture to control the quantity of object light passing through the taking lens, and the other of the first and second light quantity controlling members is a shutter member that controls the shutter speed to control the quantity of object light passing through the taking lens.

* * * * *